United States Patent
Arai et al.

(10) Patent No.: US 9,131,152 B2
(45) Date of Patent: Sep. 8, 2015

(54) IMAGING APPARATUS, IMAGING METHOD, AND PROGRAM

(75) Inventors: Takuya Arai, Kanagawa (JP); Junichiro Goto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 360 days.

(21) Appl. No.: 13/276,546

(22) Filed: Oct. 19, 2011

(65) Prior Publication Data

US 2012/0120188 A1 May 17, 2012

(30) Foreign Application Priority Data

Nov. 11, 2010 (JP) ................................ P2010-252612

(51) Int. Cl.
*H04N 5/232* (2006.01)
*H04N 5/262* (2006.01)

(52) U.S. Cl.
CPC ....... *H04N 5/23238* (2013.01); *H04N 5/23245* (2013.01); *H04N 5/23293* (2013.01); *H04N 5/2628* (2013.01)

(58) Field of Classification Search
CPC ..... H04N 5/23219; H04N 5/232; G03B 37/04
See application file for complete search history.

(56) References Cited

U.S. PATENT DOCUMENTS

| | | |
|---|---|---|
| 6,466,701 B1 | 10/2002 | Ejiri et al. |
| 2001/0019355 A1 | 9/2001 | Koyanagi et al. |
| 2004/0189849 A1 | 9/2004 | Hofer |
| 2005/0168594 A1 | 8/2005 | Larson |
| 2006/0238536 A1* | 10/2006 | Katayama et al. ............ 345/427 |
| 2007/0091124 A1* | 4/2007 | Hasegawa et al. ............ 345/629 |
| 2008/0180550 A1* | 7/2008 | Gulliksson ............... 348/231.99 |
| 2009/0058990 A1* | 3/2009 | Kim et al. ........................ 348/36 |
| 2009/0284582 A1* | 11/2009 | Mei et al. ........................ 348/36 |
| 2011/0058015 A1 | 3/2011 | Moriyama et al. |
| 2011/0181690 A1 | 7/2011 | Yoshizumi |
| 2011/0188726 A1 | 8/2011 | Nathaniel et al. |
| 2011/0234750 A1* | 9/2011 | Lai et al. ......................... 348/37 |

FOREIGN PATENT DOCUMENTS

| | | |
|---|---|---|
| EP | 1 750 431 A2 | 2/2007 |
| EP | 2 128 868 A2 | 12/2009 |
| EP | 2 164 244 A1 | 3/2010 |
| EP | 2 453 645 A1 | 5/2012 |
| JP | 11-008844 A | 1/1999 |
| JP | 2000-175185 A | 6/2000 |
| JP | 2008-176430 A | 7/2008 |
| JP | 2009-268037 | 1/2009 |
| JP | 2009-232276 A1 | 10/2009 |

(Continued)

OTHER PUBLICATIONS

U.S. Serial Appl. No. 13/269,130, filed Oct. 7, 2011, Goto, et al.

(Continued)

*Primary Examiner* — Tung Vo
*Assistant Examiner* — Joseph Becker
(74) *Attorney, Agent, or Firm* — Oblon, McClelland, Maier & Neustadt, L.L.P.

(57) ABSTRACT

An image processing apparatus including an interface that receives an input identifying a subject, and a processor that generates a panoramic image based on captured image data so that the subject is positioned in a reference position in the panoramic image.

26 Claims, 37 Drawing Sheets

(56) References Cited

FOREIGN PATENT DOCUMENTS

| JP | 2009-268037 | 11/2009 |
|---|---|---|
| WO | WO 2006/074161 A2 | 7/2006 |
| WO | WO 2009/142327 A1 | 11/2009 |

OTHER PUBLICATIONS

U.S. Serial Appl. No. 13/276,546, filed Oct. 19, 2011, Arai, et al.
Office Action issued May 13, 2014, in Japanese Patent Application No. 2010-252612.
Extended European Search Report issued Mar. 16, 2012, in European Patent Application No. 11187845.0.
Extended European Search Report issued Nov. 26, 2012, in European Patent Application No. 12177786.6.
Office Action mail Mar. 13, 2014, in co-pending U.S. Appl. No. 13/269,130.
Office Action mail Nov. 7, 2013, in co-pending U.S. Appl. No. 13/269,130.
Extended European Search Report, issued on Feb. 7, 2012 in European Application No. 11187621.5. (7 pages).
Russian Office Action issued on Mar. 1, 2013 in Application No. 2011144806/07(067211). (3 pages).

* cited by examiner

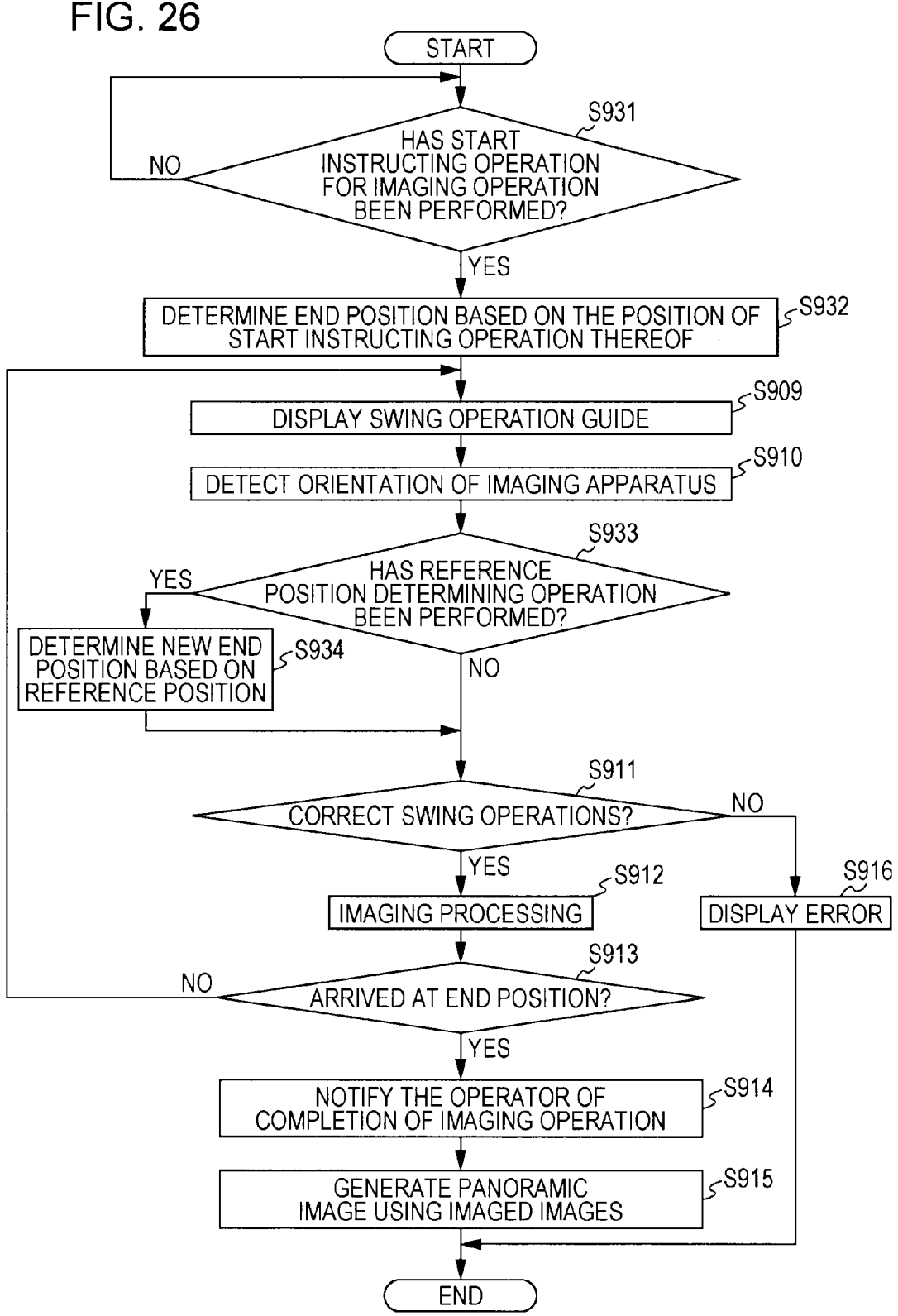

IMAGING APPARATUS, IMAGING METHOD, AND PROGRAM

CROSS REFERENCE TO RELATED APPLICATIONS

This application claims the benefit of priority under 35 U.S.C. §119 to Japanese Patent Application JP 2010-252612 filed in the Japan Patent Office on Nov. 11, 2010, the entire content of which is hereby incorporated by reference.

BACKGROUND

The present disclosure relates to an imaging apparatus, and specifically relates to an imaging apparatus and an imaging method which generate a panoramic image, and a program causing a computer to execute this method.

In recent years, there have come into widespread use imaging apparatuses such as digital still cameras which image a subject such as scenery or the like to generate images (image data), and record the generated images as image files. Also, there has been proposed an imaging apparatus which consecutively generates multiple images in chronological order, and generates a panoramic image including a subject with a relatively wide range using these generated multiple images.

For example, there has been proposed an imaging apparatus wherein multiple images are generated while moving the imaging apparatus with the backward of the imaging apparatus (e.g., the position of a photographer) as an axis so as to draw an arc, and a panoramic image is generated using these multiple images (e.g., see Japanese Unexamined Patent Application Publication No. 2009-268037).

SUMMARY

According to the above-mentioned related art, in a state in which a user holds an imaging apparatus in the hand, the imaging operation of a panoramic image may be performed by moving the imaging apparatus so as to draw an arc, and accordingly, the user may perform imaging operation thereof in a relatively easy manner.

In this way, in the event of performing the imaging operation of a panoramic image using the above-mentioned related art, the composition of the panoramic image is determined according to a start instruction of imaging operation by the user's operations, for example. Accordingly, in the event of performing the imaging operation of a panoramic image, after overlooking the circumference, the user has to confirm a subject serving as an imaging object for a panoramic image, and to recognize the start position and end position of imaging operation, for example. Subsequently, after performing an imaging operation start instruction at the start position of imaging operation, the user performs the imaging operation of a panoramic image by moving the imaging apparatus to the end position of imaging operation.

However, in the event of performing the imaging operation of a panoramic image based on a user's confirmation in this way, the composition may be different from that which the user has intended. For example, there may be a case where an object which the user intends to situate in the center position in a panoramic image is not situatable in the center position in a panoramic image. In this case, for example, the user performs multiple times of imaging operation through a trial and error process, or compromises with a panoramic image having an unintended composition.

It has been found to be desirable to enable readily generating a user's favorite panoramic image.

According to a first exemplary embodiment, the disclosure is directed to an image processing apparatus including an interface that receives an input identifying a subject, and a processor that generates a panoramic image based on captured image data so that the subject is positioned in a reference position in the panoramic image.

According to another exemplary embodiment, the disclosure is directed to an image processing apparatus that includes an interface that receives an input identifying a subject, an imaging unit that captures image data for generating a panoramic image, and a processor that generates the panoramic image based on the captured image data so that the subject is positioned in a reference position in the panoramic image.

According to another exemplary embodiment, the disclosure is directed to an image processing method performed by an image processing apparatus. The method includes receiving, at an interface of the image processing apparatus, an input identifying a subject, and generating, at a processor of the image processing apparatus, a panoramic image based on captured image data so that the subject is positioned in a reference position in the panoramic image.

According to the above configurations, an excellent advantage may be provided in that a user's favorite panoramic image can be readily generated.

BRIEF DESCRIPTION OF THE DRAWINGS

FIG. 26 is a flowchart illustrating an example of imaging control processing according to the imaging apparatus according to the first embodiment of the present disclosure;

DETAILED DESCRIPTION OF EMBODIMENTS

Modes for implementing the present disclosure (hereafter, referred to as embodiments) will be described below. Description will be made in accordance with the following sequence.

1. First Embodiment (imaging control: an example wherein the imaging operation of a panoramic image is controlled so as to situate a user's desired subject in a reference position in the panoramic image)
2. Second Embodiment (imaging control: an example wherein the imaging operation of a panoramic image is controlled so as to obtain a user's desired composition by situating a marker representing a reference subject on a composition assistance image)
3. Modifications

1. First Embodiment

Configuration Example of Imaging Apparatus

Figure 1:
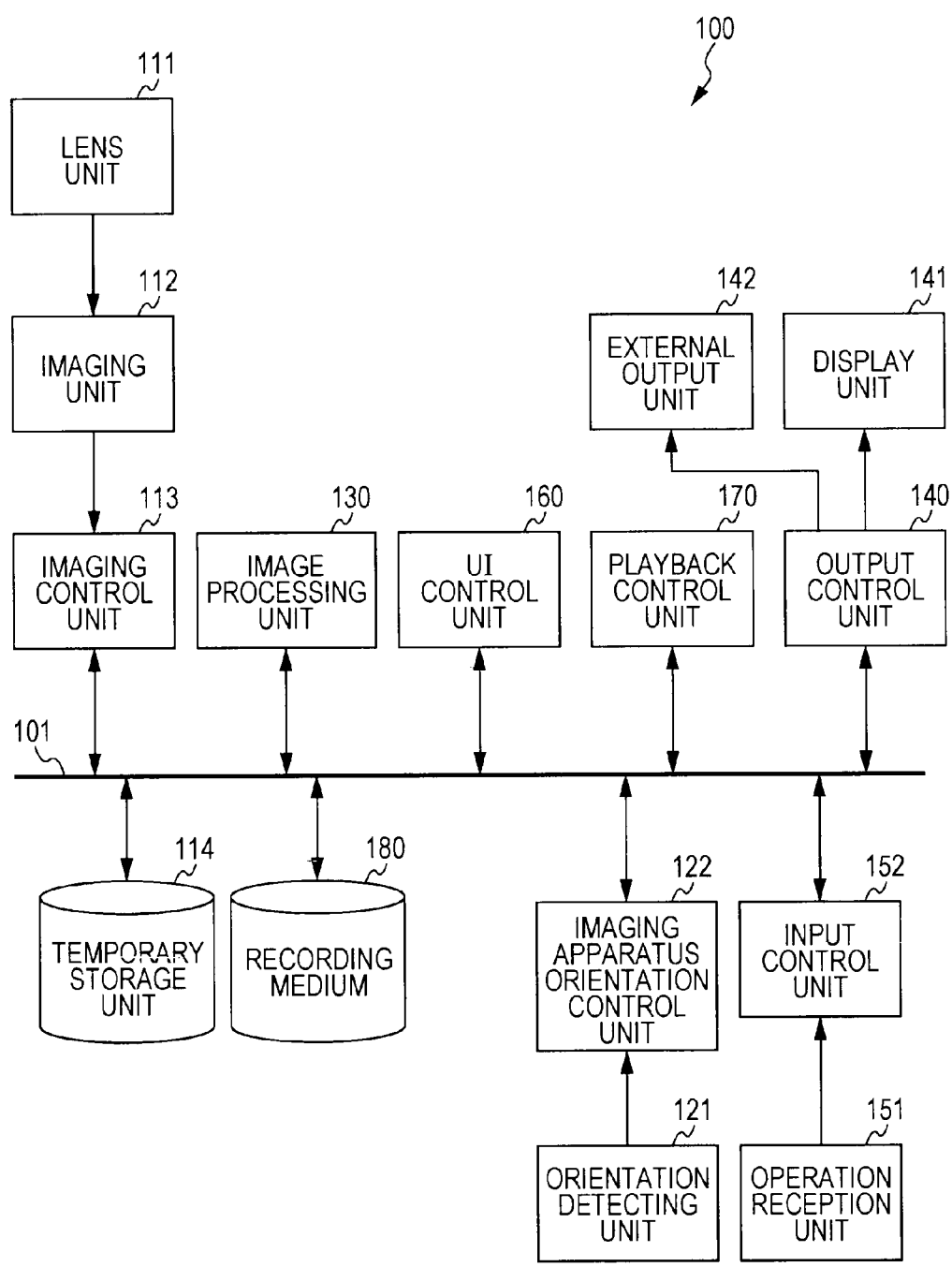
FIG. 1 is a block diagram illustrating an internal configuration example of an imaging apparatus according to a first embodiment of the present disclosure.

FIG. 1 is a block diagram illustrating an internal configuration example of an imaging apparatus 100 according to the first embodiment of the present disclosure. The imaging apparatus 100 includes a lens unit 111, an imaging unit 112, an imaging control unit 113, a temporary storage unit 114, an orientation detecting unit 121, an image apparatus orientation control unit 122, an image processing unit 130, an output control unit 140, a display unit 141, and an external output unit 142. Also, the imaging apparatus 100 includes an operation reception unit 151, an input control unit 152, a UI (user interface) control unit 160, a playback control unit 170, and a recording medium 180. Note that exchange between the units making up the imaging apparatus 100 is performed via a bus 101. Also, the imaging apparatus 100 may be realized by a digital still camera capable of imaging a subject to generate multiple images (image data), and performing various types of imaging processing regarding these multiple images, for example.

The lens unit 111 is configured of multiple lenses (zoom lens, focusing lens, etc.) for condensing light from a subject, and light input from the subject via these lenses and an iris is supplied to the imaging unit 112.

The imaging unit 112 converts incident light from a subject to generate an image (image data) under control of the imaging control unit 113, and supplies the generated image to the imaging control unit 113. Specifically, an optical image of the subject input via the lens unit 111 is formed on the imaging face of the imaging device, and the imaging device performs imaging operation in this state to generate an image (image data). Note that a CCD (Charge Coupled Device) sensor, a CMOS (Complementary Metal Oxide Semiconductor) sensor, and so forth may be used as the imaging device, for example.

The imaging control unit 113 controls the imaging operation by the imaging unit 112, and supplies the image (image data) generated by the imaging unit 112 to the image processing unit 130 via the temporary storage unit 114.

The temporary storage unit 114 is image memory for temporarily storing the image (image data) generated by the imaging unit 112, or an image (image data) at the time of image processing by the image processing unit 130. The temporary storage unit 114 is configured of DRAM (Dynamic Random Access Memory), for example.

The orientation detecting unit 121 detects change in the orientation of the imaging apparatus 100 by detecting the acceleration, motion, inclination, and so forth of the imaging apparatus 100, and outputs orientation change information relating to detected orientation change to the imaging apparatus orientation control unit 122. The orientation detecting unit 121 may inexpensively be realized by taking advantage of a gyro sensor for shaking correction which is a ready-made component. Alternatively, a dedicated gyro sensor may also be employed. The angular velocity of the imaging apparatus 100 is detected by these gyro sensors, and change in the orientation of the imaging apparatus 100 is detected. Note that an arrangement may be made wherein the acceleration, motion, inclination, and so forth of the imaging apparatus 100 are detected using another sensor other than gyro sensors (e.g., acceleration sensor), and based on this detection result, the orientation of the imaging apparatus 100 and change thereof are detected.

The imaging apparatus orientation control unit 122 controls the orientation detecting unit 121, and outputs the orientation information output from the orientation detecting unit 121 to the image processing unit 130 and UI control unit 160 and so forth.

The image processing unit 130 performs image processing such as encoding and so forth as to the image (image data) generated by the imaging unit 112, and stores the image (image data) subjected to image processing in the recording medium 180 as an image file. For example, the image processing unit 130 performs image processing for display regarding the image (image data) generated by the imaging unit 112, and outputs the image subjected to image processing to the output control unit 140 to display on the display unit 141. Also, in the event that a panoramic image imaging mode has been set, the image processing unit 130 synthesizes the multiple images (image data) generated by the imaging unit 112 to generate a panoramic image, and stores this generated panoramic image in the recording medium 180 as an image file. Also, the image processing unit 130 performs image processing such as decoding processing and so forth of the image supplied from the playback control unit 170 via the temporary storage unit 114 at the time of playback of an image file stored in the recording medium 180.

The output control unit 140 performs output control relating to the display unit 141 and external output unit 142. For example, the output control unit 140 displays the image (e.g., through image) output from the image processing unit 130 on the display unit 141. Also, the output control unit 140 displays each image (e.g., menu screen) on the display unit 141 under control of the UI control unit 160. Also, the output control unit 140 synthesizes each image under control of the UI control unit 160 (e.g., operation assistance image) as to the image output from the image processing unit 130 (e.g., through image) to display on the display unit 141. Also, the output control unit 140 displays an image file stored in the recording medium 180 on the display unit 141 under control of the playback control unit 170.

Figure 3A:
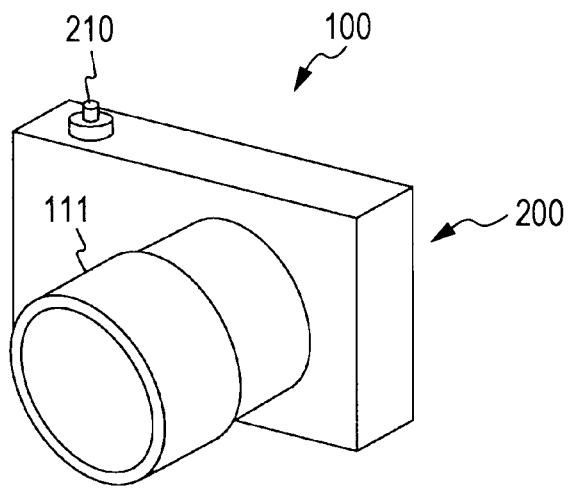
FIGS. 3A and 3B are perspective views illustrating the appearance of the imaging apparatus according to the first embodiment of the present disclosure.
Figure 3B:
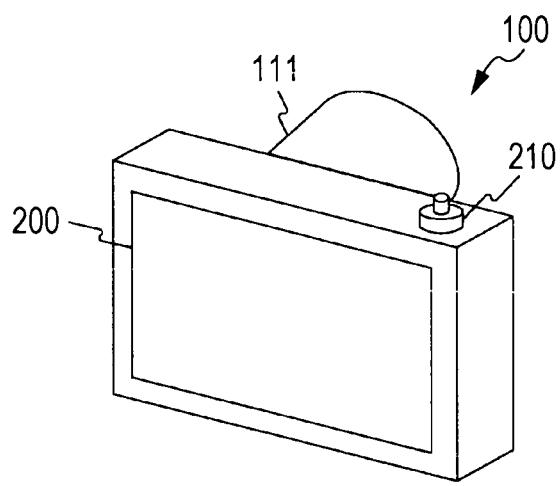

The display unit 141 is a display unit for displaying various images supplied from the output control unit 140. The display unit 141 sequentially displays the image generated by the imaging unit 112 (what we might call monitoring display), for example. Also, the display unit 141 displays the image corresponding to an image file stored in the recording medium 180, for example. Note that a display panel such as an organic EL (Electro Luminescence) panel or the like may be employed as the display unit 141, for example. Alternatively, a touch panel which the user can input operations by contacting or approaching his/her finger on the display surface may be employed, as illustrated in FIGS. 3A and 3B.

The external output unit 142 outputs various types of information supplied from the output control unit 140 to an external device.

The operation reception unit 151 is an operation reception unit for receiving operation input operated by the user, and outputs a signal according to the received operation input to the input control unit 152. For example, with the panoramic image imaging mode, operation members such as a shutter button 210 (shown in FIGS. 3A and 3B) for instructing start of imaging operation for generating a panoramic image, and so forth are provided to the imaging apparatus 100. Also, the operation reception unit 151 and display unit 141 may be configured integral with the input/output panel 200 as illustrated in FIGS. 3A and 3B.

The input control unit 152 performs control regarding operation input received by the operation reception unit 151.

The UI control unit 160 controls the display unit 141 to display various images for executing a function that the user intends. For example, the UI control unit 160 controls the display unit 141 to display an operation assistance image for assisting imaging operation of various menu screens or a panoramic image.

The playback control unit 170 performs playback control at the time of playing an image file stored in the recording medium 180. For example, the playback control unit 170 supplies an image file stored in the recording medium 180 to the image processing unit 130 via the temporary storage unit 114 to perform image processing such as image decoding processing and so forth, and displays the image subjected to the image processing on the display unit 141. Also, the playback control unit 170 controls an image playback order or display method at the time of display thereof.

The recording medium 180 is a recording device for storing the image supplied from the image processing unit 130 as an image file. Also, the recording medium 180 supplies a stored image file to the image processing unit 130 under control of the playback control unit 170. For example, various types of data such as image data in the JPEG format and so forth are stored in the recording medium 180. Note that the recording medium 180 may be built in the imaging apparatus 100, or may be mountable/detachable from the imaging apparatus 100. Also, various recording media may be employed as the recording medium 180, such as semiconductor memory, an optical recording medium, a magnetic disk, an HDD (Hard Disk Drive), and so forth. Note that recordable DVD (Digital Versatile Disk), recordable CD (Compact Disc), Blu-ray Disc (registered trademark), and so forth may be used as an optical recording medium, for example.

Functional Configuration Example of Imaging Apparatus

Figure 2:
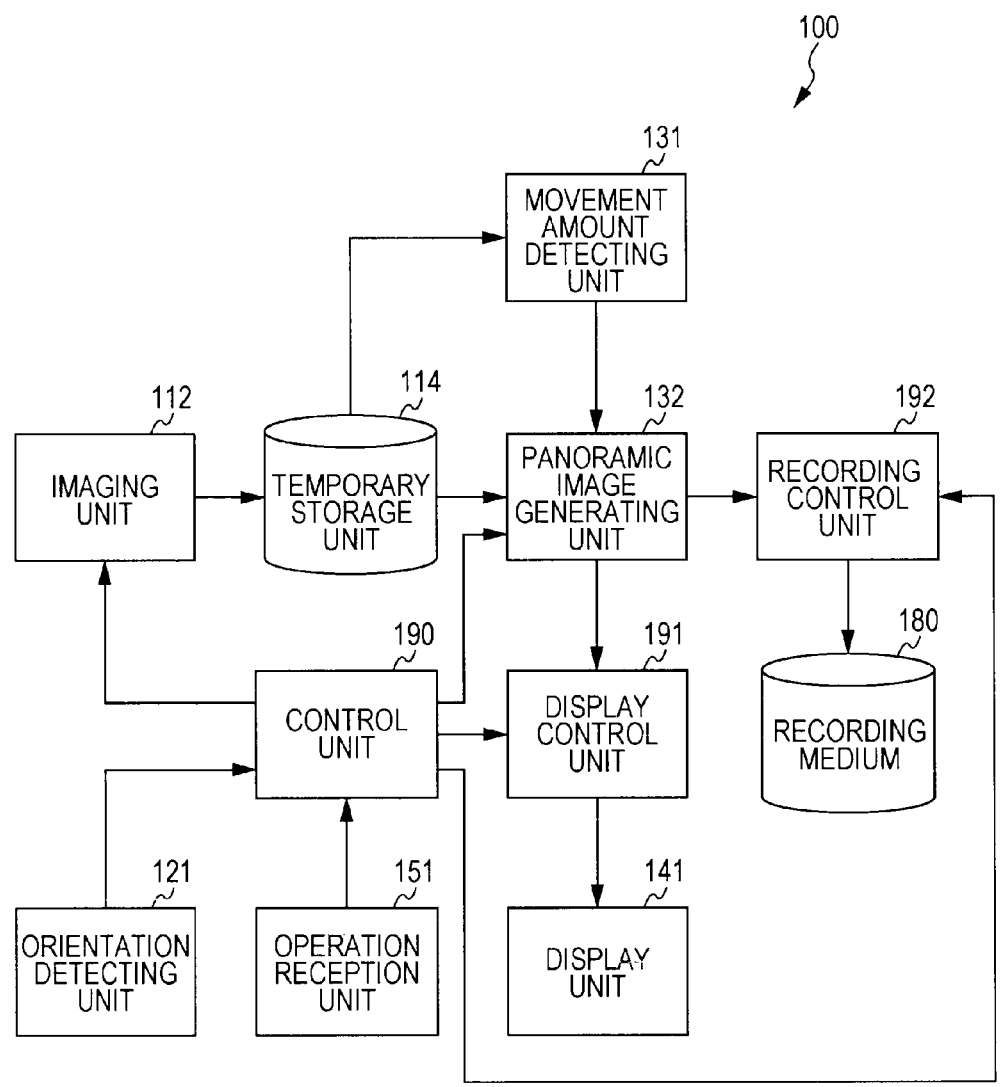
FIG. 2 is a block diagram illustrating a functional configuration example of the imaging apparatus according to the first embodiment of the present disclosure.

FIG. 2 is a block diagram illustrating a functional configuration example of the imaging apparatus 100 according to the first embodiment of the present disclosure. The imaging apparatus 100 includes the imaging unit 112, temporary storage unit 114, orientation detecting unit 121, movement amount detecting unit 131, and panoramic image generating unit 132. Also, the imaging apparatus 100 includes the display unit 141, operation reception unit 151, recording medium 180, control unit 190, display control unit 191, and recording control unit 192. Note that, in FIG. 2, of the units shown in FIG. 1, only portions principally relating to image processing and display processing at the time of imaging of a panoramic image are illustrated, and other portions are omitted.

The imaging unit 112 images a subject to generate an image under control of the control unit 190, and supplies the generated image to the temporary storage unit 114. Also, in the event that the panoramic image imaging mode has been set, the imaging unit 112 consecutively images a subject in chronological order to generate multiple images, and supplies the generated images to the temporary storage unit 114.

The temporary storage unit 114 is image memory in which the images generated by the imaging unit 112 are held, and supplies the held images to the movement amount detecting unit 131 and panoramic image generating unit 132.

The orientation detecting unit 121 detects change in the orientation of the imaging apparatus 100, and outputs orientation change information relating to the detected orientation change to the control unit 190. For example, the orientation detecting unit 121 detects change in the orientation of the imaging apparatus 100 which changes according to the rotational movement of the imaging apparatus 100 in a particular direction (e.g., horizontal direction) with a neighborhood position of the imaging apparatus 100 (e.g., backward position) as an axis.

The movement amount detecting unit 131 detects a movement amount and a movement direction between adjacent images at the time axis regarding the images held in the temporary storage unit 114, and outputs the detected movement amount and movement direction to the panoramic image generating unit 132. For example, the movement amount detecting unit 131 performs matching processing between pixels making up adjacent two images (i.e., matching processing for distinguishing the imaging regions of the same subject) to calculate the number of pixels moved between the images. With this matching processing, processing assuming that a subject basically remains stationary is performed. Note that, in the event that an object is included in a subject, a motion vector different from the motion vector of the entire image is detected, but the processing is performed with the motion vector corresponding to such an object being taken as out of detected objects. That is to say, only the motion vector corresponding to the movement of the entire image which occurs along with the movement of the imaging apparatus 100 (Global Motion Vector (GMV)) is detected. Note that the movement amount detecting unit 131 corresponds to the image processing unit 130 shown in FIG. 1.

The panoramic image generating unit 132 generates a panoramic image using the multiple images held in the temporary storage unit 114 under control of the control unit 190, and supplies the generated panoramic image to the display control unit 191 and recording control unit 192. For example, the panoramic image generating unit 132 calculates a region to be synthesized in each of the multiple images held in the temporary storage unit 114 based on the analysis results output from the control unit 190 (analysis results of the change amount of the orientation of the imaging apparatus 100). The panoramic image generating unit 132 extracts an image from the region to be synthesized of each of the multiple images, and synthesizes the extracted images to generate a panoramic image. In this case, the panoramic image generating unit 132 synthesizes the extracted images thereof in an overlapped manner based on the movement amount and movement direction output from the movement amount detecting unit 131 to generate a panoramic image. Also, the panoramic image generating unit 132 sequentially supplies an image for displaying an image generated by the imaging unit 112 and held in the temporary storage unit 114 as a through image to the display control unit 191. Note that the panoramic image generating unit 132 corresponds to the image processing unit 130 shown in FIG. 1.

The operation reception unit 151 is an operating unit for receiving operation input operated by the user, and outputs an operation signal corresponding to the received operation input to the control unit 190.

The control unit 190 controls the units of the imaging apparatus 100 based on the operation signal from the operation reception unit 151, and the orientation change information from the orientation detecting unit 121. For example, in the event of an imaging mode setting operation being received at the operation reception unit 151, the control unit 190 sets the imaging mode corresponding to the setting operation thereof. Note that, with the first embodiment of the present disclosure, description will be made regarding a case where a first imaging mode through a third imaging mode (illustrated in FIG. 7A) are set as the panoramic image imaging mode for generating a panoramic image, as an example. Also, in the event that a setting operation for the reference position (shown in FIG. 7B) has been received by the operation reception unit 151, the control unit 190 sets the reference position corresponding to the setting operation thereof.

Also, the control unit 190 determines a subject to be situated in the reference position in a panoramic image based on the operation signal from the operation reception unit 151. Specifically, the control unit 190 determines a subject that has been an imaging object of the imaging unit 112 at the time of a determination instructing operation (e.g., a pressing operation of the shutter button 210) by the user being received, to be a subject to be situated in the reference position. For example, in the event that the first imaging mode or second imaging mode has been set, the control unit 190 determines a subject to be situated in the reference position based on the user's operations before start of the panoramic image imaging operation. Also, in the event that the third imaging mode has been set, the control unit 190 determines a subject to be situated in the reference position based on the user's operations during the panoramic image imaging operation. For example, in the event that the first imaging mode has been set, the control unit 190 determines the rotation angle of the imaging apparatus 100 at the time of start of imaging operation with the orientation of the imaging apparatus 100 as a reference at the time of a determination instructing operation of a subject to be situated in the reference position being received, to be a start position. Also, in the event that one of the first though third imaging modes has been set, the control unit 190 determines the rotation angle of the imaging apparatus 100 at the time of end of the imaging operation with the orientation of the imaging apparatus 100 at the time of a determination instructing operation thereof being received as a reference, to be an end position.

Also, the control unit 190 performs imaging control of the imaging unit 112 based on the orientation change information output from the orientation detecting unit 121 so that the subject determined to a subject to be situated in the reference position in a panoramic image is situated in the reference position thereof. Specifically, in the event that the first imaging mode has been set, the control unit 190 determines the start position and end position of the panoramic image imaging operation so that the determined subject thereof is situated in the reference position. The control unit 190 then determines whether the imaging apparatus 100 having arrived at the start position or end position based on the orientation change information thereof, starts the imaging operation at the time of the imaging apparatus 100 having arrived at the start position, and ends the imaging operation at the time of the imaging apparatus 100 having arrived at the end position.

Also, in the event that the second imaging mode has been set, the control unit 190 starts the imaging operation thereof based on the user's operations for instructing start of the panoramic image imaging operation, and determines the end position of the imaging operation thereof so that the determined subject thereof is situated in the reference position. The control unit 190 then determines whether or not the imaging apparatus 100 has arrived at the end position based on the orientation change information thereof, and ends the imaging operation at the time of the imaging apparatus 100 arriving at the end position.

Also, in the event that the third imaging mode has been set, the control unit 190 determines the end position of the panoramic image imaging operation based on the start position of the panoramic image imaging operation, and the orientation of the imaging apparatus 100 at the time of determining a subject to be situated in the reference position in a panoramic image. In this case, the end position of the imaging operation thereof is determined so that the determined subject is situated in the reference position. The control unit 190 then determines whether or not the imaging apparatus 100 having arrived at the end position based on the orientation change information, and ends the imaging operation at the time of the imaging apparatus 100 arriving at the end position.

Also, in the event that the user's operations for determining a subject to be situated in the reference position in a panoramic image have been received, the control unit 190 performs control for displaying an operation assistance image for changing the orientation of the imaging apparatus 100 to the start position of the panoramic image imaging operation, on the display unit 141. Also, after the orientation of the imaging apparatus 100 changes to the start position thereof, the control unit 190 performs control for displaying an operation assistance image for changing the orientation of the imaging apparatus 100 to the end position of the panoramic image imaging operation, on the display unit 141.

Also, for example, the control unit 190 analyses the change amount (movement direction, movement amount, etc.) of the orientation of the imaging apparatus 100 based on the orientation change information output from the orientation detecting unit 121, and outputs the analysis results thereof to the panoramic image generating unit 132 and display control unit 191. Also, for example, after the generation processing of multiple images by the imaging unit 112 is ended, the control unit 190 performs control for displaying the panoramic image generated by the panoramic image generating unit 132 on the display unit 141. Note that the control unit 190 is an example of a determining unit and control unit described in the Summary.

The display control unit 191 displays the panoramic image generated by the panoramic image generating unit 132 on the display unit 141 under control of the control unit 190. For example, in the event that the user's operations for determining a subject to be situated in the reference position in a panoramic image have been received, the display control unit 191 displays an operation assistance image for changing the orientation of the imaging apparatus 100 to the start position of the panoramic image imaging operation, on the display unit 141. Also, after the orientation of the imaging apparatus 100 is changed to the start position thereof, the display control unit 191 displays an operation assistance image for changing the orientation of the imaging apparatus 100 to the end position of the panoramic image imaging operation, on the display unit 141.

The display unit 141 is a display unit for displaying the image supplied from the display control unit 191. Also, various menu screens and various images are displayed on the display unit 141.

The recording control unit 192 performs control for recording the panoramic image generated by the panoramic image generating unit 132 in the recording medium 180 under control of the control unit 190.

The recording medium 180 stores the panoramic image generated by the panoramic image generating unit 132 as an image file (image content).

Appearance Configuration Example of Imaging Apparatus

FIGS. 3A and 3B are perspective views illustrating the appearance of the imaging apparatus 100 according to the first embodiment of the present disclosure. FIG. 3A is a perspective view illustrating the appearance on the front (i.e., face where the lens to be directed to a subject is provided) side of the imaging apparatus 100. Also, FIG. 3B is a perspective view illustrating the appearance on the back (i.e., face where the input/output panel 200 to be directed to a subject is provided) side of the imaging apparatus 100.

The imaging apparatus 100 includes the lens unit 111, shutter button 210, and input/output panel 200. The imaging apparatus 100 is an imaging apparatus whereby a subject can be imaged to generate an image (image data), and this generated image can be recorded in the recording medium 180 (shown in FIG. 1) as an image content (still image content or moving image content). Note that other operating members such as a power switch, a mode changeover switch, a zoom button, and so forth are provided to the imaging apparatus 100, but drawing and description thereof will be omitted.

The shutter button 210 is a button to be pressed by the user at the time of recording an image (image data) generated by imaging a subject as an image content. For example, in the event that a still image imaging mode for recording a still image has been set, when the shutter button 210 is half-pressed, focus control for performing autofocus is performed. Also, when the shutter button 210 is full-pressed, focus control thereof is performed, and the image imaged by the imaging unit 112 at the time of this full-pressing is recorded in the recording medium 180 in a correlated manner. Also, the pressing operation of the shutter button 210 in the event that the panoramic image imaging mode has been set will be described in detail with reference to FIGS. 8A through 23B and others.

The input/output panel 200 displays various images, and also receives operation input from the user by detecting a contact operation on the input/output panel 200. The input/output panel 200 is realized by a touch panel, for example. Note that the input/output panel 200 corresponds to the display unit 141 and operation reception unit 151 shown in FIGS. 1 and 2.

Display Screen Example when Setting Panoramic Image Imaging Mode

Figure 4:
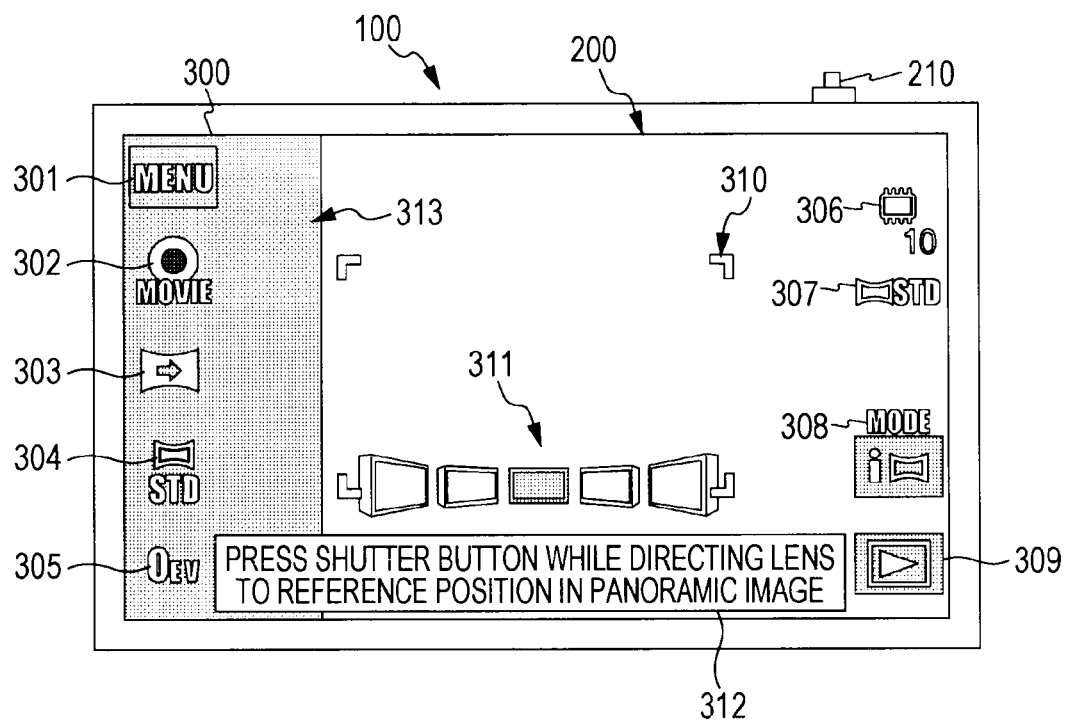
FIG. 4 is a diagram illustrating a display screen example to be displayed on an input/output panel according to the first embodiment of the present disclosure.

FIG. 4 is a diagram illustrating a display screen example to be displayed on the input/output panel 200 according to the first embodiment of the present disclosure. With the display screen 300 shown in FIG. 4, icons (301 through 305) displayed on the left side are icons principally used at the time of performing setting operations, and icons (306 through 309) displayed on the right side are icons principally representing the current state and so forth.

A transition button 301 for a menu screen is a button to be pressed at the time of making a transition to the menu screen. Specifically, upon the transition button 301 for the menu screen being pressed, the menu screen is displayed on the input/output panel 200.

A transition button 302 for a moving image imaging mode is an icon to be pressed at the time of setting the moving image imaging mode. Specifically, upon the transition button 302 for the moving image imaging mode being pressed, the moving image imaging mode is set, and imaging operation of a moving image (taking of a moving image) may be performed.

A swing direction setting button 303 is a button to be pressed at the time of setting a swing direction in the event that the panoramic image imaging mode has been set. Also, a marker corresponding to a swing direction that has been set is displayed as a swing direction setting button 303. FIG. 4 illustrates a case where a setting has been set so that a swing operation is performed from the left to the right. Note that, a swing direction setting screen 320 to be displayed in the event that the swing direction setting button 303 has been pressed will be described in detail with reference to FIG. 5A. Note that, with the first embodiment of the present disclosure, description will be made with reference to the rotation angle of the imaging apparatus 100 in a particular direction (e.g., horizontal direction) with the current position of the imaging apparatus 100 (a neighborhood position of the imaging apparatus 100 (e.g., backward position)) being taken as an axis, as a swing operation. Also, the operation direction thereof will be referred to as swing direction.

An image size setting button 304 is a button to be pressed at the time of setting an image size in the swing direction in the event that the panoramic image imaging mode has been set. With the first embodiment of the present disclosure, an example is shown wherein standard (180 degrees) and wide (240 degrees) are set as an image size. Also, a marker corresponding to the image size set as the image size setting button 304 is displayed. FIG. 4 illustrates a case where standard (STD) has been set. Also, the swing direction setting button 303 and image size setting button 304 are displayed only in the event that the panoramic image imaging mode has been set. Note that an image size setting screen 330 to be displayed when the image size setting button 304 is pressed will be described in detail with reference to FIG. 5B.

An exposure value setting button 305 is a button to be pressed at the time of setting an exposure value (EV value). Specifically, upon the exposure value setting button 305 being pressed, a setting screen for setting an exposure value is displayed.

A number-of-recordable panoramic images informing icon 306 is an icon representing the number of panoramic images which can be recorded by memory (e.g., recording medium 180) housed in the imaging apparatus 100. For example, as the number-of-recordable panoramic images informing icon 306, a marker schematically representing memory, and a number "10" (situated on the lower right portion of the marker representing memory) indicating the number of recordable panoramic images are displayed.

A panoramic image size informing icon 307 is an icon representing the image size in the swing direction in the event that the panoramic image imaging mode has been set. Specifically, a marker representing the image size set after pressing of the image size setting button 304 is displayed.

A setting mode informing icon 308 is an icon representing the currently set mode. For example, a marker representing one of the playback mode, and imaging mode (still image imaging mode, panoramic image imaging mode, and moving image imaging mode). Note that FIG. 4 illustrates a marker in the event that the panoramic image imaging mode has been set as the setting mode informing icon 308.

A transition button 309 for the playback mode is a button to be pressed at the time of changing to the playback mode. Specifically, upon the transition button 309 for the playback mode being pressed, the playback mode is set.

A focus frame 310 is a frame for specifying an object to be focused (focused object) of subjects displayed on the input/output panel 200, and is situated near the center of the display screen 300 as four white brackets. Specifically, of subjects included in the frame of the focus frame 310, one or multiple subjects are focused.

A panorama imaging operation operational assistance image 311 is an operational assistance image for informing the user of the swing direction. Specifically, the panorama imaging operation operational assistance image 311 is displayed in the event that the panoramic image imaging mode has been set, and is made up of five cameras virtually situated in the shooting position of a panoramic image. Also, the panorama imaging operation operational assistance image 311 informs the swing direction set in the panoramic image imaging mode (swing direction set after pressing the swing direction setting button 303) by display switching of the five cameras. For example, let us assume a case where a setting for swinging the imaging apparatus 100 from the left to the right has been set. In this case, one of the five cameras making up the panorama imaging operation operational assistance image 311 is sequentially switched to a particular color toward from the left to the right. After the right-edge camera of the five cameras is switched to a particular color, the left-edge camera is switched to a particular color. Hereafter, switching display of a camera to a particular color is continuously performed in the same way. FIG. 4 illustrates a state in which the camera in the middle is set to a particular color. Note that the panorama imaging operation operational assistance image 311 is eliminated when a start instructing operation (shutter pressing operation) for starting the panoramic image imaging operation is performed.

A message display region 312 is a region for displaying a message for assisting operations as to the user.

Notification information 313 is a region for notifying the user of a subject portion that may not be included in a panoramic image in the event that the panoramic image imaging mode has been set. Specifically, the notification information 313 is set to be darkish overall, whereby a subject portion that may not be included in a panoramic image can be notified to the user. For example, in the initial state of the swing operation in the panoramic image imaging mode, with regard to a subject equivalent to the left edge of the display screen 300, the image thereof is not generated, and is not included in the panoramic image. Therefore, as shown in FIG. 4, in the initial state of the swing operation in the panoramic image imaging mode, the notification information 313 is displayed on the left edge of the display screen 300. Also, according to the swing operation in the panoramic image imaging mode, the notification information 313 is moved from the left side to the right side. In this case, the size of the width of the notification information 313 is changed according to the movement thereof.

Setting Screen Example when Setting Swing Direction and Image Size

Figure 5A:
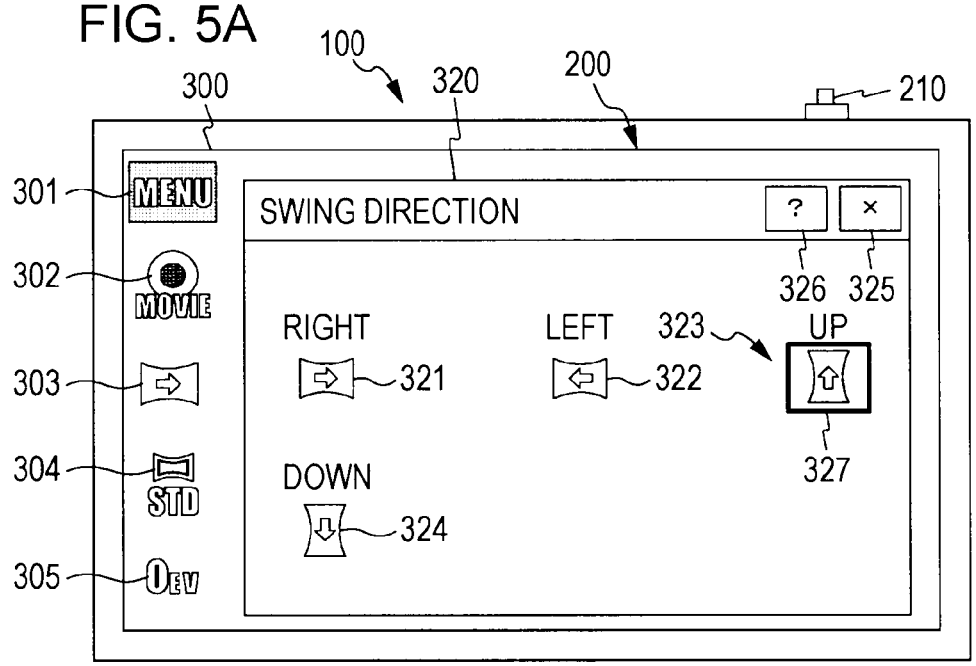
FIGS. 5A and 5B are diagrams illustrating a setting screen example to be displayed on the input/output panel according to the first embodiment of the present disclosure.
Figure 5B:
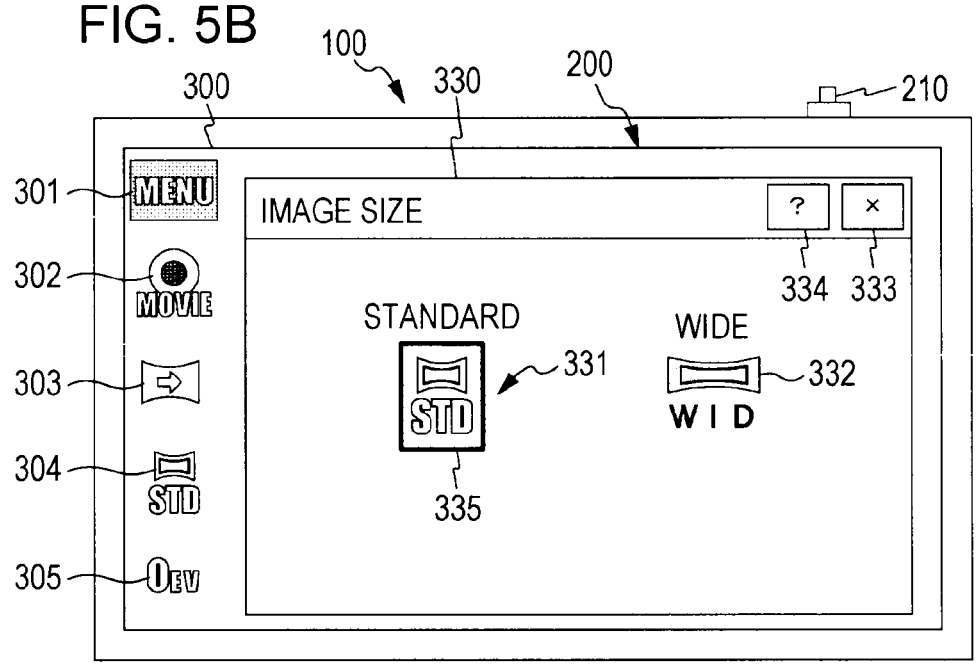

FIGS. 5A and 5B are diagrams illustrating a setting screen example to be displayed on the input/output panel 200 according to the first embodiment of the present disclosure. FIG. 5A illustrates the swing direction setting screen 320. The swing direction setting screen 320 is, with the display screen 300 shown in FIG. 4, a screen to be displayed overlapped with the display screen 300 after the swing direction setting button 303 is pressed.

With the swing direction setting screen 320, swing direction selecting buttons 321 through 324, a "x" button 325 and a "?" button 326 are provided.

The swing direction selecting buttons 321 through 324 are buttons to be pressed at the time of a direction specified by an arrow appended within each of the markers being selected as the swing direction. For example, in the event of setting to perform the swing operation from the left to the right, the swing direction setting button 321 is pressed. Also, in the event that a selection operation by the user has been performed, a frame 327 to the effect that is appended.

The "x" button 325 is a button to be pressed at the time of eliminating the swing direction setting screen 320, and the "?" button 326 is a button to be pressed at the time of using a help function.

FIG. 5B illustrates the image size setting screen 330. The image size setting screen 330 is a screen to be displayed overlapped with the display screen 300 after the image size setting button 304 is pressed with the display screen 300 shown in FIG. 4. With the image setting screen 330, the image size selecting buttons 331 and 332, "x" button 333, and "?" button 334 are provided.

The image size selecting buttons 331 and 332 are buttons to be pressed at the time of selecting the image size specified by a letter appended in each of the markers. For example, in the event of selecting standard (180 degrees), the image size selecting 331 is pressed, and in the event of selecting wide (240 degrees), the image size selecting button 332 is pressed. Also, in the event that a selection operation by the user has been performed, a frame 335 to the effect that is appended. Note that, in this example, an example is illustrated wherein the user selects a desired image size out of the two kinds of image sizes, but the user may select a desired image size out of three or more kinds of image sizes. Alternatively, the image size may be set by input operation by the user (e.g., input operation of the numeric value of an image size (angle)).

The "x" button 333 is a button to be pressed at the time of eliminating the image size setting screen 330, and the "?" button 334 is a button to be pressed at the time of using the help function.

Imaging Operation Example of Panoramic Image

Next, description will be made regarding a case where imaging operation is performed using the imaging apparatus 100.

Figure 6A:
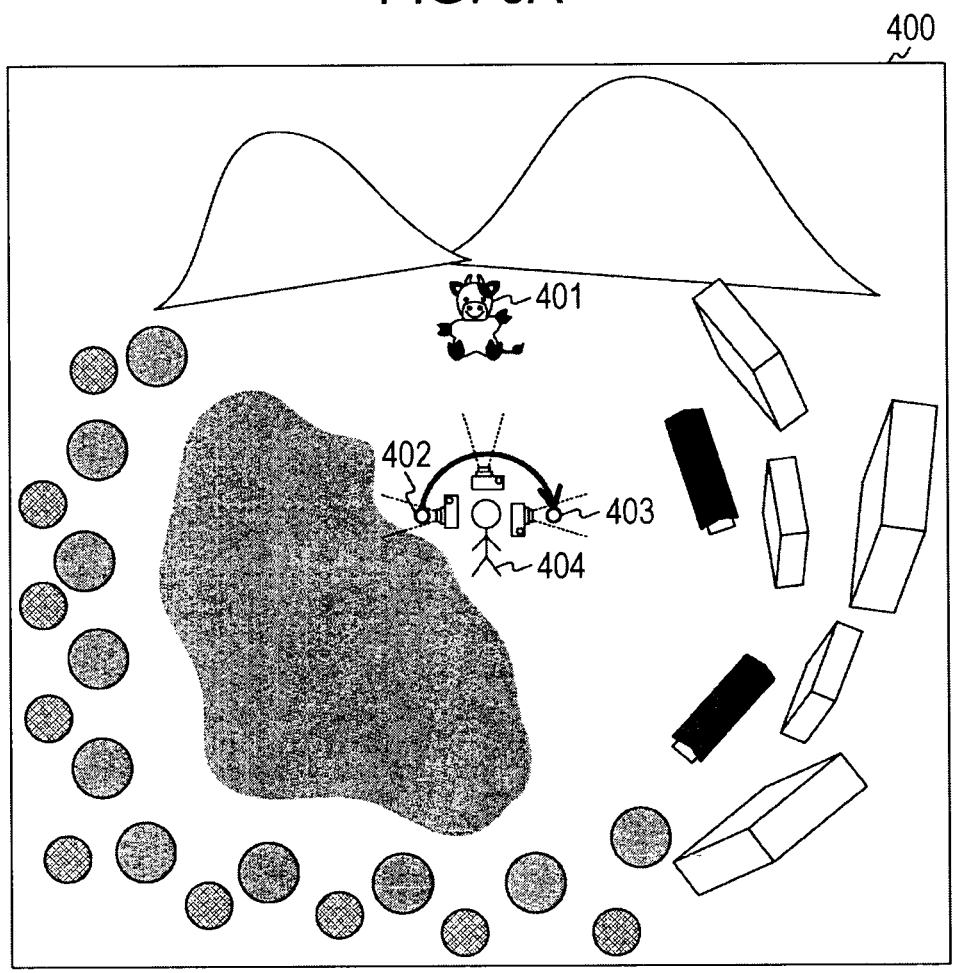
FIGS. 6A and 6B are diagrams illustrating relationship between imaging operation in the event of generating a panoramic image using the imaging apparatus according to the first embodiment of the present disclosure, and a panoramic image generated by this imaging operation.
Figure 6B:
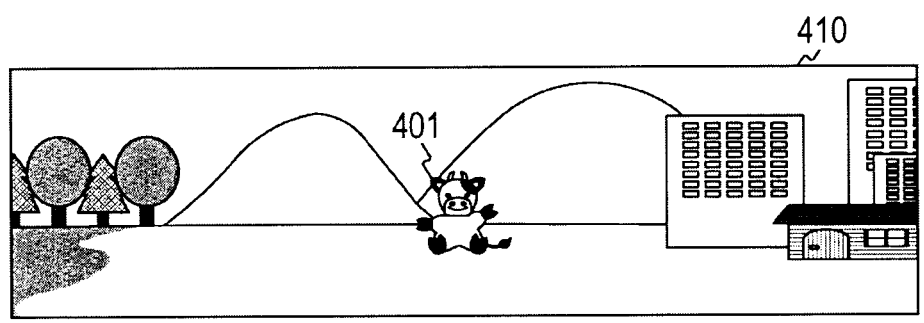

FIGS. 6A and 6B are diagrams illustrating a relation between imaging operation in the event of generating a panoramic image using the imaging apparatus 100 according to the first embodiment of the present disclosure, and a panoramic image generated by this imaging operation.

FIG. 6A illustrates a top view when a place 400 serving as an imaging object is viewed from above in the event of generating a panoramic image using the imaging apparatus 100. The place 400 is a place including mountains, buildings, trees, a lake, a cattle image 401, and so forth, and in FIG. 6A, in order to simplify description, these are illustrated in a simplified manner. Also, FIG. 6A illustrates an example wherein a swing operation from the left to the right is set as the swing direction, and standard (180 degrees) is set as the image size. Also, FIG. 6A illustrates an example wherein the user operates the imaging apparatus 100 to generate a panoramic image so that the position of the cattle image 401 becomes the center position of the panoramic image.

FIG. 6B illustrates a panoramic image 410 generated by the imaging operation shown in FIG. 6A. Specifically, the panoramic image 410 is a panoramic image where the cattle image 401 is situated in the center position. In this way, this assumes a case where a user 404 who wanders around the lakeside desires a panoramic image where the cattle image 401 is situated at the center position. In this case, for example, the user 404 has to start the panoramic image imaging operation at the start position 402 of the imaging operation, and has to end the panoramic image imaging operation at the end position 403 of the imaging operation.

In order to perform imaging operation in this way, the user 404 has to look over the circumference in the place 400, recognize the start position 402 and end position 403, and start imaging operation. However, it is assumed to be difficult for the user 400 to look over the circumference in the place 400, and to accurately recognize the start position 402 and end position 403 by visual observation. Also, in the event that it is difficult to accurately recognize the start position 402 and end position 403, it is difficult to generate a panoramic image that the user 404 desires (panoramic image where the cattle image 401 is situated in the center position). In this case, the user 404 has to select whether imaging operation is performed again after confirming the start position 402 and end position 403 again, or the user 404 satisfies a panoramic image that the user 404 does not intend (i.e., panoramic image where the cattle image 401 is not situated in the center position).

Therefore, with the first embodiment of the present disclosure, an example will be shown wherein the image control of the imaging unit 112 is performed so that a subject determined to be a subject to be situated in the reference position in a panoramic image is situated in the reference position.

Setting Screen Example of Imaging Conditions

Figure 7A:
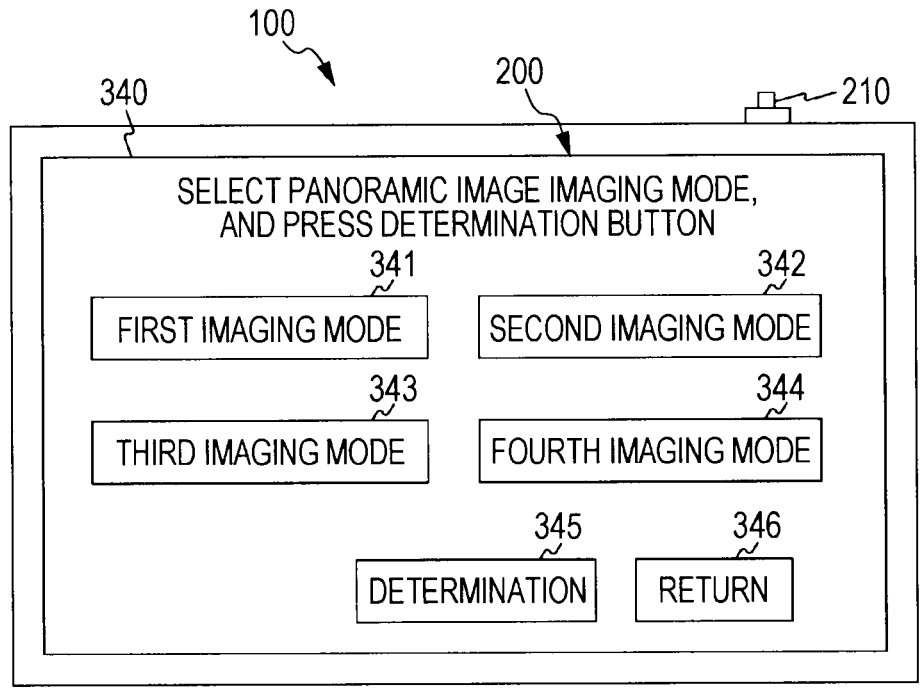
FIGS. 7A and 7B are diagrams illustrating a setting screen example to be displayed on the input/output panel according to the first embodiment of the present disclosure.
Figure 7B:
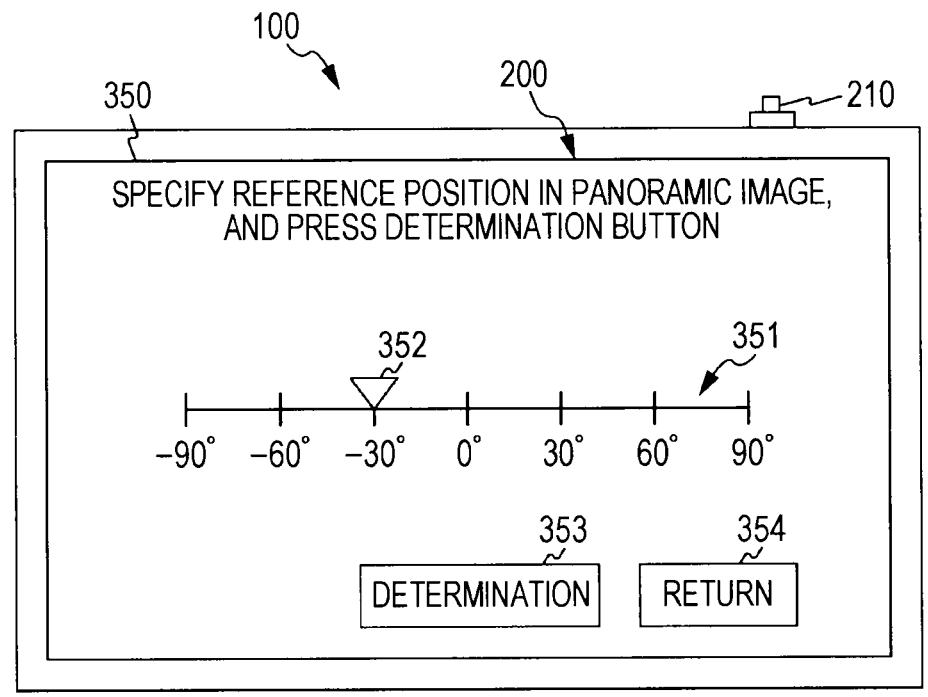

FIGS. 7A and 7B are diagrams illustrating a setting screen example to be displayed on the input/output panel 200 according to the first embodiment of the present disclosure. FIG. 7A illustrates the panoramic image imaging mode setting screen 340. The panoramic image imaging mode setting screen 340 is a screen to be displayed on the input/output panel 200 at the time of setting the type of the panoramic image imaging mode. For example, the panoramic image imaging mode setting screen 340 is displayed immediately after a setting operation of the panoramic image imaging mode for recording a panoramic image is performed. With the panoramic image imaging mode setting screen 340, first through fourth imaging mode setting buttons 341 through 344, a determination button 345, and a return button 346 are provided.

The first through fourth imaging mode setting buttons 341 through 344 are buttons to be pressed when setting the type of the panoramic image imaging mode. The first imaging mode setting button 341 is a button to be pressed when setting the first imaging mode. Note that the first imaging mode will be described in detail with reference to FIGS. 8A through 14B. The second imaging mode setting button 342 is a button to be pressed when setting the second imaging mode. Note that the second imaging mode will be described in detail with reference to FIGS. 16A through 19B. The third imaging mode setting button 343 is a button to be pressed when setting the third imaging mode. Note that the third imaging mode will be described in detail with reference to FIGS. 20A through 23B. The fourth imaging mode setting button 344 is a button to be pressed when setting the fourth imaging mode. Note that the fourth imaging mode will be described in detail in the second embodiment of the present disclosure.

The determination button 345 is a button to be pressed when a pressing operation for selecting one of the first through fourth imaging modes is performed, and then selection thereof is determined. Also, information relating to the determined imaging mode by the pressing operation of the determination button 345 (imaging mode information) is output to the control unit 190 for holding. The return button 346 is a button to be pressed in the event of returning to the display screen immediately before the current screen, for example.

FIG. 7B illustrates a reference position setting screen 350. The reference position setting screen 350 is a screen to be displayed on the input/output panel 200 when setting the reference position in a panoramic image. For example, the reference position setting screen 350 is displayed immediately after the determination button 350 is pressed with the panoramic image imaging mode setting screen 340 shown in FIG. 7A. With the reference position setting screen 350, a reference position specifying bar 351, a specified position 352, a determination 353, and a return button 354 are provided.

The reference position specifying bar 351 is a bar used for setting the reference position in a panoramic image, and displayed overlapped with the specified position 352. For example, with the reference position specifying bar 351, the user moves the reference position specifying bar 351 to a desired reference position, whereby the reference position in a panoramic image can be specified. For example, in the event that standard (180 degrees) has been set as the image size, "−90°" is displayed on one of the edges of the reference position specifying bar 351, and "90°" is displayed on the other edge. Also, with the reference position specifying bar 351, "−60°", "−30°", "0°", "30°", and "60°" are displayed with a certain interval. Here, the reference position means the position in a panoramic image where the user intends to situate a desired subject. For example, in the event that the horizontal direction has been set as the swing direction, a position in the horizontal direction in a panoramic image becomes the reference position.

Also, this example shows an example wherein the reference position in a panoramic image is set by the user's operations, but the reference position thereof may be set beforehand. For example, the center position (i.e., position of 0°) may be set as the reference position.

The determination button 353 is a button to be pressed when a specifying operation for specifying the reference position in a panoramic image is performed, and then specification thereof is determined. Also, information relating to the determined reference position by the pressing operation of the determination button 353 (reference position information) is output to the control unit 190 for holding. The return button 354 is a button to be pressed in the event of returning to the display screen immediately before the current screen, for example.

Imaging Control Example in First Imaging Mode

FIGS. 8A through 14B are diagrams schematically illustrating a transition example of the orientation of the imaging apparatus 100 according to the first embodiment of the present disclosure, and a display screen displayed on the input/output panel 200. Specifically, a transition example of the orientation of the imaging apparatus 100 is illustrated in FIGS. 8A, 9A, 10A, 11A, 12A, 13A, and 14A, and a transition example of a display screen displayed on the input/output panel 200 according to the change in the orientation of the image apparatus 100 is illustrated in FIGS. 8B, 9B, 10B, 11B, 12B, 13B, and 14B. Also, FIGS. 8A through 14B illustrate an imaging operation example in the event that the first imaging mode has been set, a swing operation from the left to the right has been set as the swing direction, and standard (180 degrees) has been set as the image size. Also, FIGS. 8A through 14B illustrate an imaging operation example in the event that the center position (i.e., the position of "0°" on the reference position specifying bar 351) has been set as the reference position in a panoramic image.

Figure 8A:
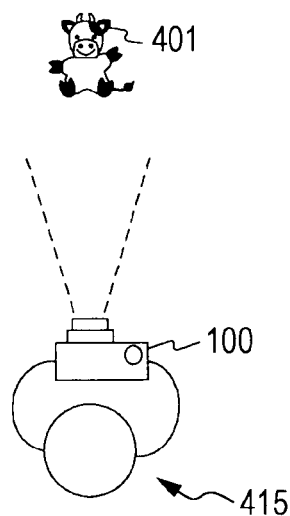
FIGS. 8A and 8B are diagrams schematically illustrating a transition example of the orientation of the imaging apparatus according to the first embodiment of the present disclosure, and a display screen to be displayed on the input/output panel.

FIG. 8A illustrates a case where the imaging apparatus 100, and a user 415 holding the imaging apparatus 100 in both hands are viewed from above, in a simplified manner. In this case, let us say that the user 415 confirms the reference position (center position) in a panoramic image while viewing a subject displayed on the input/output panel 200.

Figure 8B:
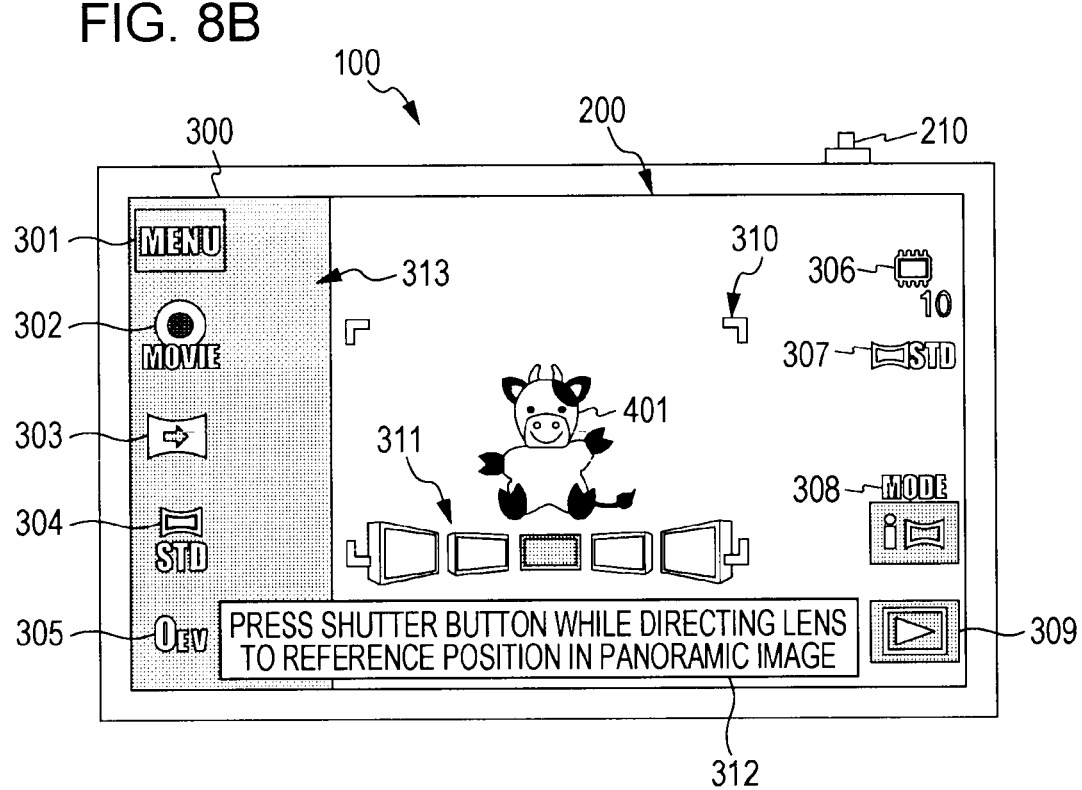

FIG. 8B illustrates the display screen 300 to be displayed before a determination operation for determining a subject to be situated in the reference position in a panoramic image is performed. The display screen 300 is the same as the display screen 300 shown in FIG. 4, wherein "PRESS SHUTTER BUTTON WHILE DIRECTING LENS TO REFERENCE POSITION IN PANORAMIC IMAGE" is displayed in the message display region 312. Also, with the display screen 300, a subject that is the current imaging object is displayed as a through image. Also, with the first embodiment of the present disclosure, an example is shown wherein a start instructing operation for imaging the operation of a panoramic image, and a determining operation of a subject to be situated in the reference position in the first imaging mode are performed by a pressing operation of the shutter button 210.

Specifically, in the event that the first imaging mode has been set, the user 415 may start imaging operation without accurately recognizing the start position and end position in a panoramic image by determining a subject to be situated in the reference position in the panoramic image.

Figure 9A:
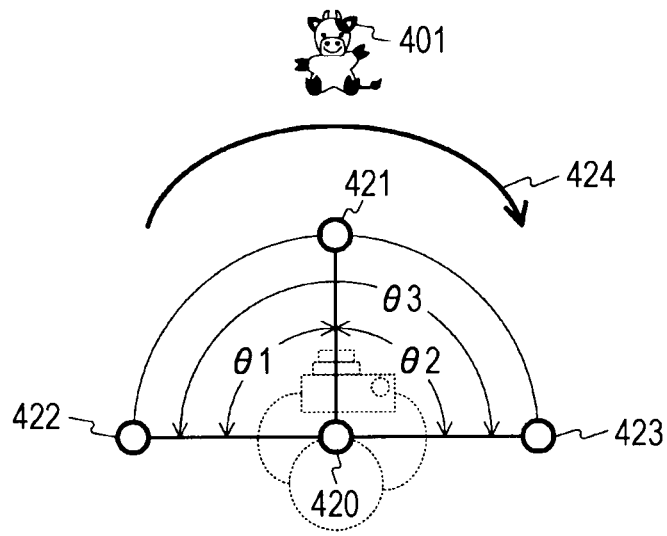
FIGS. 9A and 9B are diagrams schematically illustrating a transition example of the orientation of the imaging apparatus according to the first embodiment of the present disclosure, and a display screen to be displayed on the input/output panel.

FIG. 9A illustrates a case where the user 415 has pressed the shutter button 210 in the state shown in FIG. 8A, in a simplified manner. Also, in this example, let us say that the image size that has been set is θ3 (=180 degrees), and an angle from the reference position 421 to the start position 422 of the imaging operation is θ1 (=90 degrees), and an angle from the reference position 421 to the end position 423 of the imaging operation is θ2 (=90 degrees). Note that θ1 and θ2 are values that are determined according to the reference position. For example, in the event that the center position has been set as the reference position, θ1=θ3/2 and θ2=θ3/2 hold. Also, let us assume a case where standard (180 degrees) has been set as the image size, and a position other than the center position has been set as the reference position (e.g., the position of "30°" in the reference position specifying bar 351). In this case, θ1=θ3×(⅔) and θ2=θ3×(⅓) hold.

For example, let us assume a case where the user has pressed the shutter button 210 in the state shown in FIG. 8A. In this case, the start position 422 and end position 423 of the imaging operation is determined based on the image size θ3 that has been set with the optical-axis direction from a position 420 at the time of pressing thereof (the direction of the reference position 421) being taken as a reference. Specifically, as shown in FIG. 9A, the position 420 at the time of pressing the shutter button 210 is taken as the rotation axis, and a position rotated by the angle θ1 in a direction opposite from the swing direction is determined to be the start position 422 of the imaging operation. Similarly, the position 420 at the time of pressing the shutter button 210 is taken as the rotation axis, and a position rotated by the angle θ2 in the swing direction is determined to be the end position 423 of the imaging operation. Note that the user 415 and the imaging apparatus 100 are indicated with a dotted line in FIG. 9A.

Figure 9B:
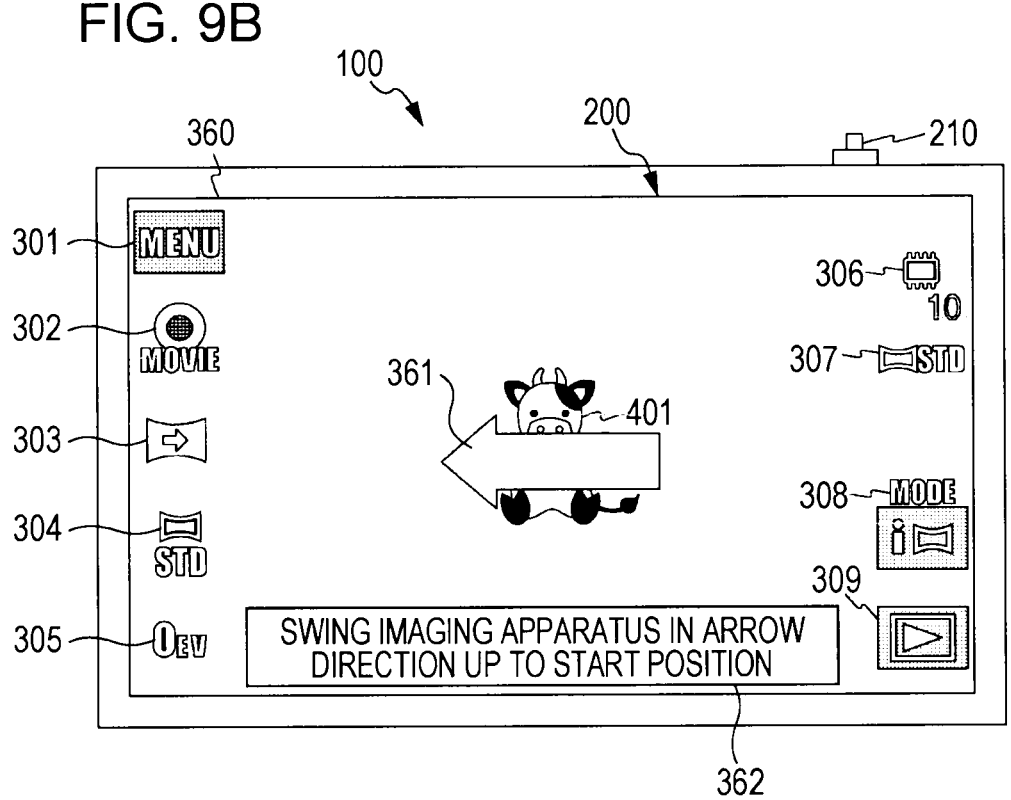

FIG. 9B illustrates a display screen 360 to be displayed at the time of a determination operation for determining the reference position in a panoramic image being performed. The display screen 360 is a display screen wherein, with the display screen shown in FIG. 4, the focus frame 310 and panorama imaging operation operational assistance image 311 are eliminated, and an arrow 361 is displayed. Also, "SWING IMAGING APPARATUS IN ARROW DIRECTION UP TO START POSITION" is displayed in the message region 362. In this way, after pressing the shutter button 210, the display screen 360 is displayed on the input/output panel 200, whereby the user 415 can readily move the imaging apparatus 100 to the star position 422 in accordance with the display screen 360. Also, a display screen example that is displayed on the input/output panel 200 after the user 415 starts a swing operation will be illustrated in FIG. 10B and others.

Figure 10A:
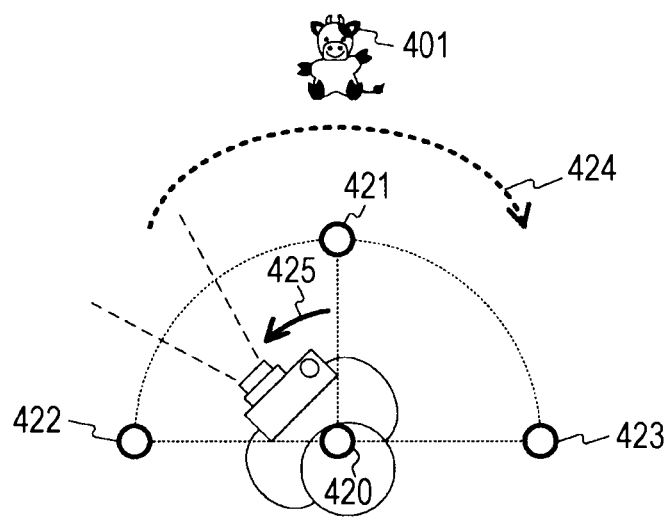
FIGS. 10A and 10B are diagrams schematically illustrating a transition example of the orientation of the imaging apparatus according to the first embodiment of the present disclosure, and a display screen to be displayed on the input/output panel.

FIG. 10A illustrates a case where the user 415 has moved the imaging apparatus 100 in the opposite direction of a swing direction 424 in the state shown in FIG. 9A, in a simplified manner.

Figure 10B:
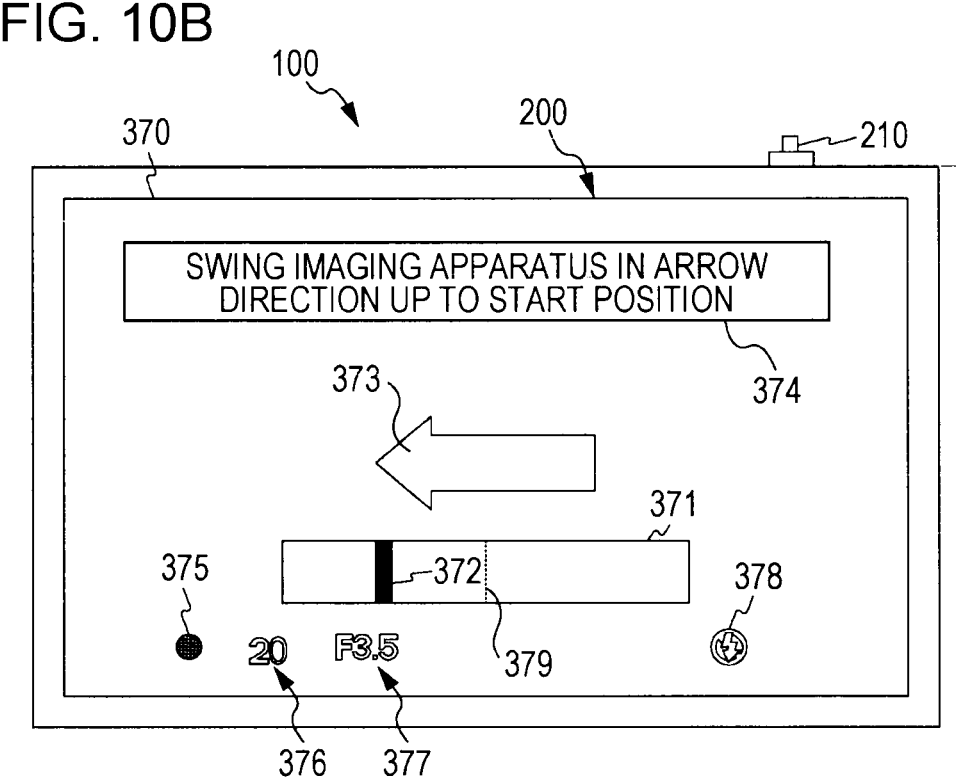

FIG. 10B illustrates a swing operation assistance screen 370 to be displayed on the input/output panel 200 after the user 415 moves the imaging apparatus 100 in an arrow 425 direction. Note that the movement of the imaging apparatus 100 after pressing the shutter button 210 is determined by the control unit 190 based on the orientation change information from the orientation detecting unit 121.

With the swing operation assistance screen 370, a swing operation assistance image display region 371, an arrow 373, and a message display region 374 are provided. Also, with the swing operation assistance screen 370, a focusing informing icon 375, a shutter speed informing icon 376, an F value informing icon 377, and a flash prohibition icon 378 are provided.

The swing operation assistance image display region 371 is a bar graph for informing the user of the user's operation relating to the panoramic image imaging operation (swing operation of the imaging apparatus 100). Specifically, with the swing operation assistance image display region 371, a current operation position 372 as to the entire operation amount for the panoramic image imaging mode (e.g., rotation speed of a swing operation) is displayed. For example, with regard to the swing operation assistance image display region 371, based on the detection results of a movement amount and a movement direction between adjacent images at the time axis, the control unit 190 calculates the current operation amount, whereby a display state thereof can be changed based on this current operation amount. As a movement amount and a movement direction thereof, a motion vector corresponding to the motion of the entire image that occurs along with the movement of the imaging apparatus 100 (Global Motion Vector (GMV)) is detected. Also, based on the angular velocity detected by the orientation detecting unit 121, the control unit 190 may calculate the current operation amount. Alternatively, the control unit 190 may calculate the current operation amount using the detection results of the movement amount and movement direction thereof, and the angular velocity detected by the orientation detecting unit 121. In this way, the user can readily recognize how much longer the user has to perform the swing operation by displaying the swing operation assistance image display region 371 in this way.

Also, the operation position 372 is displayed with blinking in the center position in the swing operation assistance image display region 371 immediately after the user 415 starts the swing operation. Also, the operation position 372 that is displayed with blinking advances in the left direction according to the swing operation of the imaging apparatus 100 by the user (swing operation in the arrow 425 direction). The operation position 372 is displayed with blinking until the imaging apparatus 100 arrives at the start position 422 by the swing operation of the user 415. The operation position 372 is displayed with blinking in this way, thereby informing the user that this movement is not during the panoramic image imaging operation, but a movement for preparation thereof. Also, in the event that the imaging apparatus 100 has arrived at the start position 422, and a start instructing operation of the panoramic image imaging operation by the user 415 has been performed, the display mode of the operation position 372 is changed from blinking display to normal display (constant lighting). The display mode of the operation position 372 is changed in this way, whereby the user can readily recognize whether the current state is during preparation for the panoramic image imaging operation, or during the panoramic image imaging operation.

Also, with the center position in the swing operation assistance image display region 371, a reference position mark 379 representing the reference position is displayed. With this example, a dotted line is appended to the swing operation assistance image display region 371 as the reference position mark 379. Also, with this example, the image size that has been set is 180 degrees, and the center position has been set as the reference position, and accordingly, the reference position mark 379 is appended to the center position in the swing operation assistance image display region 371. For example, let us assume a case where a position other than the center position (e.g., the position of "30°" in the reference position specifying bar 351) has been set. In this case, the reference position mark 379 is appended to a right-wards position in the swing operation assistance image display region 371 (position of 4/6 (=(90°+30°)/180° from the left edge in the event that the length in the longitudinal direction is taken as 1).

The arrow 373 is an arrow for assisting the user's operations relating to the panoramic image imaging operation (the swing operation of the imaging apparatus 100). That is to say, the user swings the imaging apparatus 100 in a direction that the arrow 373 specifies, whereby the panoramic image imaging operation, and preparation thereof can be performed.

The message display region 374 is a region where a message for assisting the user's operations relating to the panoramic image imaging operation (the swing operation of the imaging apparatus 100) is displayed.

The focusing informing icon 375 is an icon for informing the user whether or not a subject positioned in a focus frame comes into focus. Specifically, in the event that the subject comes into focus, the focusing informing icon 375 is changed to green, and in the event that the subject does not come into focus, the green thereof is blinked.

The shutter speed informing icon 376 is an icon for informing the user of the shutter speed that has currently been set. For example, as shown in FIG. 10B, in the event that "20" is displayed as the shutter speed informing icon 376, this means that the shutter speed that has currently been set is "1/20".

The F value informing icon 377 is an icon for informing the user of an F value that has currently be set. For example, as shown in FIG. 10B, in the event that "F3.5" is displayed as the F value informing icon 377, this means that the F value that has currently been set is "F3.5".

The flash prohibition icon 378 is an icon for informing the user that using the flash is prohibited in the imaging mode that has currently been set. Specifically, only in the event that using the flash is prohibited in the imaging mode that has currently been set, the flash prohibition icon 378 is displayed, and in the event that using the flash is not prohibited in the imaging mode that has currently been set, the flash prohibition icon 378 is not displayed. For example, in the event that the panoramic image imaging mode has been set, using the flash is prohibited, and accordingly, the flash prohibition icon 378 is displayed.

Figure 11A:
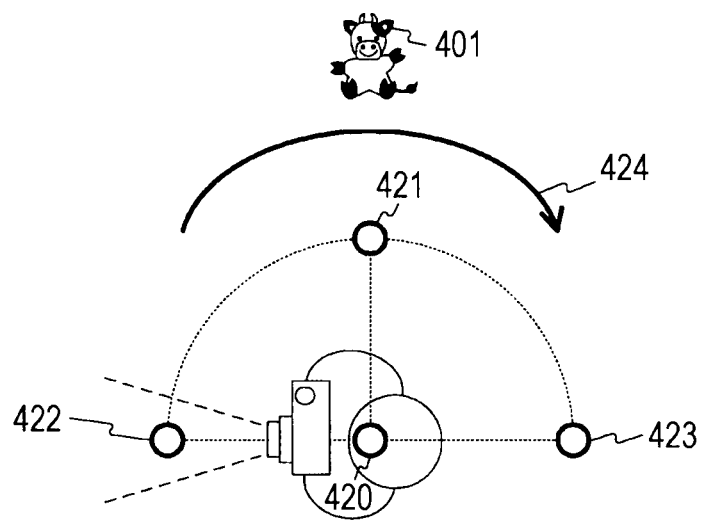
FIGS. 11A and 11B are diagrams schematically illustrating a transition example of the orientation of the imaging apparatus according to the first embodiment of the present disclosure, and a display screen to be displayed on the input/output panel.

FIG. 11A illustrates a case where the user 415 has moved the imaging apparatus 100 to the start position 422 of the imaging operation, in a simplified manner.

Figure 11B:
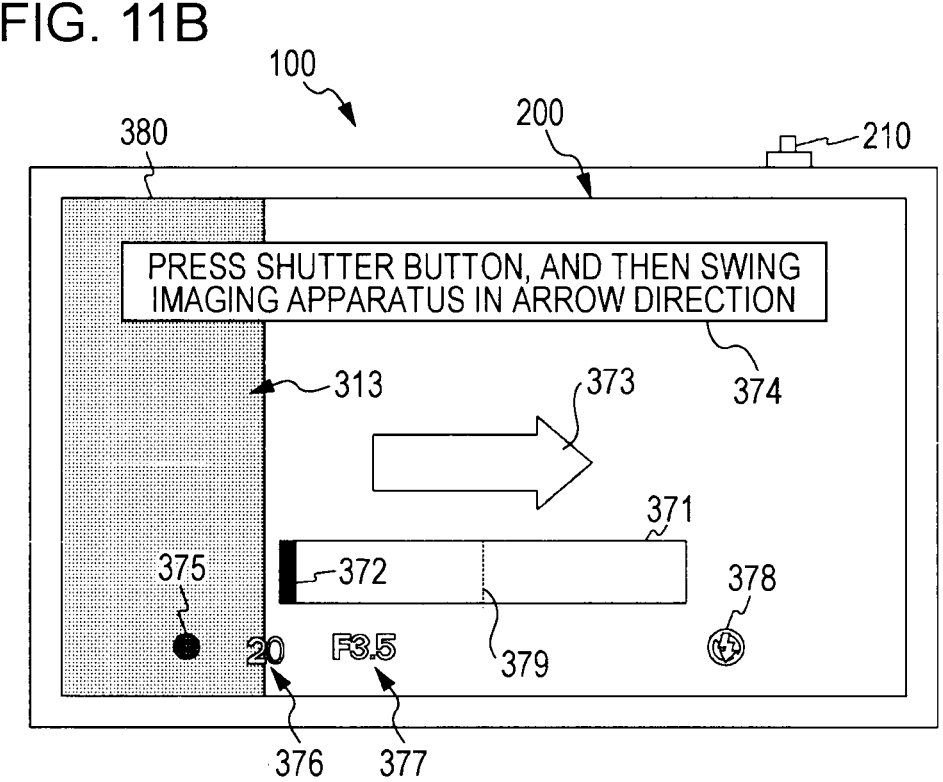

FIG. 11B illustrates a swing operation assistance screen 380 to be displayed on the input/output panel 200 in the event that the user 415 has moved the imaging apparatus 100 to the start position 422 of the imaging operation. Note that, with regard to whether or not the imaging apparatus 100 have arrived at the start position 422, the control unit 190 determines based on the orientation change information from the orientation detecting unit 121.

The swing operation assistance screen 380 differs from the swing operation assistance screen 370 shown in FIG. 10B in that the operation position 372 in the swing operation assistance image display region 371 is displayed with blinking on the left edge, and the arrow 373 inversely faces. Also, "PRESS SHUTTER BUTTON, AND THEN SWING IMAGING APPARATUS IN ARROW DIRECTION" is displayed in the message display region 374, and the notification information 313 is displayed on the left edge of the swing operation assistance screen 380.

In this way, in the event that the imaging apparatus 100 has been moved to the start position 422 of the imaging operation, a message to the effect that the imaging operation is started by swinging the imaging apparatus 100 in the opposite direction of the swing direction so far is displayed.

Note that, with this example, as a method for informing the user that the imaging apparatus 100 has arrived at the start position 433, an example for informing the user by a message in the swing operation assistance screen 380, an arrow, and so forth is shown, but another informing method may be employed. For example, an informing method for displaying a popup message on the swing operation assistance screen 380, and an informing method for displaying the relative position of the imaging apparatus 100 (e.g., a schematic view shown in FIG. 11A) on the swing operation assistance screen 380 may be employed. Also, for example, an informing method according to audio (e.g., notification according to system sound) may be employed. As for an informing method according to audio, for example, audio "beep, beep, beep." may be shortened in interval as the imaging apparatus 100 approaches the start position 422 (e.g., "beep-beep-beep"). In this case, an informing method by outputting another audio (e.g., "ARRIVED AT START POSITION!") may be employed when arriving at the start position 422.

In this way, after the imaging apparatus 100 is moved to the start position 422 of the imaging operation, and the swing operation assistance screen 380 is displayed on the input/output panel 200, upon the shutter button 210 being pressed by the user 415, the panoramic image imaging operation is started. Also, upon the panoramic image imaging operation being started, the operation position 372 is changed from blinking display to a constant lighting state. Also, the operation position 372 moves according to the movement of the imaging apparatus 100.

Note that, with this example, a pressing operation of the shutter button 210 by the user 415 is taken as a start condition of the panoramic image imaging operation, but another start condition may be employed. For example, detecting the movement of the imaging apparatus 100 in the opposite direction may be taken as a start condition thereof.

In this way, upon the panoramic image imaging operation being started, the operation position 372 moves according to the movement of the imaging apparatus 100. This example will be shown in FIGS. 12A through 13B.

Figure 12A:
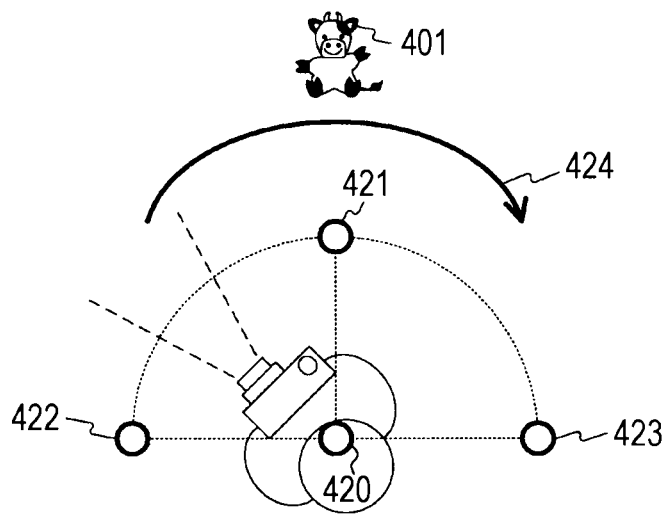
FIGS. 12A and 12B are diagrams schematically illustrating a transition example of the orientation of the imaging apparatus according to the first embodiment of the present disclosure, and a display screen to be displayed on the input/output panel.
Figure 13A:
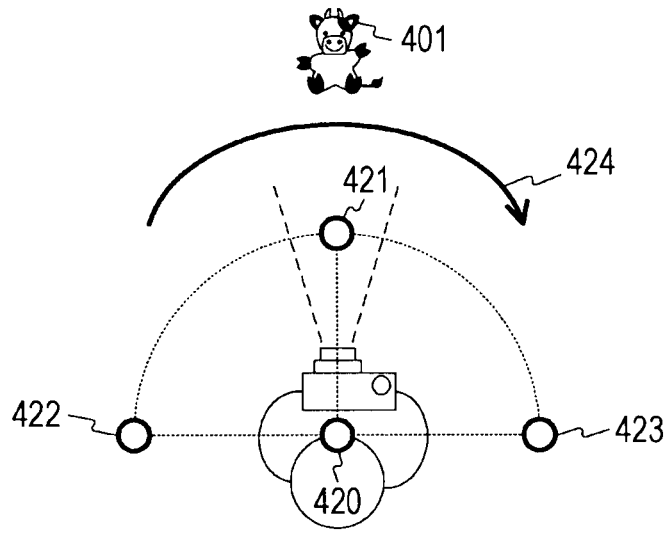
FIGS. 13A and 13B are diagrams schematically illustrating a transition example of the orientation of the imaging apparatus according to the first embodiment of the present disclosure, and a display screen to be displayed on the input/output panel.

FIGS. 12A and 13A illustrate the transition of the imaging apparatus 100 which moves between the start position 422 of the imaging operation and the end position 423 of the imaging operation.

Figure 12B:
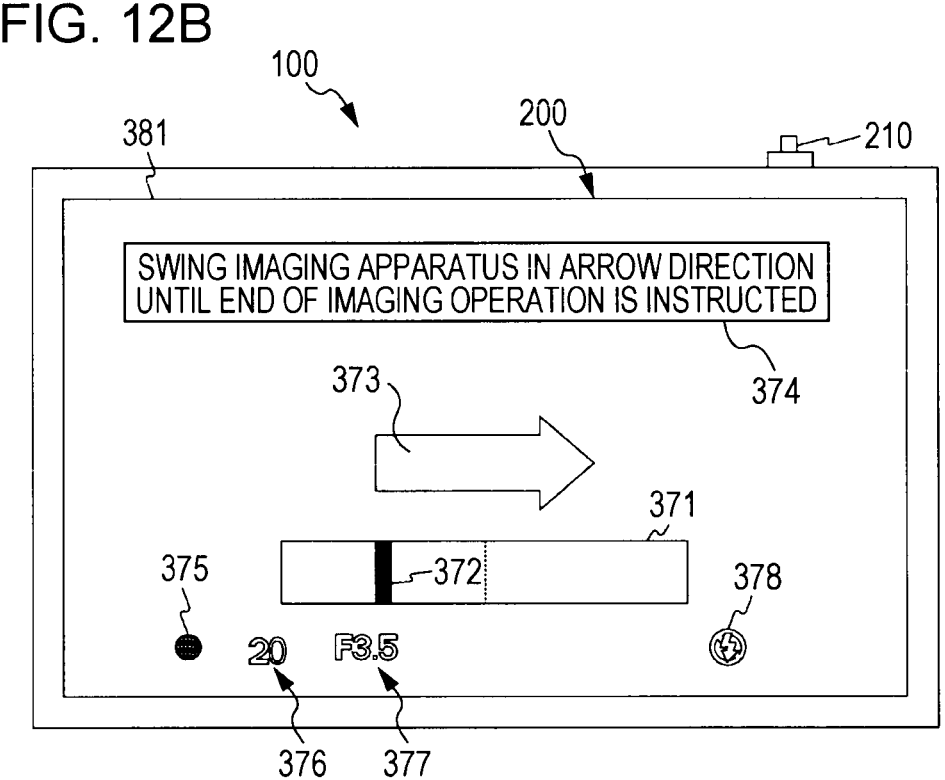
Figure 13B:
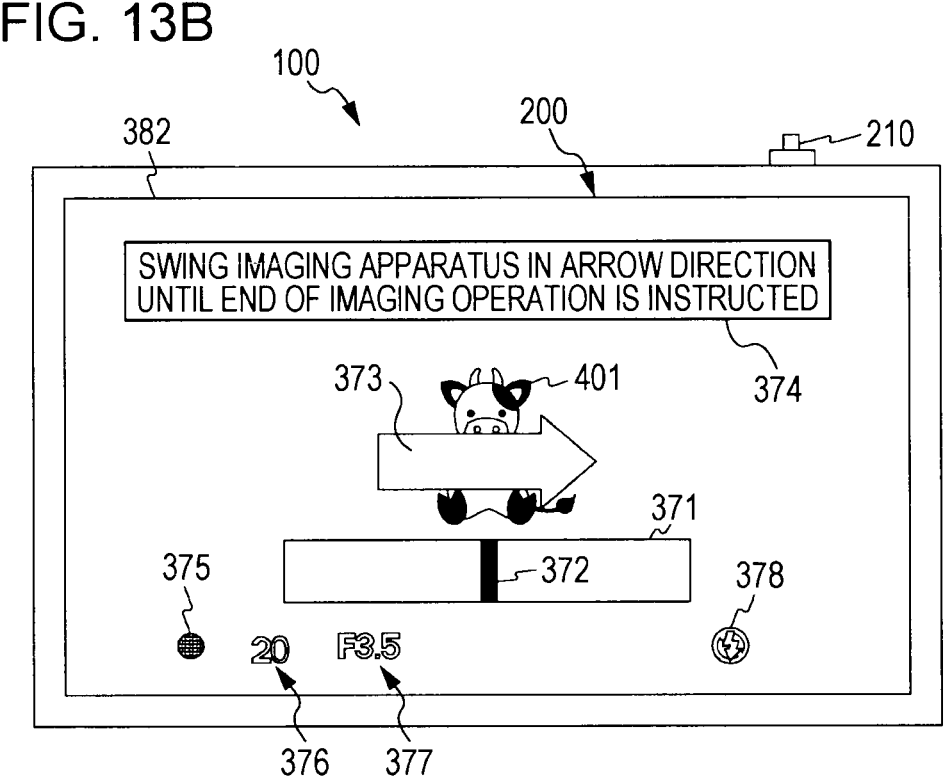

FIGS. 12B and 13B illustrate swing operation assistance images 381 and 382 to be displayed while the imaging apparatus 100 moves between the start position 422 of the imaging operation and the end position 423 of the imaging operation. In this way, after the imaging apparatus 100 starts the imaging operation from the start position 422 of the imaging operation, the swing operation assistance images 381 and 382 are displayed according to the movement of the imaging apparatus 100 until the imaging apparatus 100 arrives at the end position 423 of the imaging operation. Also, in the event that the imaging apparatus 100 has arrived at a position equivalent to the reference position 421 at the time of this movement, a message such as "CURRENT SUBJECT IS SITUATED IN THE CENTER OF PANORAMIC IMAGE" or the like may be displayed in the message display region 374.

Figure 14A:
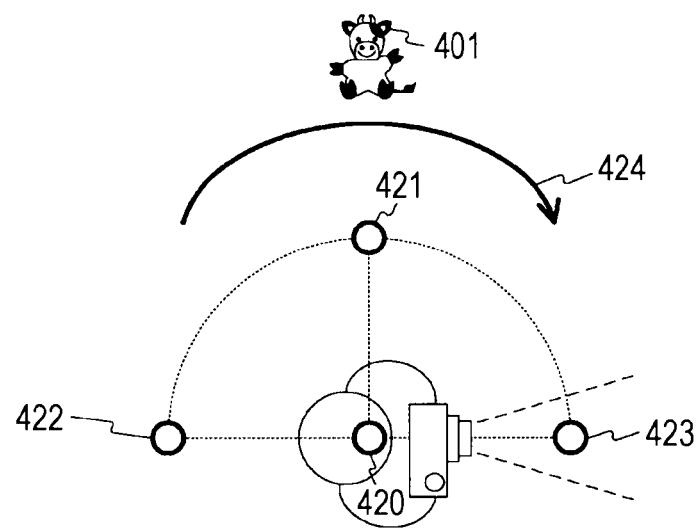
FIGS. 14A and 14B are diagrams schematically illustrating a transition example of the orientation of the imaging apparatus according to the first embodiment of the present disclosure, and a display screen to be displayed on the input/output panel.

FIG. 14A illustrates a case where the user 415 has moved the imaging apparatus 100 to the end position 423 of the imaging operation, in a simplified manner.

Figure 14B:
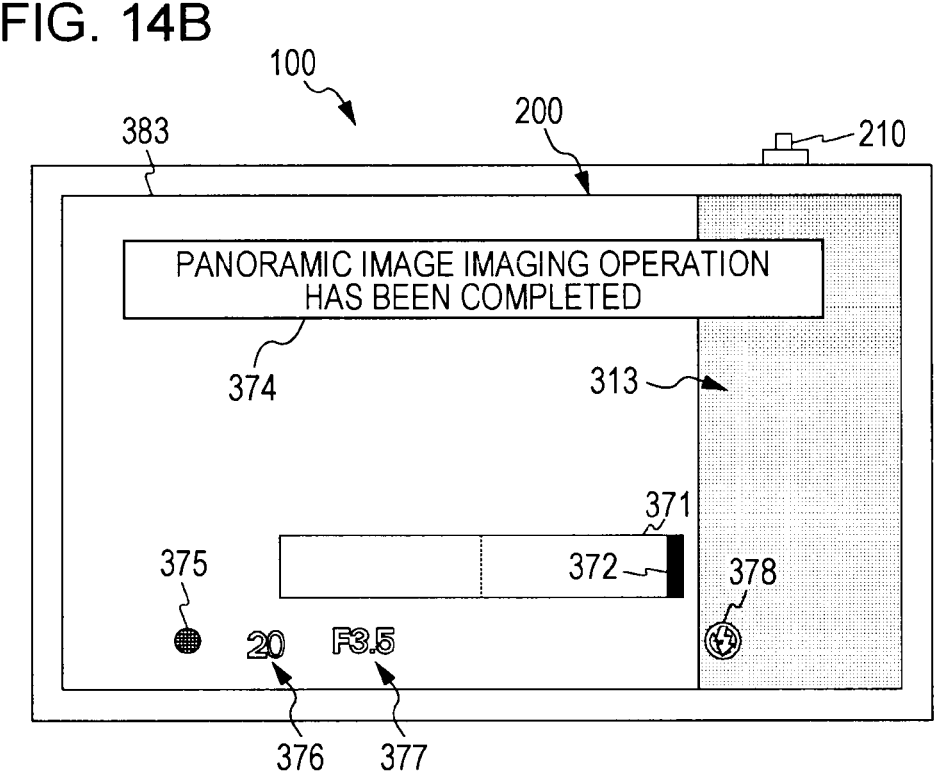

FIG. 14B illustrates a swing operation assistance screen 383 to be displayed on the input/output panel 200 at the time of the user 415 moving the imaging apparatus 100 to the end position 423 of the imaging operation. As shown in FIG. 14B, in the event that the imaging apparatus 100 has moved to the end position of the imaging operation, a message to the effect that the imaging operation has been completed is displayed in the message display region 374.

The swing operation assistance screen 383 differs from the swing operation assistance screens 381 and 382 shown in FIGS. 12A and 13A in that the operation position 372 in the swing operation assistance image display region 371 is displayed on the right edge, and the arrow 373 is eliminated. Also, "PANORAMIC IMAGE IMAGING OPERATION HAS BEEN COMPLETED" is displayed in the message display region 374, and the notification information 313 is displayed on the right edge in the swing operation assistance screen 370.

In this way, in the event that the imaging apparatus 100 has moved to the end position 423 of the imaging operation, a message to the effect that the panoramic image imaging operation has been completed is displayed. Also, a panoramic image is generated by the panoramic image generating unit 132 using the multiple images generated by the imaging operation thereof. After the panoramic image imaging operation is completed, the generated panoramic image is recorded in the recording medium 180 by the recording control unit 192. Also, for example, after elapse of a certain period since end of the panoramic image imaging operation, a generated panoramic image thereof may be preview-displayed on the input/output panel 200.

In this way, imaging control is performed with a subject to be situated in the reference position being taken as a reference, whereby the user's favorite panoramic image can readily be generated.

Note that the swing operation by the user may not correctly be performed while the imaging apparatus 100 moves from the start position 422 of the imaging operation to the end position 423 of the imaging operation. In this case, an arrangement may be made wherein a swing operation assistance screen 385 shown in FIG. 15 is displayed, thereby prompting the user to correctly perform the swing operation.

Figure 15:
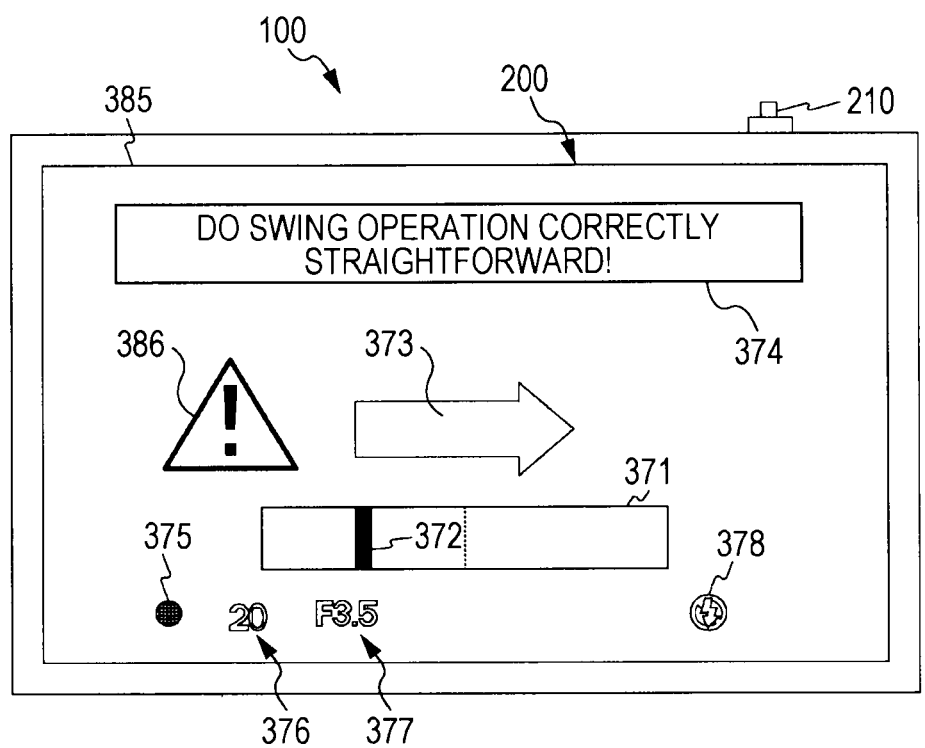
FIG. 15 is a diagram illustrating an example of a swing operation assistance screen to be displayed on the input/output panel according to the first embodiment of the present disclosure.

FIG. 15 is a diagram illustrating an example of a swing operation assistance screen to be displayed on the input/output panel 200 according to the first embodiment of the present disclosure. The swing operation assistance screen 385 shown in FIG. 15 is a display screen to be displayed on the input/output panel 200 in the event that the swing operation by the user is not correctly performed while the imaging apparatus 100 moves from the start position 422 of the imaging operation to the end position 423 of the imaging operation.

The swing operation assistance screen 385 differs from the swing operation assistance screens 381 and 382 shown in FIGS. 12A and 13A in that warning display 386 is displayed, and "PERFORM SWING OPERATION CORRECTLY AND STRAIGHT" is displayed in the message display region 374. Note that in the event that the swing operation by the user has not correctly been performed, the user may be prompted to start the panoramic image imaging operation after returning to the start position 422 of the imaging operation again, for example. In this case, for example, swing operation assistance screens 370 and 380 shown in FIGS. 10B and 11B are displayed on the input/output panel 200, thereby enabling the panoramic image imaging operation to be started.

Imaging Control Example in Second Imaging Mode

An example has been shown so far wherein the image size is set beforehand, the start position and end position of the imaging operation are calculated based on a determination operation for a subject to be situated in the reference position, and the panoramic image imaging operation is performed based on these start position and end position. Next, an example will be shown wherein the end position (image size) of the imaging operation is calculated based on the movement range of the imaging apparatus 100 from the reference position to the start position of the imaging operation, and the panoramic image imaging operation is performed based on this end position.

FIGS. 16A through 19B are diagrams schematically illustrating a transition example of the orientation of the imaging apparatus 100 according to the first embodiment of the present disclosure, and a display screen to be displayed on the input/output panel 200. Specifically, FIGS. 16A, 17A, 18A, and 19A illustrate a transition example of the orientation of the imaging apparatus 100, and FIGS. 16B, 17B, 18B, and 19B illustrate a transition example of a display screen to be displayed on the input/output panel 200 according to change in the orientation of the imaging apparatus 100. Also, with FIGS. 16A through 19B, an imaging operation example will be shown wherein the second imaging mode has been set, a setting for performing the swing operation from the left to the right as the swing direction has been performed, and standard (180 degrees) has been set as the image size. Note that in the event that the second imaging mode has been set, the image size is determined based on the movement range of the imaging apparatus 100 from the reference position to the start position of the imaging operation, and accordingly, the image size has not to be set beforehand.

Also, with FIGS. 16A through 19B, an imaging operation example will be shown in the event that the center position (i.e., the position of "0°" on the reference position specifying bar 351) has been set as the reference position in a panoramic image. Note that the examples shown in FIGS. 16A through 19B are examples in FIGS. 8A through 14B which have partially been modified, and accordingly, portions common to FIGS. 8A through 14B will be denoted with the same reference numerals, and a part of these descriptions will be omitted.

First, as shown in FIG. 8A, the user 415 holding the imaging apparatus 100 in both hands confirms a subject to be situated in the reference position (center position) in a panoramic image while viewing a subject displayed on the input/output panel 200. In this case, as shown in FIG. 8B, the display screen 300 is displayed on the input/output panel 200.

Also, with the first embodiment of the present disclosure, an example will be shown wherein a start instructing operation of the panoramic image imaging operation, and a determining operation of a subject to be situated in the reference position in the second imaging mode are performed by a pressing operation of the shutter button 210.

Figure 16A:
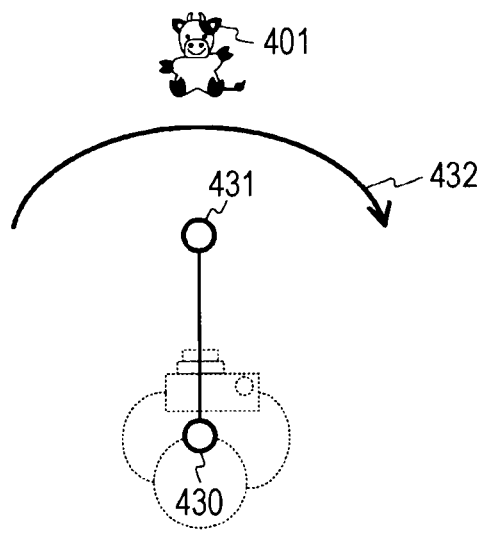
FIGS. 16A and 16B are diagrams schematically illustrating a transition example of the orientation of the imaging apparatus according to the first embodiment of the present disclosure, and a display screen to be displayed on the input/output panel.

FIG. 16A illustrates a case where the user 415 has pressed the shutter button 210 in the state shown in FIG. 8A, in a simplified manner. In this case, a position in the optical-axis direction from a position 430 at the time of pressing thereof is determined to be a reference position 431. Also, in the event that the image size has been set, in the same way as with the first imaging mode, the start position and end position of the imaging operation are determined based on the image size thereof, but for convenience of description, description thereof will be omitted here.

Figure 16B:
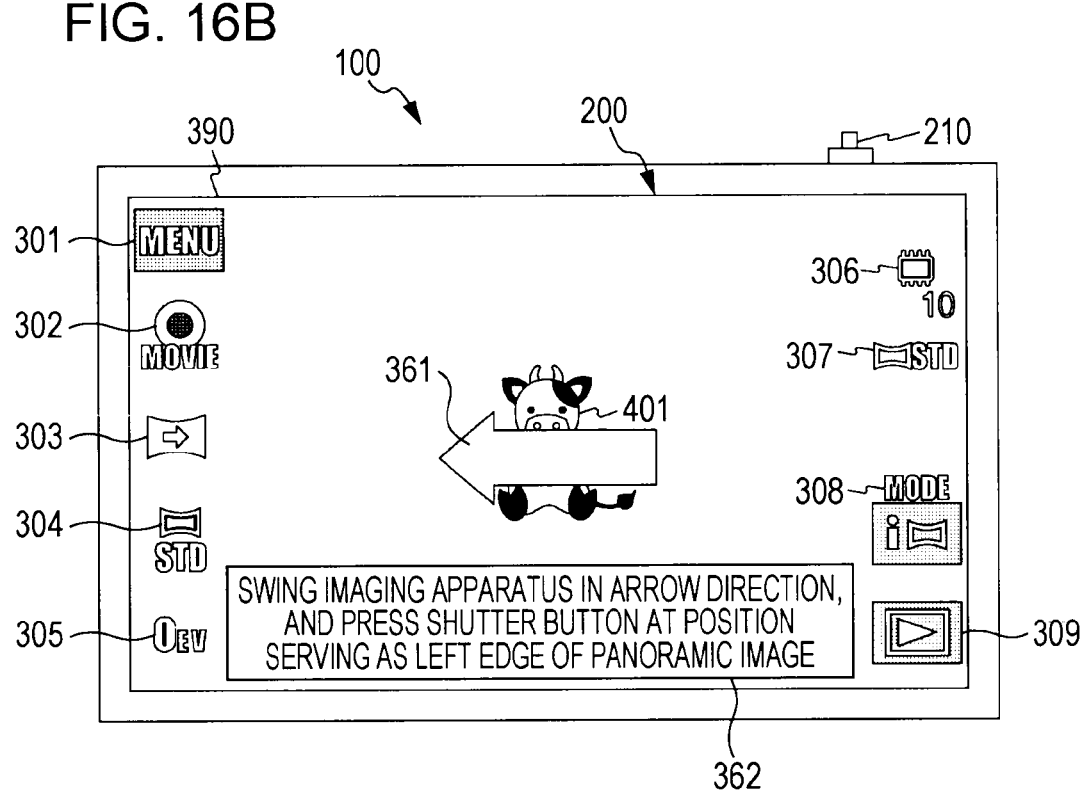

FIG. 16B illustrates a display screen 390 to be displayed at the time of a determining operation for determining a subject to be situated in the reference position in a panoramic image being performed. The display screen 390 is generally the same as the display screen 360 shown in FIG. 9B, but differs in that "SWING IMAGING APPARATUS IN ARROW DIRECTION, AND PRESS SHUTTER BUTTON AT POSITION SERVING AS LEFT EDGE OF PANORAMIC IMAGE" is displayed in the message display region 362. In this way, after pressing the shutter button 210, the display screen 390 is displayed on the input/output panel 200, whereby the user 415 can readily move the imaging apparatus 100 to a position serving as the left edge of the panoramic image in accordance with the display screen 390. Also, a display screen to be displayed on the input/output panel 200 after the user 415 starts a swing operation will be shown in FIG. 17B and others.

Figure 17A:
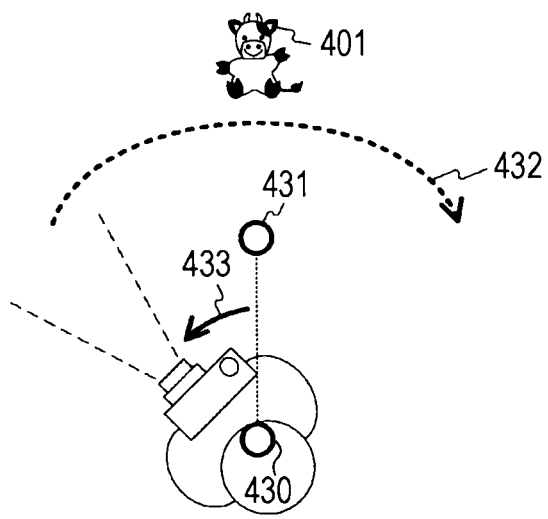
FIGS. 17A and 17B are diagrams schematically illustrating a transition example of the orientation of the imaging apparatus according to the first embodiment of the present disclosure, and a display screen to be displayed on the input/output panel.

FIG. 17A illustrates a case where the user 415 has moved the imaging apparatus 100 in the opposite direction of the swing direction 432 (arrow 433 direction) from the state shown in FIG. 16A, in a simplified manner.

Figure 17B:
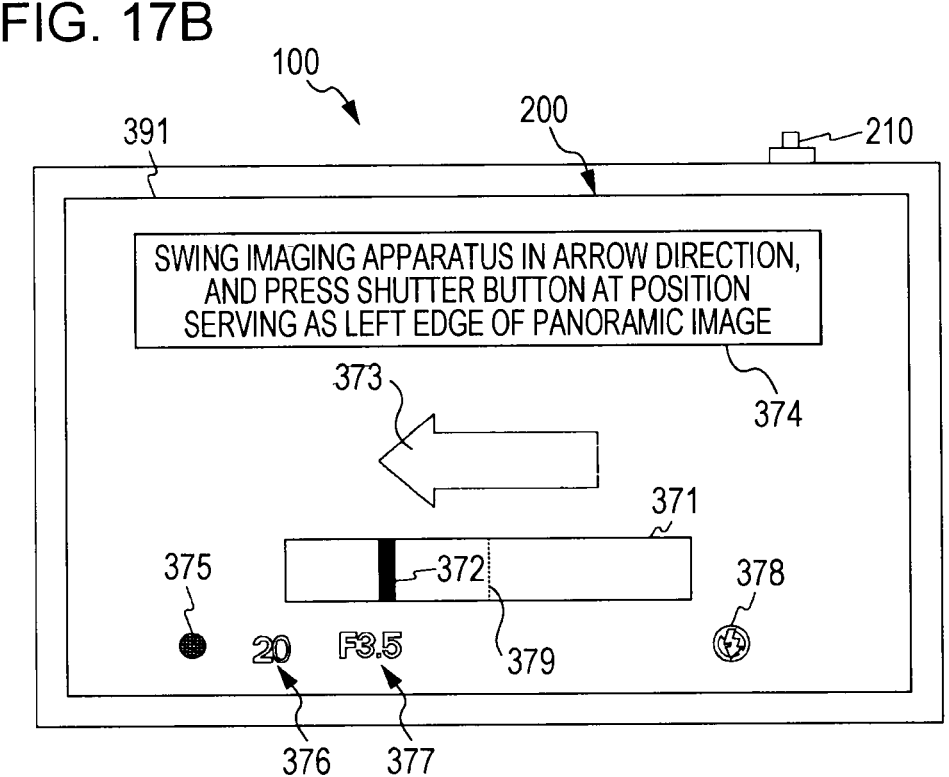

FIG. 17B illustrates a swing operation assistance screen 391 to be displayed on the input/output panel 200 after the user 415 moves the imaging apparatus 100 in the arrow 433 direction. The swing operation assistance screen 391 is generally the same as the swing operation assistance screen 370 shown in FIG. 10B, but differs in that "SWING IMAGING APPARATUS IN ARROW DIRECTION, AND PRESS SHUTTER BUTTON AT POSITION SERVING AS LEFT EDGE OF PANORAMIC IMAGE" is displayed in the message display region 374. Also, in the event that no image size has been set, the start position and end position of the imaging operation are determined based on a virtual image size (e.g., 180 degrees). Based on the start position and end position thereof, the current operation position 372 is displayed in the swing operation assistance image display region 371.

Figure 18A:
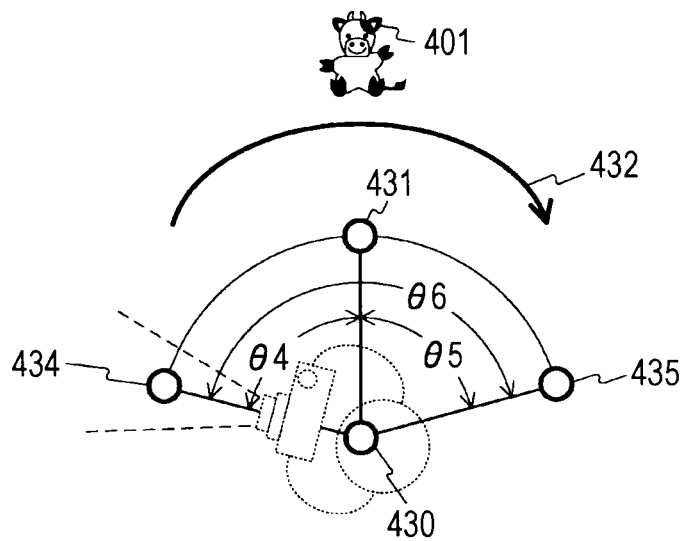
FIGS. 18A and 18B are diagrams schematically illustrating a transition example of the orientation of the imaging apparatus according to the first embodiment of the present disclosure, and a display screen to be displayed on the input/output panel.

FIG. 18A illustrates a case where the user 415 has moved the imaging apparatus 100 to a position serving as the left edge of a panoramic image (start position 434), in a simplified manner. Now, let us assume a case where the user 415 has pressed the shutter button 210 in the state shown in FIG. 18A. In this case, the end position 435 of the imaging operation is determined based on the position at the time of pressing thereof (start position 434). Specifically, an angle from the reference position 431 to the start position 434 of the imaging operation will be taken as θ4. Also, for example, in the event that an angle from the reference position 431 to the end position 435 of the imaging operation will be taken as θ5, the center position has been set as the reference position, θ4=θ5 holds, and accordingly, an angle θ6 (=2×θ4) is determined to be the image size. Also, let us assume a case where a position other than the center position (e.g., the position of "30°" in the reference position specifying bar 351) has been set as the reference position. In this case, the angle θ6 (=θ4×2−30°×2) is determined to be the image size.

In this way, in the event that the user 415 has pressed the shutter button 210 in the state shown in FIG. 18A, the end position 435 of the imaging operation is determined based on the position at the time of pressing thereof (start position 434). Note that the user 415 and imaging apparatus 100 are illustrated with a dotted line in FIG. 18A.

Figure 18B:
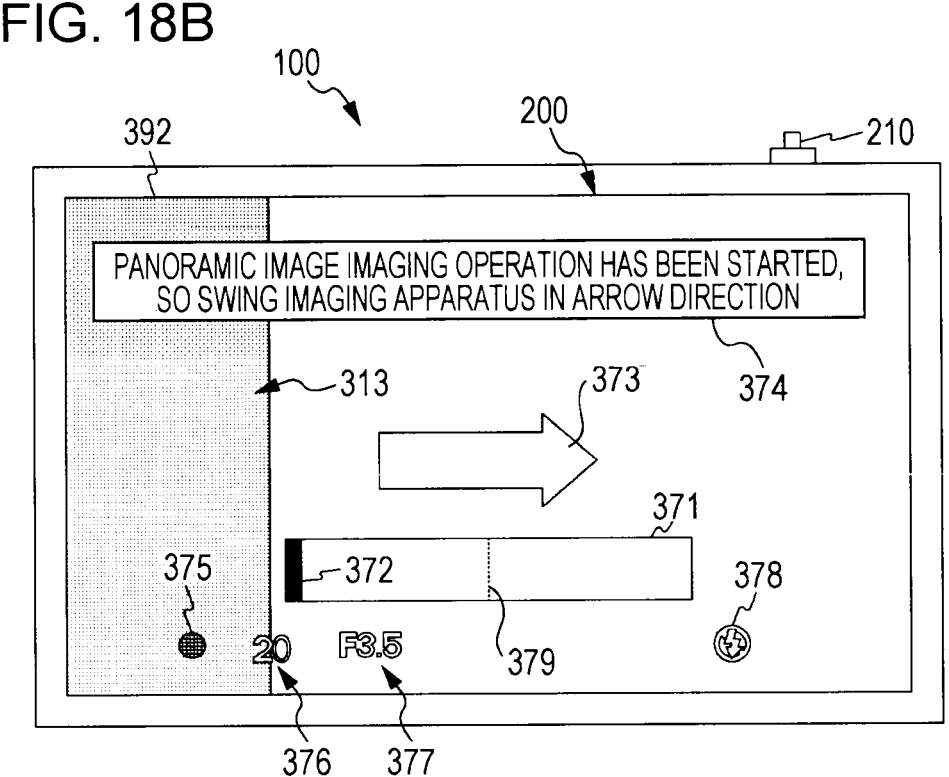

FIG. 18B illustrates a swing operation assistance screen 392 to be displayed on the input/output panel 200 in the event that the user 415 has moved the imaging apparatus 100 to a position serving as the left edge of the panoramic image (start position 434), and has pressed the shutter button 210. The swing operation assistance screen 392 is generally the same as the swing operation assistance screen 380 shown in FIG. 11B, but differs in that "PANORAMIC IMAGE IMAGING OPERATION HAS BEEN STARTED, SO SWING IMAGING APPARATUS IN ARROW DIRECTION" is displayed in the message display region 374.

In this way, in the event that the imaging apparatus 100 has been moved to the start position of the imaging operation, and the shutter button 210 has been pressed, the end position of the imaging operation is determined. A message to the effect that the imaging operation is started by swinging the imaging apparatus 100 in the opposite direction of the swing direction so far is displayed.

In this way, upon the imaging apparatus 100 being moved to the start position 434 of the imaging operation, and the shutter button 210 being pressed by the user 415, the swing operation assistance screen 392 is displayed on the input/output panel 200, and the panoramic image imaging operation is started. Also, upon the panoramic image imaging operation being started, the operation position 372 is changed form blinking display to a constant lighting state. Also, the operation position 372 moves according to the movement of the imaging apparatus 100.

Note that, with this example, a pressing operation of the shutter button 210 by the user 415 will be taken as a start condition of the panoramic image imaging operation, but another start condition may be employed. For example, it may be taken as a start condition thereof to detect the movement of the imaging apparatus 100 in the opposite direction. Note that detection of the movement of the imaging apparatus 100 in the opposite direction is determined by the control unit 190 based on the orientation change information from the orientation detecting unit 121.

Also, the imaging operation after start of the panoramic image imaging operation is generally the same as with the examples shown in FIGS. 12A through 14B, and accordingly, description thereof will be omitted here.

Figure 19A:
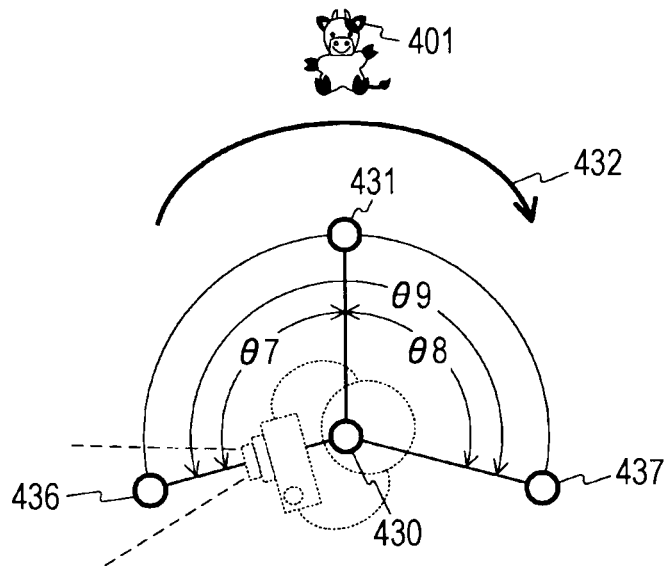
FIGS. 19A and 19B are diagrams schematically illustrating a transition example of the orientation of the imaging apparatus according to the first embodiment of the present disclosure, and a display screen to be displayed on the input/output panel.
Figure 19B:
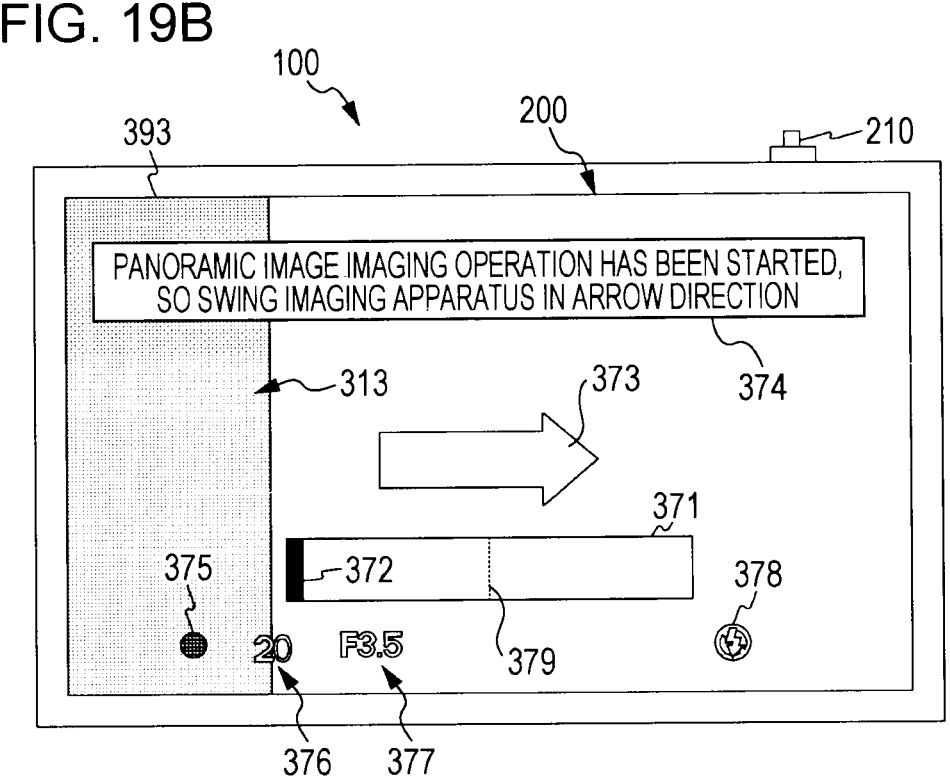

Note that, with the example shown in FIGS. 18A and 18B, an example has been shown wherein an image size less than 180 degrees is determined, but another image size may be determined according to the user's operations. In FIGS. 19A and 19B, an example is shown wherein an image size equal to or greater than 180 degrees is determined.

FIG. 19A illustrates a case where the user 415 has moved the imaging apparatus 100 to a position serving as the left edge of the panoramic image (start position 436), in a simplified manner. Note that the calculation method of an image size θ9, the determining method of the end position 437, and so forth are the same as with FIG. 18A.

FIG. 19B illustrates a swing operation assistance screen 393 to be displayed on the input/output panel 200 in the event that the user 415 has moved the imaging apparatus 100 to a position serving as the left edge of the panoramic image (start position 436).

In this way, a panoramic image with the user's favorite image size can readily be generated by the swing operation of the imaging apparatus 100 after determination of a subject to be situated in the reference position.

Note that, with the first imaging mode and second imaging mode, a subject to be situated in the reference position is determined before the imaging apparatus 100 arrives at the start position of the imaging operation. However, during the imaging operation during the swing operation from the start position to the end position, a subject to be situated in the reference position may be adjusted by image processing. For example, the panoramic image generating unit 132 obtains and holds an image (or a part thereof) at the time of determining a subject to be situated in the reference position, and performs matching processing between each image during the swing operation from the start position to the end position and the held image thereof. Based on the results of the matching processing between the held image, and the image equivalent to the reference position and a position adjacent to this during the swing operation, the end position may be adjusted so that the determined subject is situated in the reference position.

Imaging Control Example of Third Imaging Mode

An example has been shown so far wherein a subject to be situated in the reference position is determined before the panoramic image imaging operation. Next, an example will be shown wherein a subject to be situated in the reference position is determined after start of the imaging operation, and the end position (image size) of the imaging operation is calculated based on this determining operation, and the panoramic image imaging operation is performed based on this end position.

FIGS. 20A through 23B are diagrams schematically illustrating transition examples of the orientation of the imaging apparatus 100 according to the first embodiment of the present disclosure, and a display screen to be displayed on the input/output panel 200. Specifically, FIGS. 20A, 21A, 22A, and 23A illustrate a transition example of the orientation of the imaging apparatus 100, and FIGS. 20B, 21B, 22B, and 23B illustrate a transition example of a display screen to be displayed on the input/output panel 200 according to change in the orientation of the imaging apparatus 100. Also, FIGS. 20A through 23B illustrate an imaging operation example in the event that the third imaging mode has been set, a setting for performing the swing operation from the left to the right as the swing direction has been set, and standard (180 degrees) has been set as the image size. Note that, in the event that the third imaging mode has been set, the image size is determined based on the reference position that is determined after start of the imaging operation, and accordingly, the image size does not have to be set beforehand.

Also, FIGS. 20A through 23B illustrate an imaging operation example in the event that the center position (i.e., the position of "0°" on the reference position specifying bar 351) has been set as the reference position in a panoramic image. Note that examples shown in FIGS. 20A through 23B are the examples in FIGS. 8A through 14B which have partially been modified, and accordingly, portions common to FIGS. 8A through 14B will be denoted with the same reference numerals, and a part of these descriptions will be omitted.

Figure 20A:
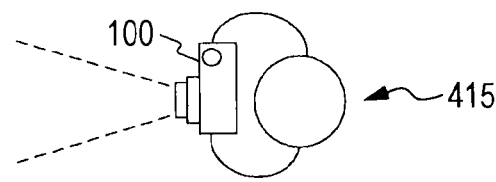
FIGS. 20A and 20B are diagrams schematically illustrating a transition example of the orientation of the imaging apparatus according to the first embodiment of the present disclosure, and a display screen to be displayed on the input/output panel.

FIG. 20A illustrates a case where the imaging apparatus 100, and the user 415 holding the imaging apparatus 100 in both hands are viewed from above, in a simplified manner. In this case, let us say that the user 415 confirms the position of the left edge of a panoramic image while viewing a subject displayed on the input/output panel 200.

Figure 20B:
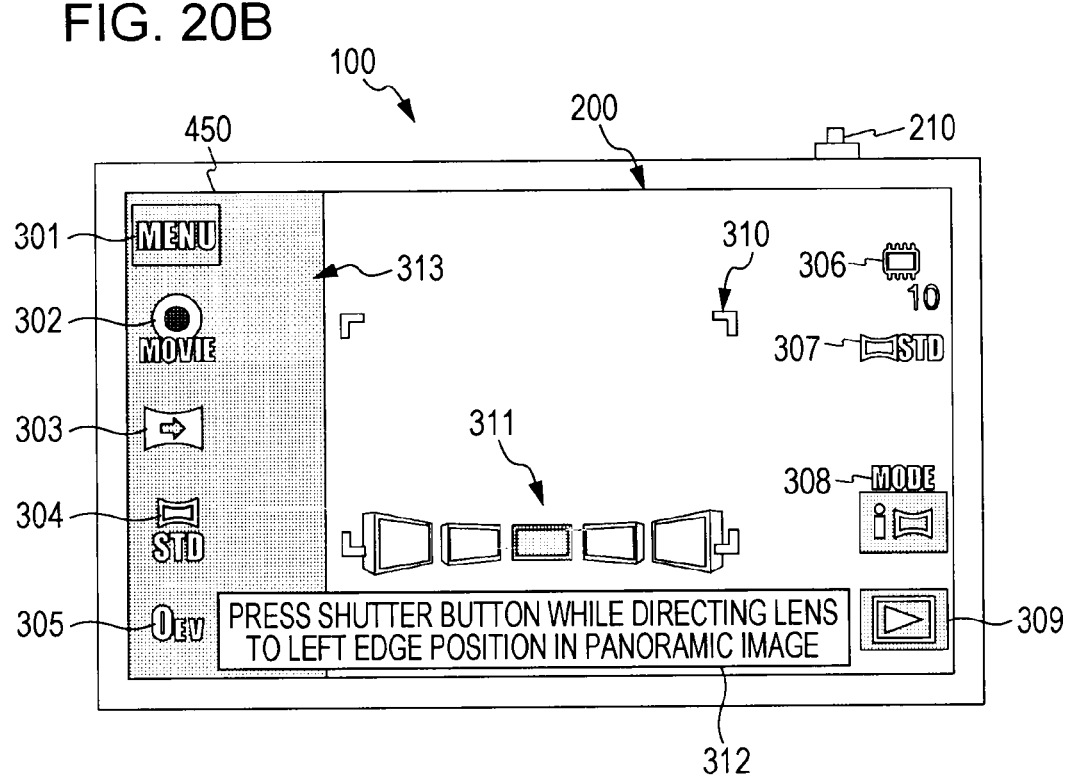

FIG. 20B illustrates a display screen 450 to be displayed before a start instructing operation of the panoramic image imaging operation. The display screen 450 is the same as the display screen 300 shown in FIG. 4, and "PRESS SHUTTER BUTTON WHILE DIRECTING LENS TO LEFT EDGE POSITION IN PANORAMIC IMAGE" is displayed in the message display region 312. Also, a subject serving as an imaging object is displayed on the display screen 450 by the imaging unit 112 as a through image. Also, with the first embodiment of the present disclosure, an example is shown wherein a start instructing operation of the panoramic image imaging operation, a determining operation of a subject to be situated in the reference position in the third imaging mode are performed by a pressing operation of the shutter button 210.

Specifically, in the event that the third imaging mode has been set, the user 415 determines a subject to be situated in the reference position in a panoramic image after start of the imaging operation of the panoramic image. Thus, the user can perform the imaging operation even without accurately recognizing the end position in the panoramic image.

Figure 21A:
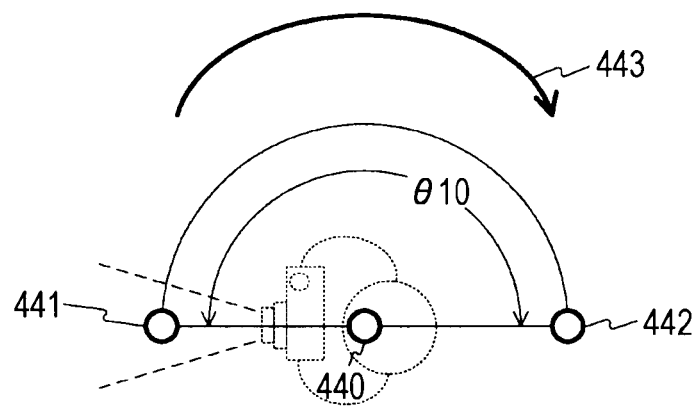
FIGS. 21A and 21B are diagrams schematically illustrating a transition example of the orientation of the imaging apparatus according to the first embodiment of the present disclosure, and a display screen to be displayed on the input/output panel.

FIG. 21A illustrates a case where the user 415 has pressed the shutter button 210 in the state shown in FIG. 20A. In this case, a position in the optical-axis direction from the position 440 at the time of pressing thereof is determined to be the start position 441 of the panoramic image imaging operation. Also, in the event that the image size (e.g., angle θ10) has been set, in the same way as with the case of the first imaging mode, the end position 442 of the imaging operation is determined based on the image size thereof. Also, in the event that no image size has been set, the end position of the imaging operation is determined based on a virtual image size (e.g., 180 degrees).

Figure 21B:
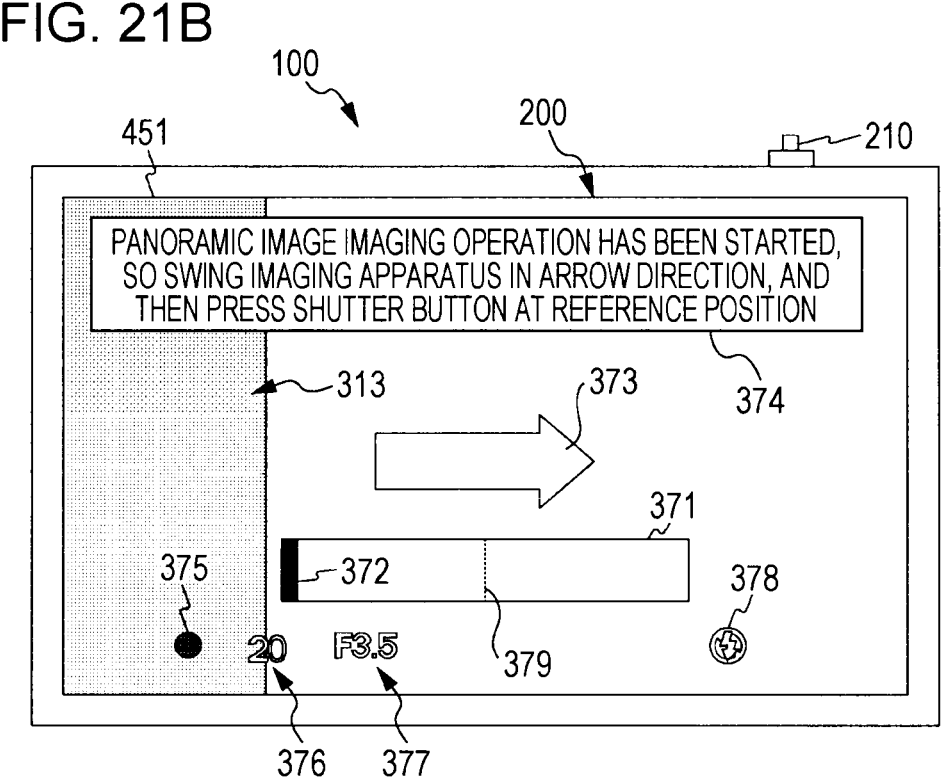

FIG. 21B illustrates a swing operation assistance screen 451 to be displayed on the input/output panel 200 in the event that the user 415 has pressed the shutter button 210. The swing operation assistance screen 451 is generally the same as the swing operation assistance screen 380 shown in FIG. 11B, but specifically differs in that "PANORAMIC IMAGE IMAGING OPERATION HAS BEEN STARTED, SO SWING IMAGING APPARATUS IN ARROW DIRECTION, AND THEN PRESS SHUTTER BUTTON AT REFERENCE POSITION" is displayed in the message display region 374. The current operation position 372 in the swing operation assistance display region 371 is then displayed based on the start position 441 and end position 442.

Figure 22A:
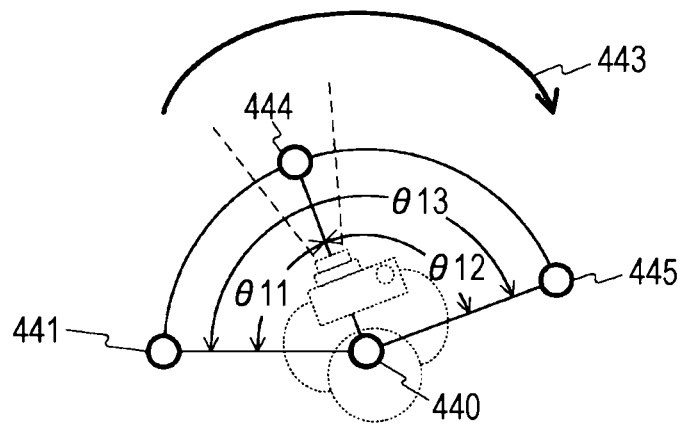
FIGS. 22A and 22B are diagrams schematically illustrating a transition example of the orientation of the imaging apparatus according to the first embodiment of the present disclosure, and a display screen to be displayed on the input/output panel.

FIG. 22A illustrates a case where the user 415 has determined a subject to be situated in the reference position by pressing of the shutter button 210, in a simplified manner. In this way, in the event that the user 415 has pressed the shutter button 210 in the state shown in FIG. 22A, the end position 445 of the imaging operation is determined based on the position at the time of pressing thereof (reference position 444). Specifically, an angle from the start position 441 to the reference position 444 of will be taken as θ11. Also, for example, in the event that an angle from the reference position 444 to the end position 445 will be taken as θ12, the center position has been set as the reference position, θ11=θ12 holds, and accordingly, an angle θ13 (=2×θ11) is determined to be the image size. Also, let us assume a case where a position other than the center position (e.g., the position of "30°" in the reference position specifying bar 351) has been set as the reference position. In this case, the angle θ13 (=θ11×2−30°×2) is determined to be the image size.

In this way, in the event that the user 415 has pressed the shutter button 210 in the state shown in FIG. 22A, the end position 445 of the imaging operation is determined based on the position at the time of pressing thereof (reference position 444). Note that the user 415 and imaging apparatus 100 are illustrated with a dotted line in FIG. 22A.

Figure 22B:
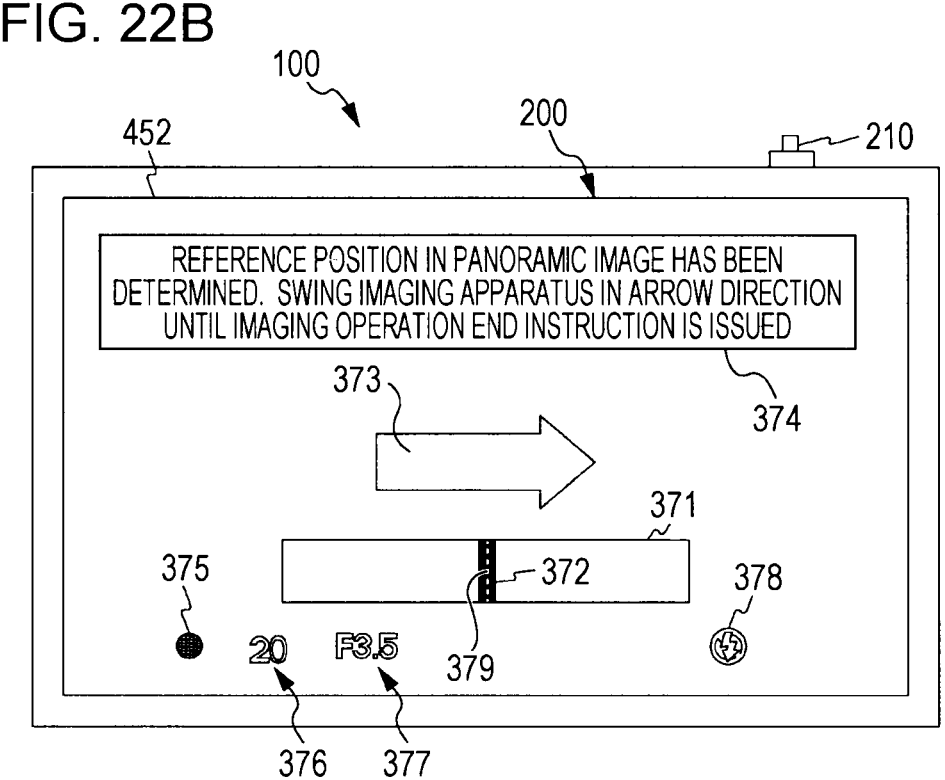

FIG. 22B illustrates a swing operation assistance screen 452 to be displayed on the input/output panel 200 in the event that the user 415 has determined a subject to be situated in the reference position by pressing the shutter button 210. The swing operation assistance screen 452 is generally the same as the swing operation assistance screen 380 shown in FIG. 11B, but differs in that "REFERENCE POSITION IN PANORAMIC IMAGE HAS BEEN DETERMINED. SWING IMAGING APPARATUS IN ARROW DIRECTION UNTIL IMAGING OPERATION END INSTRUCTION IS ISSUED." is displayed in the message display region 374.

In this way, in the event that a subject to be situated in the reference position is determined by a pressing operation by the user 415, the end position of the imaging operation is determined, and a message to the effect that the imaging operation is continued by swinging the imaging apparatus 100 up to the end position thereof is displayed.

Note that, with this example, a pressing operation of the shutter button 210 by the user 415 is taken as a determining method of a subject to be situated in the reference position, but another determining method may be employed (e.g., a determining method employing another operating member).

Also, the imaging operation until end of the panoramic image imaging operation is generally the same as with the examples shown in FIGS. 12A through 14B, and accordingly, description thereof will be omitted here.

Figure 23A:
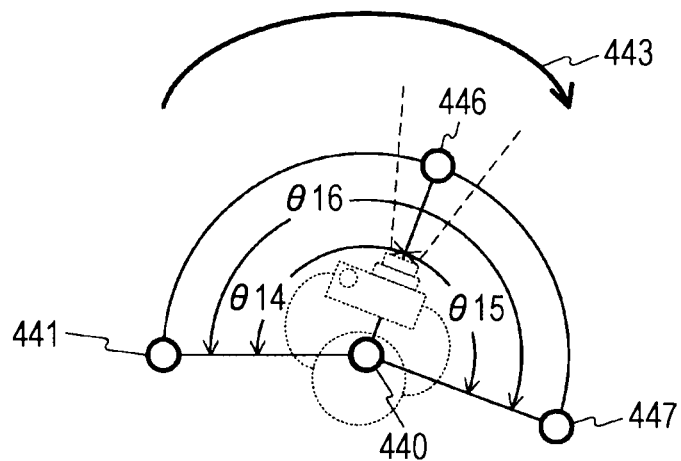
FIGS. 23A and 23B are diagrams schematically illustrating a transition example of the orientation of the imaging apparatus according to the first embodiment of the present disclosure, and a display screen to be displayed on the input/output panel.
Figure 23B:
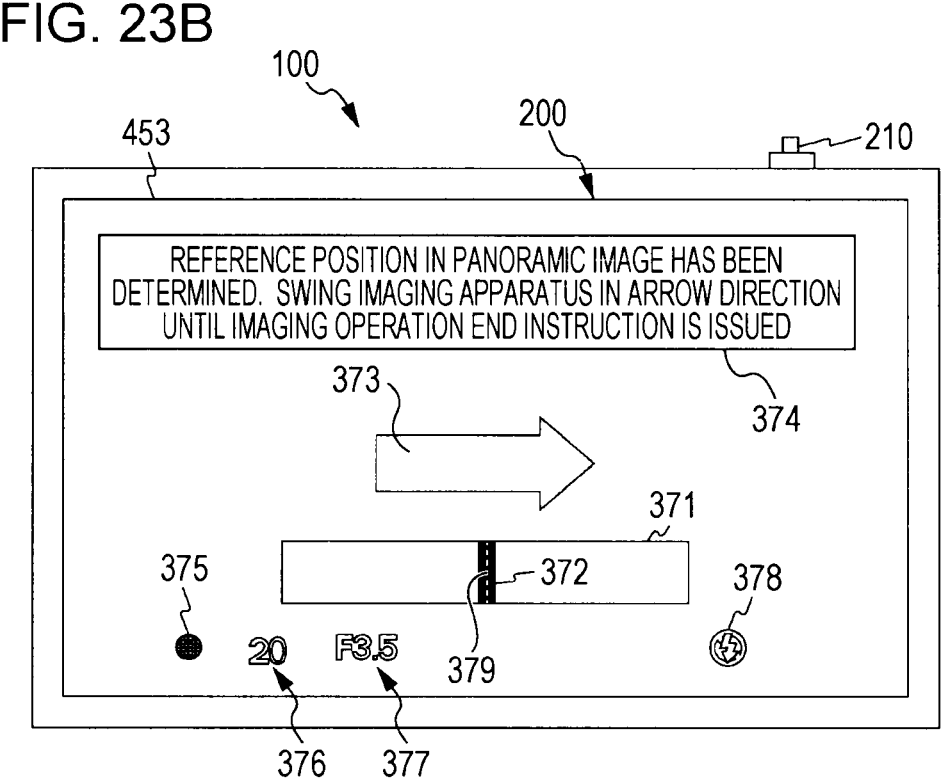

Note that, with the example shown in FIG. 22A, an example has been shown wherein a relatively small image size (less than 180 degrees) is determined, but another image size may be determined according to the user's operations. In FIGS. 23A and 23B, an example is shown wherein a relatively great image size (equal to or greater than 180 degrees) is determined.

FIG. 23A illustrates a case where the user 415 has determined a subject to be situated in the reference position by pressing the shutter button 210, in a simplified manner. Note that the calculation method of an image size θ16, the determining method of the end position 447, and so forth are the same as with FIG. 22A.

FIG. 23B illustrates a swing operation assistance screen 453 to be displayed on the input/output panel 200 in the event that the user 415 has determined a subject to be situated in the reference position by pressing the shutter button 210.

In this way, a panoramic image with the user's favorite image size can readily be generated by the swing operation of the imaging apparatus 100 after determination of a subject to be situated in the reference position.

As described above, according to the first embodiment of the present disclosure, in the event that a panoramic image within a certain range is generated, composition determination by the user's visual estimation may be eliminated. For example, generation of a panoramic image may be performed by determining a subject to be situated in the reference position, whereby repeating of shootings with trial and error to obtain a desired composition can be prevented. That is to say, according to the first embodiment of the present disclosure, the user's favorite panoramic image can readily be generated.

Note that, with the first embodiment of the present disclosure, an example has been shown wherein the imaging control is performed by determining the start position or end position of the panoramic image imaging operation, but the imaging control may be performed by dynamically trimming image data as to the reference position that has been set. For example, with a system wherein the image size is determined beforehand, and a system where there is an upper limit regarding an imaging range, the imaging control may be performed by dynamically trimming image data as to the reference position that has been set so as to generate a panoramic image. In this case, for example, of accumulated image data from the start position of the panoramic image imaging operation, image data serving as out of an imaging range as to the reference position is not used. Also, let us assume a case where in the event that the third imaging mode has been set, the image size or imaging range has reached the upper limit before the user performs a determining operation of a subject to be situated in the reference position. In this case, for example, end of the imaging operation at this time, or continuation of the imaging operation while discarding image data exceeding a half of the imaging range may be selected.

Operation Example of Imaging Apparatus

Next, the operation of the imaging apparatus 100 according to the first embodiment of the present disclosure will be described with reference to the drawings.

Operation Example in First Imaging Mode

Figure 24:
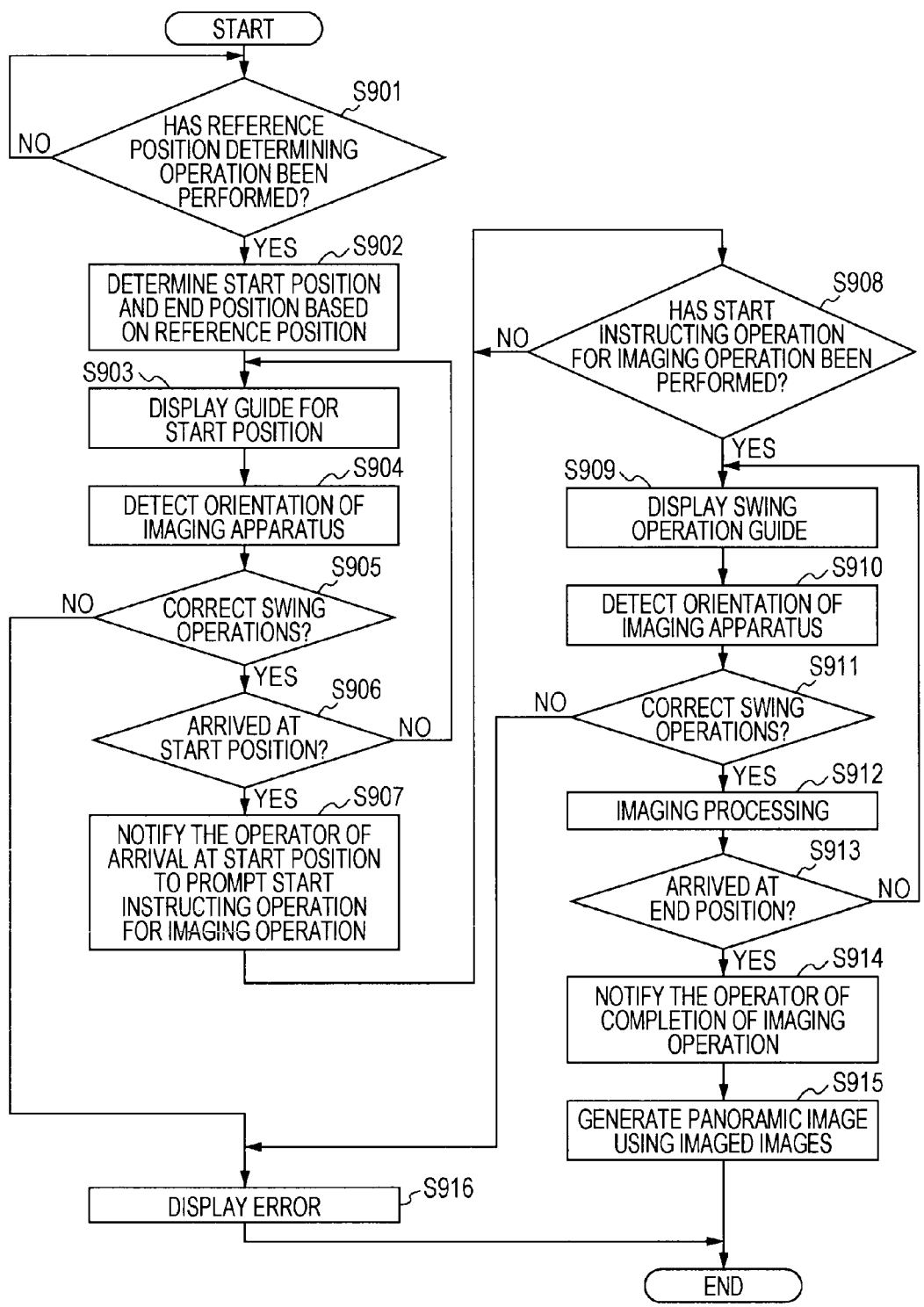
FIG. 24 is a flowchart illustrating an example of imaging control processing according to the imaging apparatus according to the first embodiment of the present disclosure.

FIG. 24 is a flowchart illustrating an example of the processing procedure of imaging control processing by the imaging apparatus 100 according to the first embodiment of the present disclosure. With this example, an example of the processing procedure in the event that the first imaging mode has been set will be shown.

First, the control unit 190 determines whether or not there has been a determining operation of a subject to be situated in the reference position (step S901), and in the event that the determining operation thereof has not been performed, continuously performs monitoring. On the other hand, in the event that the determining operation thereof has been performed (step S901), the control unit 190 determines the start position and end position of the panoramic image imaging operation based on the position at the time of the determining operation thereof (reference position) (step S902). Note that step S901 is an example of a determining procedure.

Next, the display control unit 191 controls the display unit 141 to display a guide screen (e.g., display screen 360 shown in FIG. 9B, swing operation assistance screen 370 shown in FIG. 10B) up to the determined start position thereof under control of the control unit 190 (step S903). Note that this guide screen will sequentially be changed according to change in the orientation of the imaging apparatus 100.

Next, the orientation detecting unit 121 detects change in the orientation of the imaging apparatus 100 (step S904), and the control unit 190 determines whether or not the swing operation has correctly been performed based on the detected orientation change (step S905). In the event that the correct swing operation has not been performed (step S905), the display control unit 191 controls the display unit 141 to display an error screen under control of the control unit 190 (step S916), and ends the operation of the imaging control processing. On the other hand, in the event that the correct swing operation has been performed (step S905), the control unit 190 determined whether or not the imaging apparatus 100 has arrived at the start position (step S906). In the event that the imaging apparatus 100 has not arrived at the start position (step S906), the processing returns to step S903.

On the other hand, in the event that the imaging apparatus 100 has arrived at the start position (step S906), the display control unit 191 controls the display unit 141 to display a display screen indicating that the imaging apparatus 100 has arrived at the start position under control of the control unit 190 (step S907). This display screen is, for example, the swing operation assistance screen 380 shown in FIG. 11B.

Next, determination is made whether or not the start instructing operation of the imaging operation has been performed (step S908), and in the event that the start instructing operation of the imaging operation has not been performed, the display control unit 191 continuously performs monitoring. On the other hand, in the event that the start instructing operation of the imaging operation has been performed (step S908), the display control unit 191 controls the display unit 141 to display a guide screen up to the end position under control of the control unit 190 (step S909). Note that this guide screen is, for example, the swing operation assistance screen 381 shown in FIG. 12B, and will sequentially be changed according to change in the orientation of the imaging apparatus 100.

Next, the orientation detecting unit 121 detects change in the orientation of the imaging apparatus 100 (step S910), and the control unit 190 determines whether or not the correct swing operation has been performed based on the detected orientation change thereof (step S911). In the event that the correct swing operation has not been performed (step S911), the processing proceeds to step S916. On the other hand, in the event that the correct swing operation has been performed (step S911), the imaging unit 112 performs image imaging processing for generating a panoramic image under control of the control unit 190 (step S912). Note that steps S904 and S910 are an example of an orientation detecting procedure. Also, step S912 is an example of a control procedure.

Next, the control unit 190 determines whether or not the imaging apparatus 100 has arrived at the end position (step S913). In the event that the imaging apparatus 100 has not arrived at the end position (step S913), the processing returns to step S909.

On the other hand, in the event that the imaging apparatus 100 has arrived at the end position (step S913), the display control unit 191 controls the display unit 141 to display a display screen to the effect that the imaging operation has been completed under control of the control unit 190 (step S914). This display screen is, for example, the swing operation assistance screen 383 shown in FIG. 14B. Next, the panoramic image generating unit 132 uses multiple images generated by the imaging operation to generate a panoramic image, and the recording control unit 192 records the generated panoramic image in the recording medium 180 (step S915).

Operation Example of Second Imaging Mode

Figure 25:
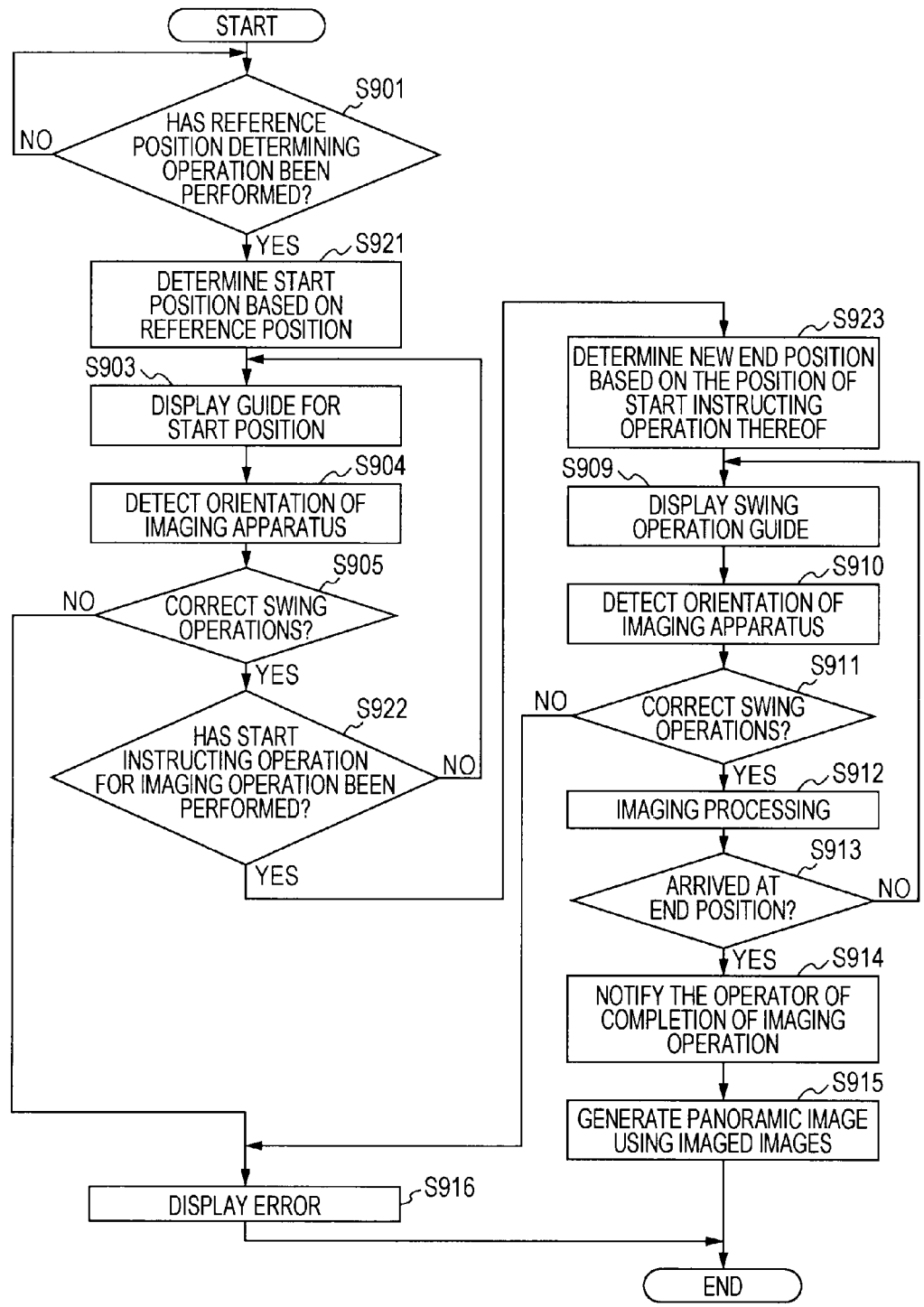
FIG. 25 is a flowchart illustrating an example of imaging control processing according to the imaging apparatus according to the first embodiment of the present disclosure.

FIG. 25 is a flowchart illustrating an example of the processing procedure of the imaging control processing by the imaging apparatus 100 according to the first embodiment of the present disclosure. This example illustrates an example of the processing procedure in the event that the second imaging mode has been set. Also, this processing procedure is a modification of FIG. 24, and accordingly, portions common to FIG. 24 are denoted with the same reference numerals, and description thereof will be omitted.

In the event that the determining operation of a subject to be situated in the reference position has been performed (step S901), the control unit 190 determines the start position of the panoramic image imaging operation based on the position at the time of the determining operation thereof (reference position) (step S921).

Also, in the event that the correct swing operation has been performed (step S905), the control unit 190 determines whether or not the start instructing operation of the panoramic image imaging operation has been performed (step S922). In the event that the start instructing operation of the panoramic image imaging operation has not been performed (step S922), the processing returns to step S903.

On the other hand, in the event that the start instructing operation of the panoramic image imaging operation has been performed (step S922), the control unit 190 determines the end position of the panoramic image imaging operation based on the position at the time of the start instructing operation thereof (step S923).

Operation Example in Third Imaging Mode

FIG. 26 is a flowchart illustrating an example of the processing procedure of the imaging control processing by the imaging apparatus 100 according to the first embodiment of the present disclosure. This example illustrates an example of the processing procedure in the event that the third imaging mode has been set. Also, this processing procedure is a modification of FIG. 24, and accordingly, portions common to FIG. 24 are denoted with the same reference numerals, and description thereof will be omitted.

First, the control unit 190 determines whether or not the start instructing operation of the panoramic image imaging operation has been performed (step S931), and in the event that the start instructing operation of the panoramic image imaging operation has not been performed, continuously performs monitoring. On the other hand, in the event that the start instructing operation of the panoramic image imaging operation has been performed (step S931), the control unit 190 determines the end position of the panoramic image imaging operation based on the position at the time of the start instructing operation thereof (step S932).

Also, the control unit 190 determines whether or not the determining operation of a subject to be situated in the reference position has been performed (step S933), and in the event that the determining operation thereof has not been performed, the processing proceeds to step S911. On the other hand, in the event that the determining operation thereof has been performed (step S933), the control unit 190 newly determines the end position of the panoramic image imaging operation based on the position at the time of the determining operation thereof (reference position) (step S934), and the processing proceeds to step S911.

2. Second Embodiment

With the first embodiment of the present disclosure, an example has been shown wherein the imaging control is performed based on the determining operation of a subject to be situated in the reference position in a panoramic image by the user's operations. However, with regard to the layout of subjects in the whole of a panoramic image, it may be assumed that the user determine this while viewing a correlation between the whole of the panoramic image and subjects. Therefore, with the second embodiment of the present disclosure, an example will be shown wherein a marker representing a reference subject is situated in a composition assistance image, and the panoramic image imaging operation is controlled so as to obtain the user's desirable composition. Note that the configuration of an imaging apparatus according to the second embodiment of the present disclosure is generally the same as the example shown in FIGS. 1 and 2. Accordingly, portions common to the first embodiment of the present disclosure are denoted with the same reference numerals, and a part of description thereof will be omitted.

The control unit 190 shown in FIG. 2 controls the units of the imaging apparatus 100 based on the operation signal from the operation reception unit 151, and the orientation change information from the orientation detecting unit 121. For example, in the event that a display instructing operation for displaying a composition assistance image (e.g., a composition assistance image display region 601 shown in FIG. 27B) has been received, the control unit 190 controls the display unit 141 to display the composition assistance image. This composition assistance image is an image used for determining the composition of a panoramic image. Also, this composition assistance image is displayed on the display unit 141 in a state in which the movement direction (swing direction) of the imaging apparatus 100 at the time of performing the panoramic image imaging operation, and the longitudinal direction in the composition assistance image generally match. Also, the control unit 190 situates a person-type icon (e.g., a person-type icon 602 shown in FIG. 27B) in the start position in the movement direction of the longitudinal direction of a composition assistance image, and controls the display unit 141 to display this. This person-type icon is a reference subject marker representing a position in a panoramic image of a subject (reference subject) serving as an imaging object of the imaging unit 112 at the time of a display instructing operation thereof being received. Also, the control unit 190 performs control for moving a person-type icon in a composition assistance image from the start position to another edge portion based on change in the orientation of the imaging apparatus 100 which heads for the opposite direction of the movement direction (swing direction). Also, for example, a composition assistance image is a general rectangle, and the size in the longitudinal direction thereof matches the range of movement if the imaging apparatus 100 in the direction of movement at the time of shooting a panoramic image.

Also, the control unit 190 appends a reference position marker representing the reference position (e.g., the reference position mark 604 shown in FIG. 27B) to the position of the composition assistance image corresponding to the reference position in the longitudinal direction of a panoramic image, and displays the composition assistance image.

Also, in the event that the start instructing operation for instructing start of the panoramic image imaging operation has been received, the control unit 190 starts the panoramic image imaging operation with the position where the start instructing operation thereof has been received being taken as the start position of the panoramic image imaging operation. Also, the control unit 190 determines the end position of the panoramic image imaging operation based on the start position thereof. Also, in the event that the start instructing operation thereof has been received, the control unit 190 eliminates the composition assistance image, and displays an operation assistance image for changing the orientation of the imaging apparatus 100 up to the end position thereof.

The display control unit 191 controls the display unit 141 to display the images under control of the control unit 190.

Display Screen Example when Setting Panoramic Image Imaging Mode

Figure 27A:
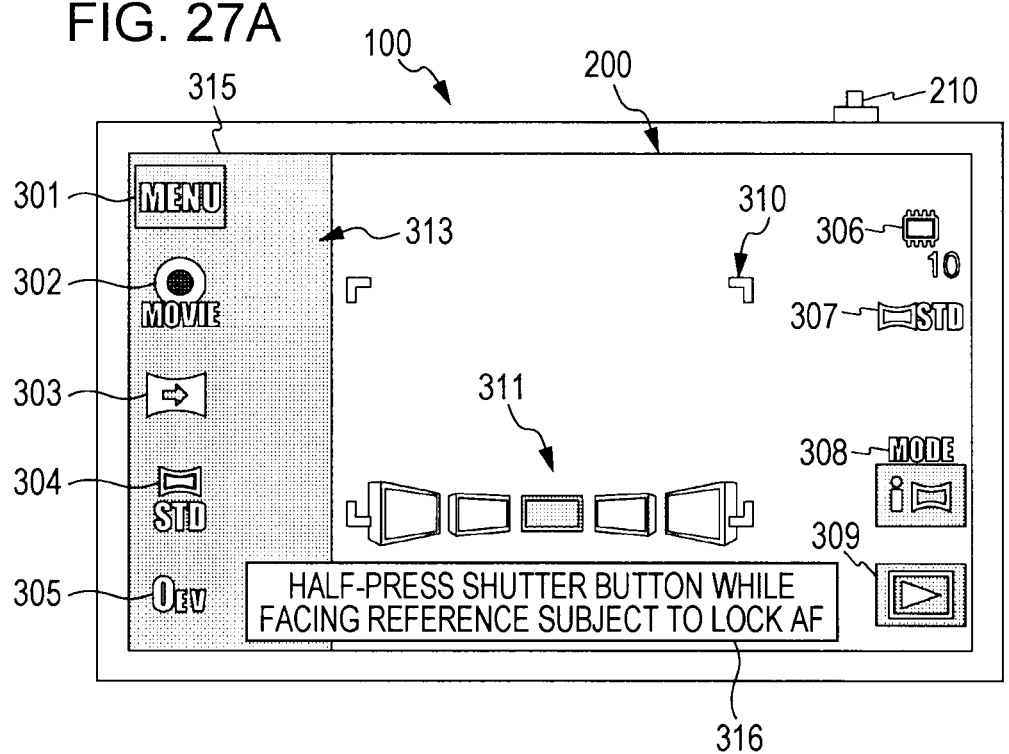
FIGS. 27A and 27B are diagrams illustrating a display screen example to be displayed on the input/output panel according to a second embodiment of the present disclosure.
Figure 27B:
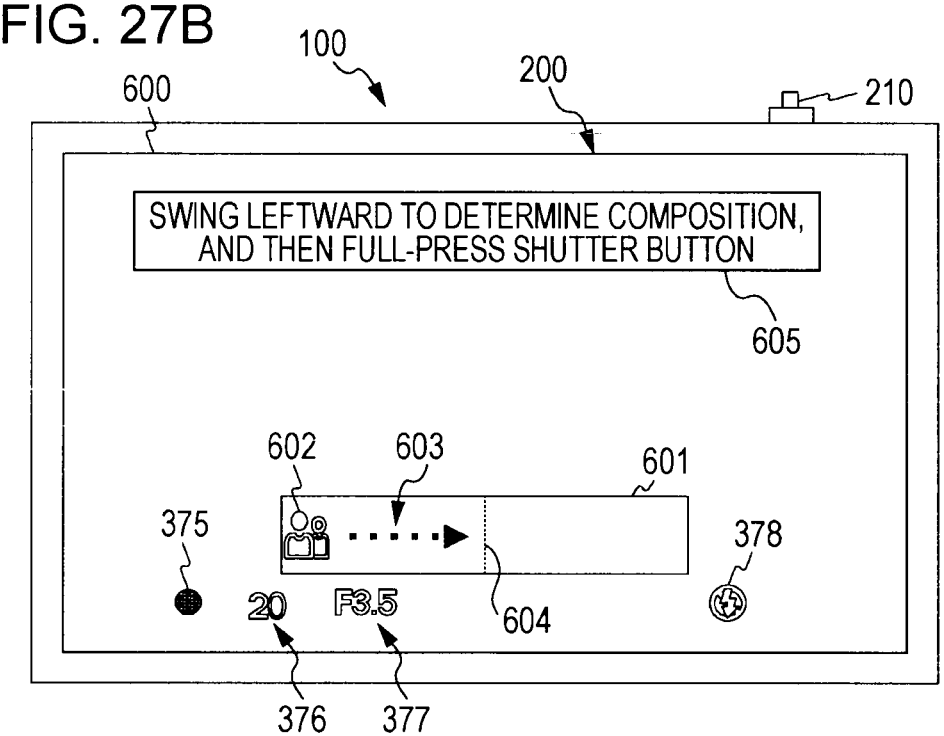

FIGS. 27A and 27B are diagrams illustrating a display screen example to be displayed on the input/output panel 200 according to the second embodiment of the present disclosure.

FIG. 27A illustrates a display screen 315 to be displayed before the start instructing operation of the panoramic image imaging operation. The display screen 315 is the same as the display screen 300 shown in FIG. 4, and "HALF-PRESS SHUTTER BUTTON WHILE FACING REFERENCE SUBJECT TO LOCK AF" is displayed in a message display region 316. Also, a subject served as an imaging object by the imaging unit 112 is displayed on the display screen 315.

FIG. 27B illustrates a swing operation assistance screen 600. The swing operation assistance screen 600 is a display screen to be displayed in the event that the shutter button 210 has been half-pressed in a state in which the display screen 315 shown in FIG. 27A is displayed, and is displayed until start of the panoramic image imaging operation. Note that, with the second embodiment of the present disclosure, an example will be shown wherein the display instructing operation of the swing operation assistance screen 600 is performed by the half-pressing operation of the shutter button 210, and the start instructing operation of the panoramic image imaging operation is performed by the full-pressing operation of the shutter button 210.

Specifically, with the swing operation assistance screen 600, a composition assistance image display region 601 and a message display region 605 are provided. Note that a focusing informing icon 375, a shutter speed informing icon 376, an F value informing icon 377, and a flash prohibition icon 378 are the same as those shown in FIG. 10B and others, and accordingly denoted with the same reference numerals, and description thereof will be omitted here.

The composition assistance image display region 601 is a display region in bar used at the time of determining the position of the reference subject in a panoramic image. The composition assistance image display region 601 is displayed in a state in which the movement direction (swing direction) of the imaging apparatus 100 at the time of performing the panoramic image imaging operation generally matches the longitudinal direction of the composition assistance image. Here, the reference subject is a subject displayed on the center of the display screen at the time of the shutter button 210 being half-pressed in a state in which the display screen 315 is displayed, and an example of this is a cattle image 401 shown in FIG. 28A.

Also, a person-type icon 602 virtually representing the position of a panoramic image situated where the reference subject determined by the user's operations before start of the imaging operation is displayed in the composition assistance image display region 601. The person-type icon 602 moves in the composition assistance image display region 601 according to change in the orientation of the imaging apparatus 100.

Specifically, in the event that the setting for performing the swing operation from the left to the right has been set, when the shutter button 210 is half-pressed in a state in which the display screen 315 is displayed, the person-type icon 602 is situated in the left edge in the composition assistance image display region 601. The person-type icon 602 then moves from the left to the right in the composition assistance image display region 601, according to change in the orientation of the imaging apparatus 100 (change heading from the right to the left). Also, a dotted-line arrow 603 representing this movement direction is displayed in the composition assistance image display region 601.

A reference position mark 604 representing the reference position in a panoramic image is displayed in the composition assistance image display region 601. With this example, an example is shown wherein a dotted line is appended to the composition assistance image display region 601 as the reference position mark 604. Note that the layout of the reference position mark 604 in the composition assistance image display region 601 is the same as the reference position mark 379 according to the first embodiment of the present disclosure (shown in FIG. 10B and others), and accordingly, description thereof will be omitted here.

Now, a relative relation between the composition assistance image display region 601 and the person-type icon 602 will be described. The composition assistance image display region 601 virtually represents the outline of a panoramic image, and the person-type icon 602 virtually represents the position of the reference subject situated in the panoramic image thereof. Specifically, the composition assistance image display region 601 corresponds to the panoramic image, and the person-type icon 602 corresponds to a subject included in the panoramic image.

Note that the movement of the person-type icon 602 in the composition assistance image display region 601 (movement according to change in the orientation of the imaging apparatus 100) is the same as the operation position 372 according to the first embodiment of the present disclosure except that the movement directions differ. Accordingly, description thereof will be omitted here.

The message display region 605 is a region where a message for providing assistance for the user's operations relating to the panoramic image imaging operation (the swing operation of the imaging apparatus 100) is displayed.

Imaging Control Example in Fourth Imaging Mode

Figure 28A:
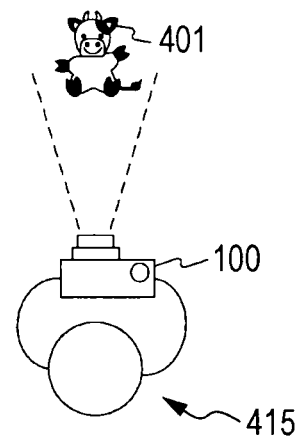
FIGS. 28A and 28B are diagrams schematically illustrating an example of the orientation of the imaging apparatus according to the second embodiment of the present disclosure, a display screen to be displayed on the input/output panel.
Figure 28B:
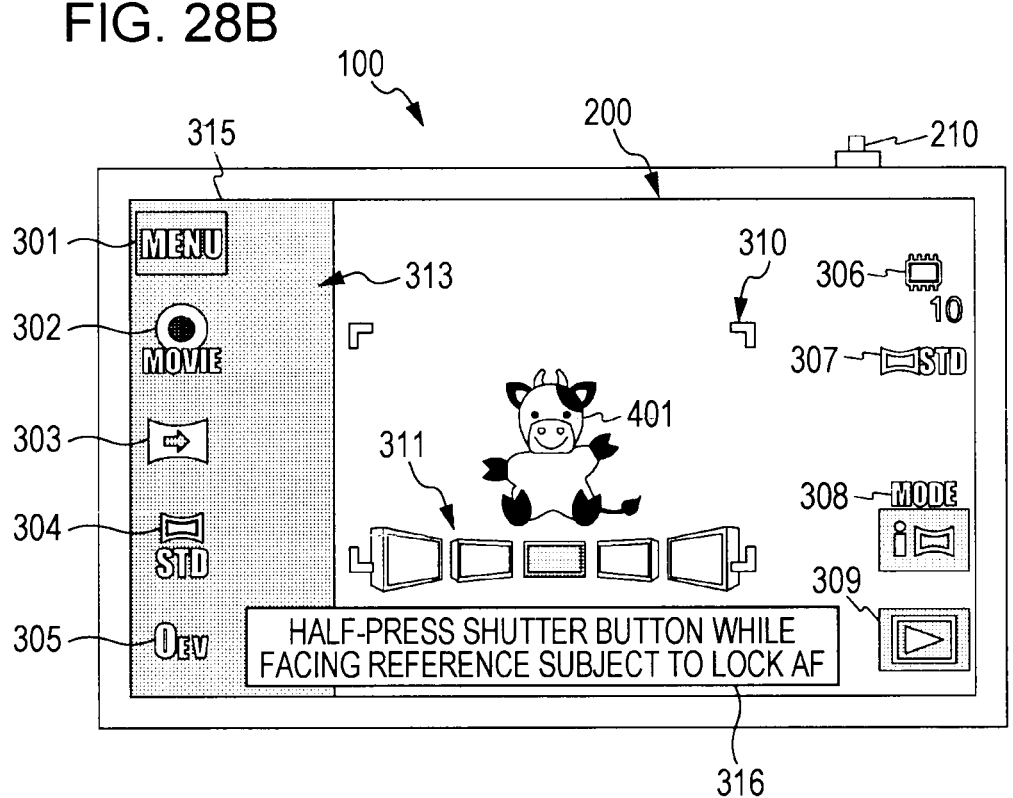

FIGS. 28A and 28B are diagrams schematically illustrating an example of the orientation of the imaging apparatus 100 according to the second embodiment of the present disclosure, and a display screen displayed on the input/output panel 200. Also, the second embodiment of the present disclosure will show an imaging operation example in the event that the fourth imaging mode has been set, and a setting for performing the swing operation from the left to the right as the swing direction has been set as the image size. Also, the second embodiment of the present disclosure will show an imaging operation example in the event that the center position (e.g., the position of "0°" in the reference position specifying bar 351) is set as the reference position in a panoramic image.

FIG. 28A illustrates a case where the imaging apparatus 100, and the user 415 holding the imaging apparatus 100 in both hands are viewed from above, in a simplified manner. In this case, let us say that the user 415 confirms a reference subject (cattle image 401) in a panoramic image while viewing a subject displayed on the input/output panel 200.

FIG. 28B illustrates a display screen 315 to be displayed before a determination operation for determining the position of a reference subject (reference position) in a panoramic image is performed. The display screen 315 is the same as the display screen 315 shown in FIG. 27A. Also, a subject served as an imaging object by the imaging unit 112 (cattle image 401) is displayed as a through image. Also, with regard to a case where the user 415 has performed a half-pressing operation of the shutter button 210 in the state shown in FIG. 28A, a swing operation assistance screen 600 shown in FIG. 27B is displayed. Also, with regard to a transition example of change in the orientation of the imaging apparatus 100, and the display screen after the swing operation assistance screen 600 is displayed, description will be made in detail with reference to FIGS. 29A through 32C.

FIGS. 29A through 32C are diagrams schematically illustrating a relation example of the orientation of the imaging apparatus 100 according to the second embodiment of the present disclosure, a display screen displayed on the input/output panel 200, and a reference subject in a panoramic image. Specifically, FIGS. 29A, 30A, 31A, and 32A illustrate an orientation example of the imaging apparatus 100 at the time of a full-pressing operation of the shutter button 210. Note that, in FIGS. 29A, 30A, 31A, and 32A, the user 415 and the imaging apparatus 100 are indicated with a dotted line. Also, FIGS. 29B, 30B, 31B, and 32B illustrate an example of the swing operation assistance screen 600 displayed on the input/output panel 200 according to the orientation of the imaging apparatus 100 immediately before the full-pressing operation of the shutter button 210. Also, FIGS. 29C, 30C, 31C, and 32C illustrate an example of a panoramic image generated at the time of the full-pressing operation of the shutter button 210 being performed in the states shown in FIGS. 29A, 30A, 31A, and 32A. Note that the examples shown in FIGS. 29A through 32C are examples wherein a part of FIGS. 8A through 14B has been modified, and accordingly, portions common to FIGS. 8A through 14B will be denoted with the same reference numerals, and a part of description thereof will be omitted.

Figure 29A:
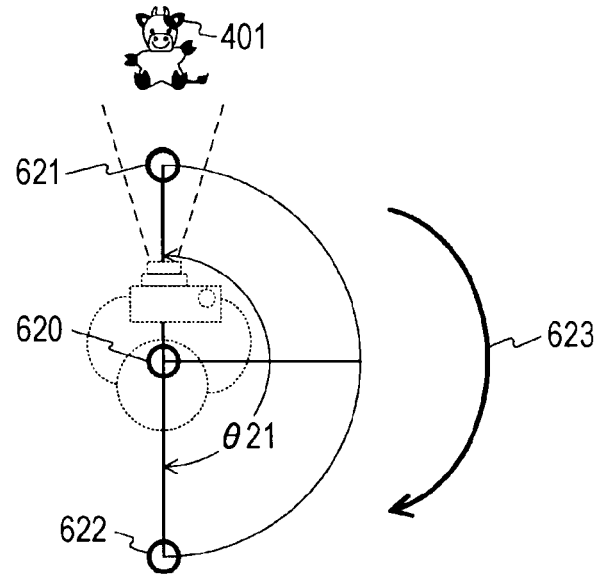
FIGS. 29A, 29B and 29C are diagrams schematically illustrating a relation example between the orientation of the imaging apparatus according to the second embodiment of the present disclosure, a display screen to be displayed on the input/output panel, and a reference subject in a panoramic image.
Figure 29B:
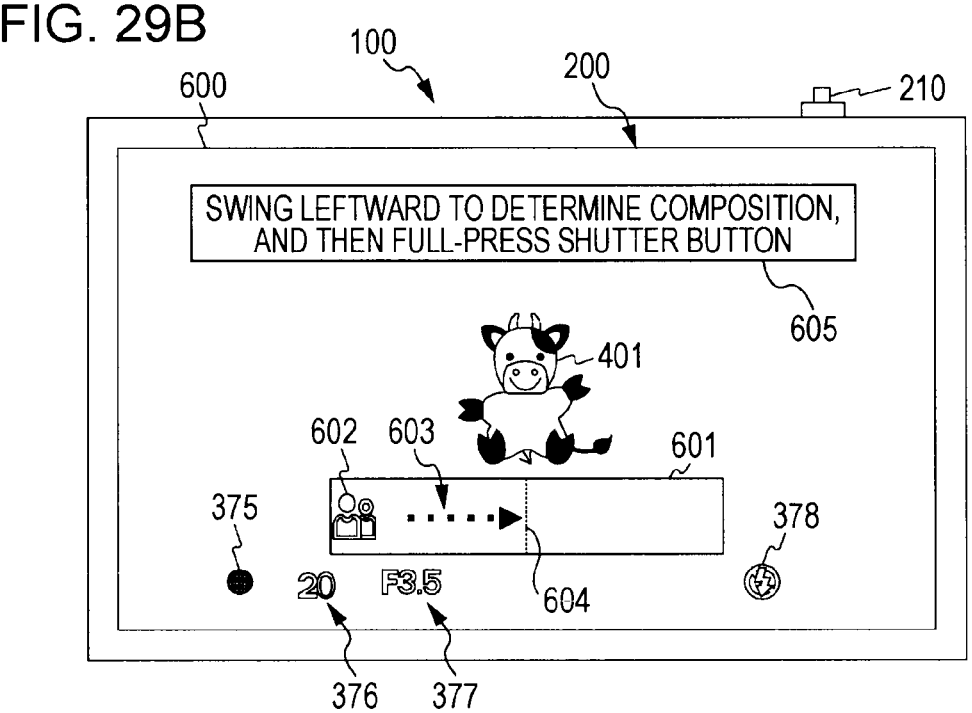
Figure 29C:
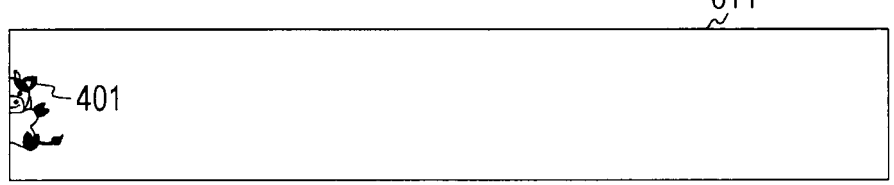

FIGS. 29A through 29C illustrate a case where immediately after a half-pressing operation of the shutter button 210, a full-pressing operation thereof is performed (or a case where a full-pressing operation is performed without a half-pressing operation of the shutter 210 being not performed).

For example, as shown in FIG. 28A, the user 415 holding the imaging apparatus 100 in both hands confirms the reference subject (cattle image 401) in a panoramic image while viewing a subject displayed on the input/output panel 200. In this case, as shown in FIG. 28B, the display screen 315 is displayed on the input/output panel 200.

FIG. 29A illustrates a case where the user 415 has performed a full-pressing operation of the shutter button 210 in the state shown in FIG. 28A, in a simplified manner. In this case, the position in the optical-axis direction from a position 620 at the time of pressing thereof is determined to be a start position 621. An end position 622 of the imaging operation is then determined based on the start position 621. Specifically, the end position 622 is determined from the start position 621 of the imaging operation based on an image size θ21 (=180 degrees) that has been set.

In this way, in the event that the user 415 has performed a full-pressing operation of the shutter button 210, the imaging operation is started from the position at the time of pressing thereof (start position 621). Accordingly, in the event that the user 415 has performed a full-pressing operation of the shutter button 210 in the state shown in FIG. 29A, a panoramic image 611 (FIG. 29C) where the reference subject (cattle image 401) is situated on the left edge is generated.

FIG. 29B illustrates the swing operation assistance screen 600 displayed on the input/output panel 200 immediately before the user 415 performs a full-pressing operation of the shutter button 210 in the state shown in FIG. 29A. In this case, the full-pressing operation is performed immediately after a half-pressing operation of the shutter button 210, and accordingly, the person-type icon 602 is situated on the left edge of the composition assistance image display region 601.

Also, the layout of the reference subject (cattle image 401) in the panoramic image 611 shown in FIG. 29C generally matches the layout of the reference subject (cattle image 401) in the composition assistance image display region 601.

Note that FIGS. 29A through 29C illustrate an example in the event that immediately after a half-pressing operation of the shutter button 210, a full-pressing operation thereof is performed, but this case may also be applied to a case where after the orientation of the imaging apparatus 100 is changed, a full-pressing operation is performed. These examples will be shown in FIGS. 30A through 32C.

Figure 30A:
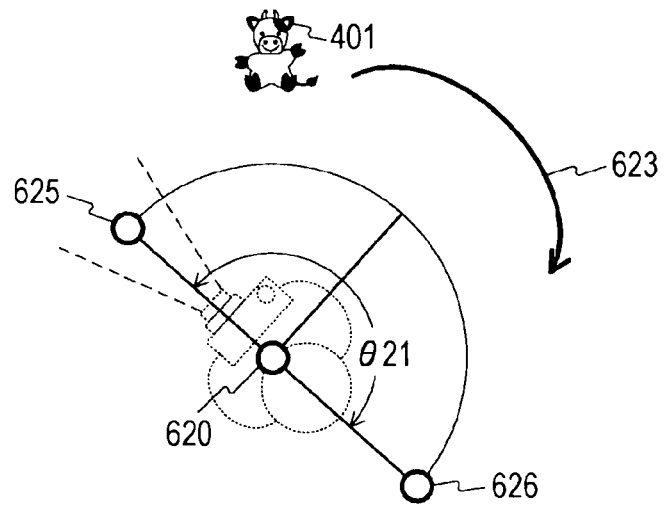
FIGS. 30A, 30B and 30C are diagrams schematically illustrating a relation example between the orientation of the imaging apparatus according to the second embodiment of the present disclosure, a display screen to be displayed on the input/output panel, and a reference subject in a panoramic image.
Figure 30B:
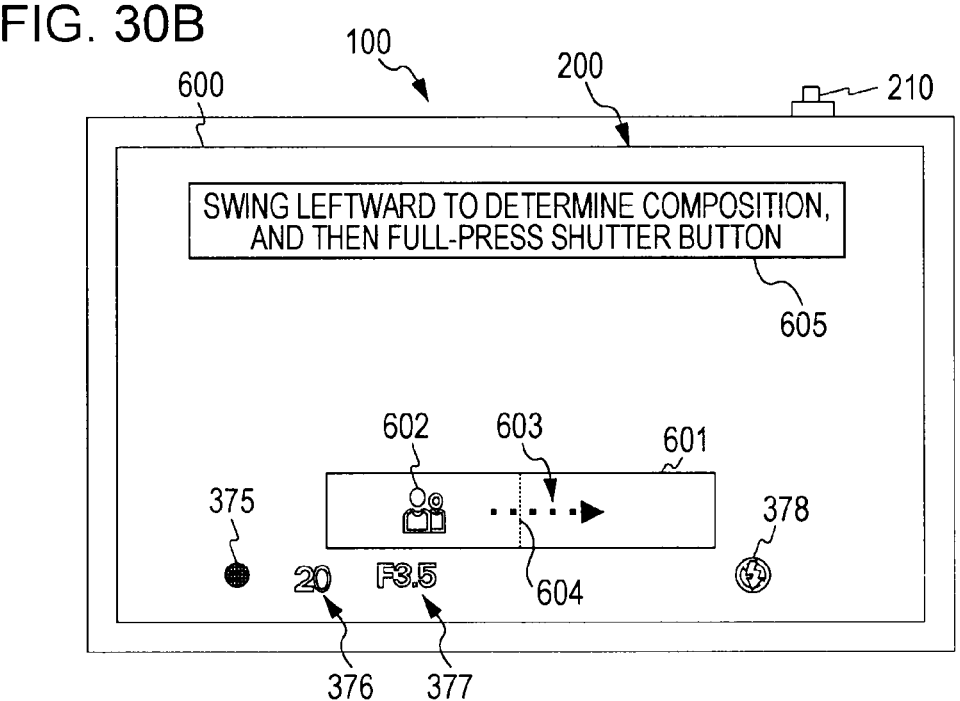
Figure 30C:
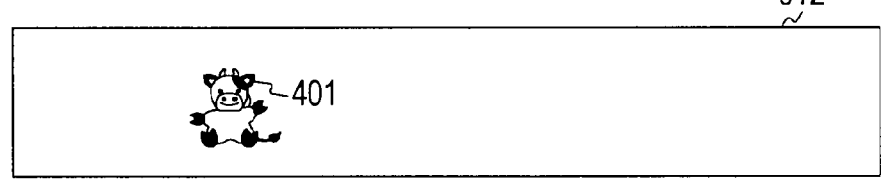

FIGS. 30A through 30C illustrate a case where after a half-pressing operation of the shutter button 210, a full-pressing operation is performed at timing wherein the change amount in the orientation of the imaging apparatus 100 is relatively small.

FIG. 30A illustrates a case where the user 415 has performed full-pressing of the shutter button 210 at timing wherein the change amount in the orientation of the imaging apparatus 100 is relatively small from the state shown in FIG. 28A, in a simplified manner. In this case, the position in the optical-axis direction from the position 620 at the time of pressing thereof is determined to be the start position 625. The end position 626 of the imaging operation is then determined based on the start position 625. Specifically, the end position 626 is determined from the start position 625 of the imaging operation based on an image size θ21 (=180 degrees) that has been set.

In this way, in the event that the user 415 has performed a full-pressing operation of the shutter button 210, the image operation is started from the position at the time of pressing thereof (start position 625). Accordingly, in the event that the user 415 has performed a full-pressing operation of the shutter button 210 in the state shown in FIG. 30A, a panoramic image 612 (shown in FIG. 30C) in which the reference subject (cattle image 401) is situated in a position towards the left from the center position in the composition assistance image display region 601 is generated.

FIG. 30B illustrates the swing operation assistance screen 600 displayed on the input/output panel 200 immediately before the user 415 performs a full-pressing operation of the shutter button 210 in the state shown in FIG. 30A. In this case, a full-pressing operation is performed at timing wherein the change amount of the orientation of the imaging apparatus 100 is relatively small after a half-pressing operation of the shutter button 210, and accordingly, the person-type icon 602 is situated in a position towards the left from the center position in the composition assistance image display region 601.

Also, the layout of the reference subject (cattle image 401) in the panoramic image 612 shown in FIG. 30C generally matches the layout of the reference subject (cattle image 401) in the composition assistance image display region 601.

Also, FIGS. 31A through 32C illustrate a case where after a half-pressing operation of the shutter button 210, a full-pressing operation is performed at timing wherein the change amount of the orientation of the imaging apparatus 100 is relatively great. Note that a determining method of start positions 631 and 635, and end positions 632 and 636, and a method for situating the person-type icon 602 in the composition assistance image display region 601 are the same as those in FIGS. 29A through 30C, and accordingly, description thereof will be omitted here.

Figure 31A:
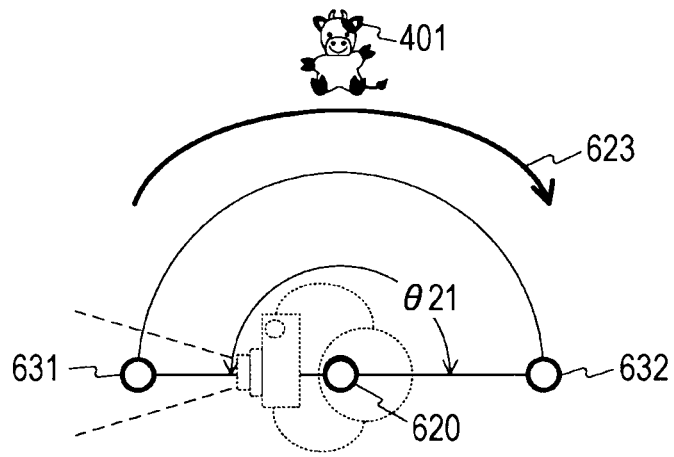
FIGS. 31A, 31B and 31C are diagrams schematically illustrating a relation example between the orientation of the imaging apparatus according to the second embodiment of the present disclosure, a display screen to be displayed on the input/output panel, and a reference subject in a panoramic image.
Figure 31B:
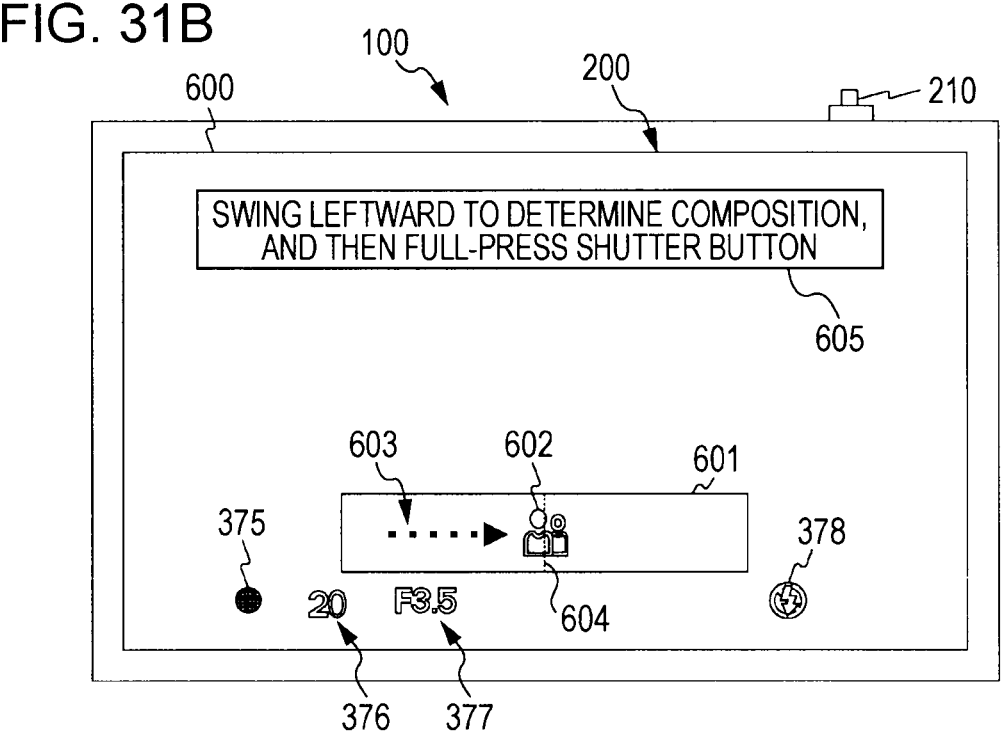
Figure 31C:
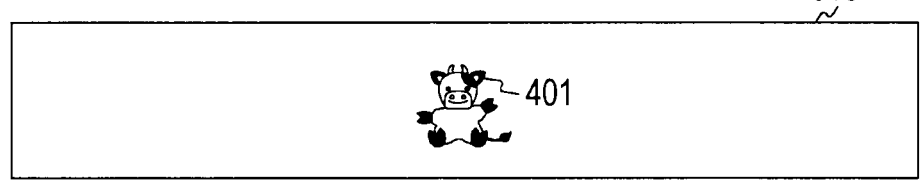
Figure 32A:
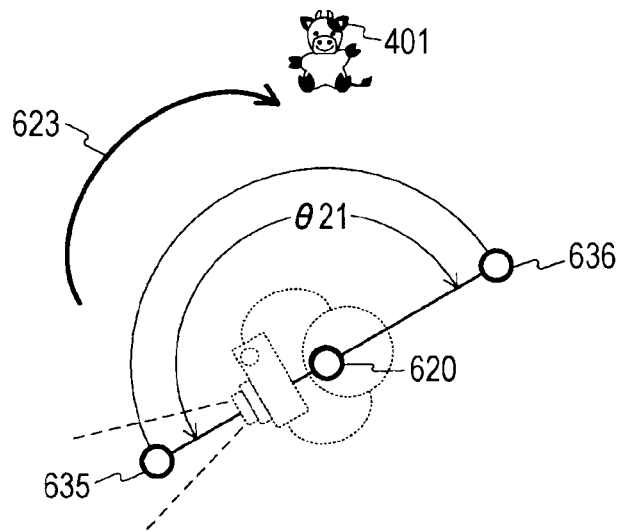
FIGS. 32A, 32B and 32C are diagrams schematically illustrating a relation example between the orientation of the imaging apparatus according to the second embodiment of the present disclosure, a display screen to be displayed on the input/output panel, and a reference subject in a panoramic image.
Figure 32B:
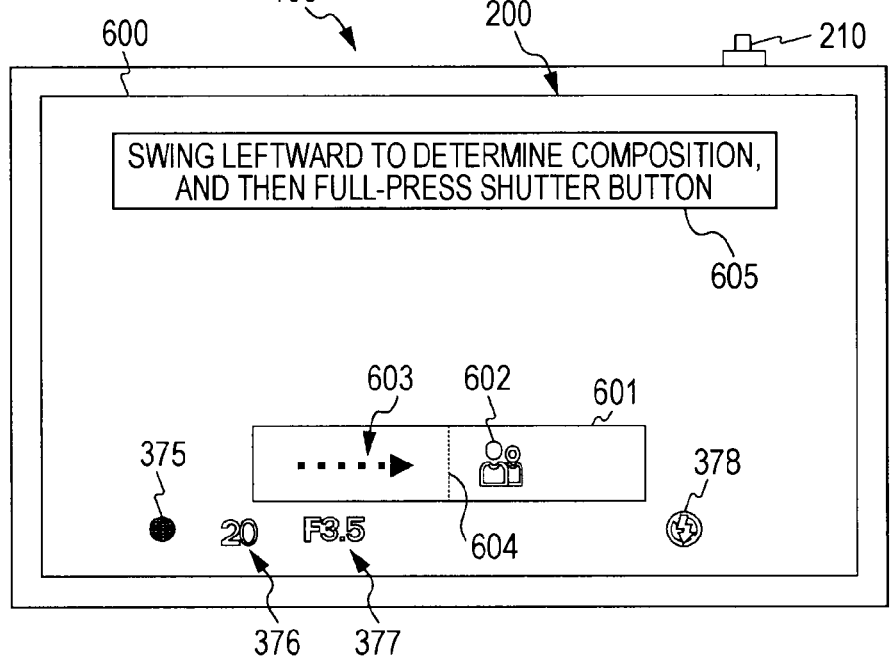
Figure 32C:
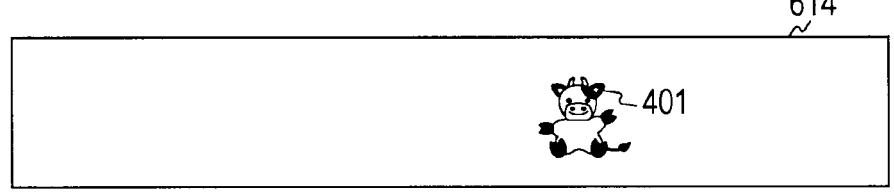

Also, the layout of the reference subject (cattle image 401) in the panoramic image 613 shown in FIG. 31C generally matches the layout of the reference subject (cattle image 401) in the composition assistance image display region 601. Similarly, the layout of the reference subject (cattle image 401) in the panoramic image 614 shown in FIG. 32C generally matches the layout of the reference subject (cattle image 401) in the composition assistance image display region 601.

Here, the example shown in FIGS. 31A through 31C illustrates, as shown in FIG. 31B, a case where a full-pressing operation is performed at timing when the person-type icon 602 being situated on the reference position mark 604 in the composition assistance image display region 601. In this case, as shown in FIG. 31C, the reference subject (cattle image 401) is situated in the center position (reference position) in the panoramic image 613. Thus, a panoramic image where the reference subject (cattle image 401) is situated in the center position (reference position) in the panoramic image 613 can be readily generated. Note that an arrangement may be made wherein the person-type icon 602 is blinked at timing when the person-type icon 602 is situated on the reference position mark 604, thereby informing the user of timing when the reference subject is situated in the reference position in the panoramic image.

In this way, the user 415 may perform a full-pressing operation of the shutter button 210 at desired timing while confirming the position of the reference subject (cattle image 401) in the composition assistance image display region 601. Thus, the reference subject in the panoramic image may be situated in a desired position, and accordingly, a user's favorite panoramic image may readily be generated.

Note that, with this example, a half-pressing operation of the shutter button 210 by the user 415 will be taken as a display condition for the swing operation assistance screen 600, and a full-pressing operation of the shutter button 210 will be taken as a determining condition for the start position of the imaging operation, but another condition may be employed. For example, a full-pressing operation for the shutter button 210 may be employed as a display condition of the swing operation assistance screen 600, and a determining condition for the start position of the imaging operation. Also, for example, an operation for pressing the shutter button 210 twice (what we might call clicking twice), or a pressing operation of a dedicated button may be taken as a display condition for the swing operation assistance screen 600.

Also, imaging operation after start of the panoramic image imaging operation is generally the same as the example shown in FIGS. 12A through 14B, and accordingly, description thereof will be omitted here.

Example Using Reference Subject as Icon

An example has been shown so far wherein the person-type icon 602 is situated in the composition assistance image display region 601, but the image of the reference subject may be situated instead of the person-type icon 602. Accordingly, with FIGS. 33A through 34B, an example will be shown wherein the image of the reference subject is situated in the composition assistance image display region 601.

Specifically, the control unit 190 shown in FIG. 2 performs control for situating the image of at least a part of a subject serving as an imaging object of the imaging unit 112 at the time of receiving a display instructing operation for displaying a composition assistance image in the composition assistance image as a reference subject marker, and displaying this. Also, the control unit 190 performs control for situating the image of at least a part of a subject serving as an imaging object of the imaging unit 112 at the time of receiving the display instructing operation thereof in the composition assistance image as a reference subject marker, and displaying this. In this case, the control unit 190 performs control so as to display the reference subject marker in the composition assistance image (e.g., reference subject image 651 shown in FIG. 34B) and the reference position marker (e.g., reference subject image 652 shown in FIG. 34B) as different display modes.

Figure 33A:
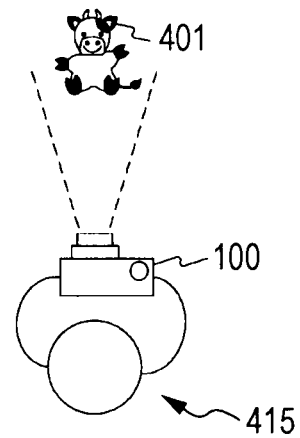
FIGS. 33A and 33B are diagrams schematically illustrating an example of the orientation of the imaging apparatus according to the second embodiment of the present disclosure, and a display screen to be displayed on the input/output panel.
Figure 33B:
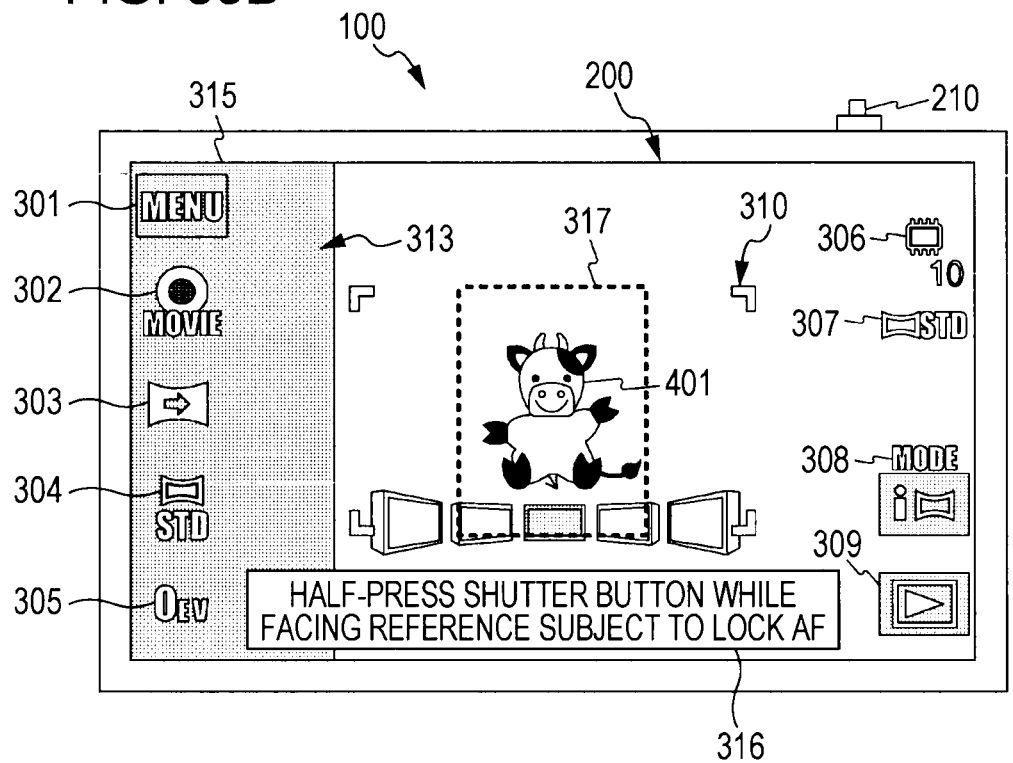

FIGS. 33A and 33B are diagrams schematically illustrating an example of the orientation of the imaging apparatus 100 according to the second embodiment of the present disclosure, and a display screen displayed on the input/output panel 200. Note that FIG. 33B is the same as FIG. 28B except that an extraction frame 317 of the reference subject image is appended to the display screen 315 in FIG. 28B.

Figure 34A:
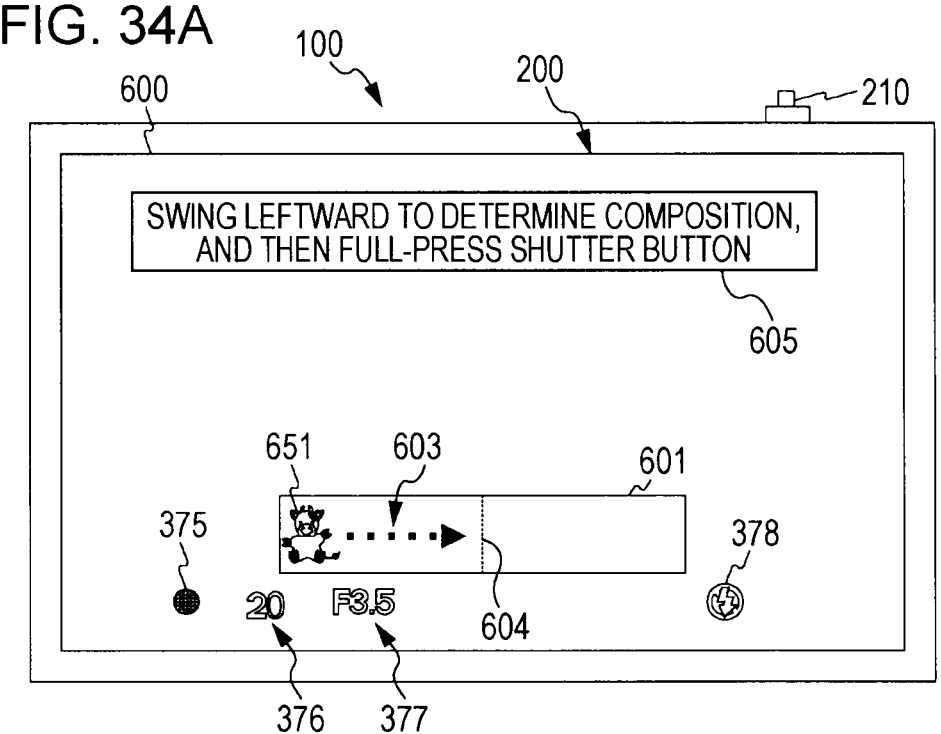
FIGS. 34A and 34B are diagrams illustrating a display screen example to be displayed on the input/output panel according to a second embodiment of the present disclosure.
Figure 34B:
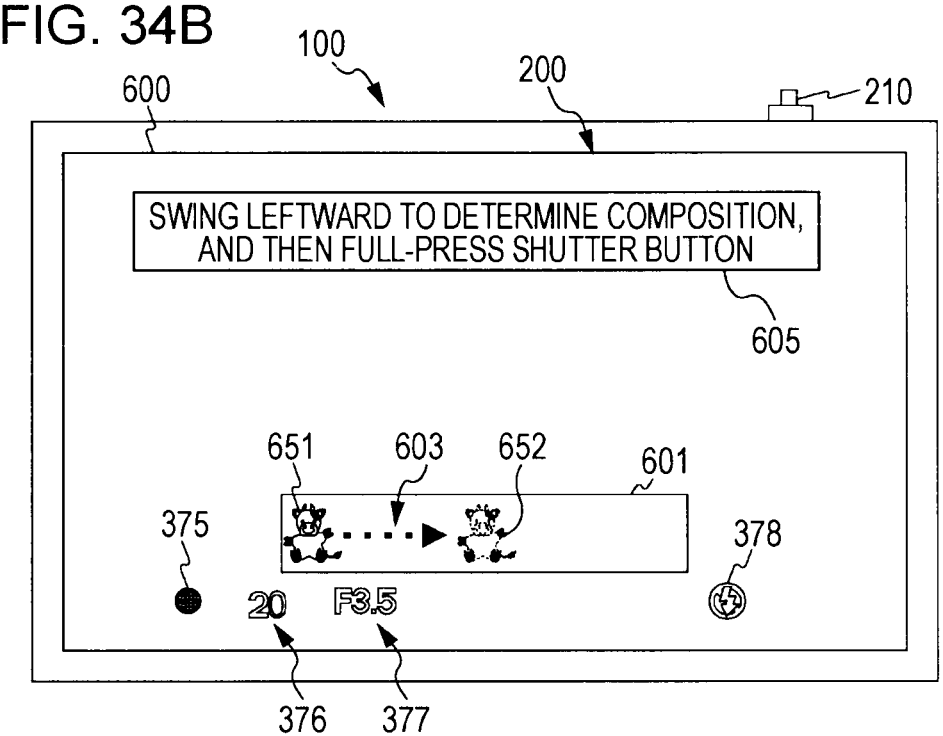

The extraction frame 317 is a frame used at the time of extracting the image of the reference subject to be situated in the composition assistance image display region 601. For example, let us assume a case where in the event of the display screen 315 shown in FIG. 33B being displayed, a half-pressing operation of the shutter button 210 has been performed. In this case, the panoramic image generating unit 132 extracts an image included in the extraction frame 317 (reference subject image) from the image generated by the imaging unit 112. The display control unit 191 then controls the input/output panel 200 to display the swing operation assistance screen 600, situates the extracted image (reference subject image) in the composition assistance image display region 601 in the swing operation assistance screen 600, and displays this. In this case, according to the size of the composition assistance image display region 601, the extracted image (reference subject image) is reduced and displayed. A display example of this reference subject image is shown in FIGS. 34A and 34B. Note that a method for situating and moving the reference subject image in the composition assistance image display region 601 is the same as with the person-type icon 602, and accordingly, description thereof will be omitted here.

FIGS. 34A and 34B are diagrams illustrating a display screen example to be displayed on the input/output panel 200 according to the second embodiment of the present disclosure.

FIG. 34A illustrates an example wherein, with the swing operation assistance screen 600 shown in FIG. 27B, the reference subject image 651 is situated and displayed instead of the person-type icon 602 in the composition assistance image display region 601. In this way, the reference subject image 651 is situated in the composition assistance image display region 601 and displayed, whereby the actual reference subject (cattle image 401) on a panoramic image can readily be assumed, and determination of a composition can readily be performed.

FIG. 34B illustrates an example wherein, with the swing operation assistance image 600 shown in FIG. 34A, the reference subject image 652 is situated and displayed instead of the reference position mark 604 in the composition assistance image display region 601. Note that it is desirable to display the reference subject image 652 and reference subject image 651 as different display modes. For example, it is desirable to display the reference subject image 652 so as to be less represented as compared to the reference subject image 651. For example, a value α (numeric value representing transparency) is changed, whereby the transparency of the reference subject image 652 can be displayed so as to be lower than the reference subject image 651. Note that FIG. 34B illustrates the reference subject image 652 using a dotted line as an example to be displayed so as not to be inconspicuous as compared to the reference subject image 651.

Thus, timing wherein the reference subject image 651 is overlapped with the reference subject image 652 in the composition assistance image display region 601 becomes timing wherein a reference subject is situated in the reference position in a panoramic image. Accordingly, an operation for situating a reference subject in a reference position in a panoramic image can be performed in a relatively easy-to-see manner.

Note that, with this example, an example is shown wherein an image included in the extraction frame 317 having a particular size is extracted as a reference subject image, and this reference subject image is situated in the composition assistance image display region 601. However, for example, an arrangement may be made wherein a face detecting unit is provided to the imaging apparatus 100, a face portion alone of an image included in the extraction frame 317 having a particular size is detected and extracted, and this face is situated in the composition assistance image display region 601 as a reference subject image. Note that in the event that there are many faces included in the extraction frame 317 having a particular size, a face having a high evaluation value (e.g., smile face, great in size) may be employed. Alternatively, an arrangement may be made wherein a detecting unit for detecting a particular object other than faces is provided to the imaging apparatus 100, and the particular object detected and extracted by the detecting unit thereof is situated in the composition assistance image display region 601 (particular object within the extraction frame 317) as a reference subject image.

Operation Example of Imaging Apparatus

Next, the operation of the imaging apparatus 100 according to the second embodiment of the present disclosure will be described with reference to the drawings.

Operation Example in Fourth Imaging Mode

Figure 35:
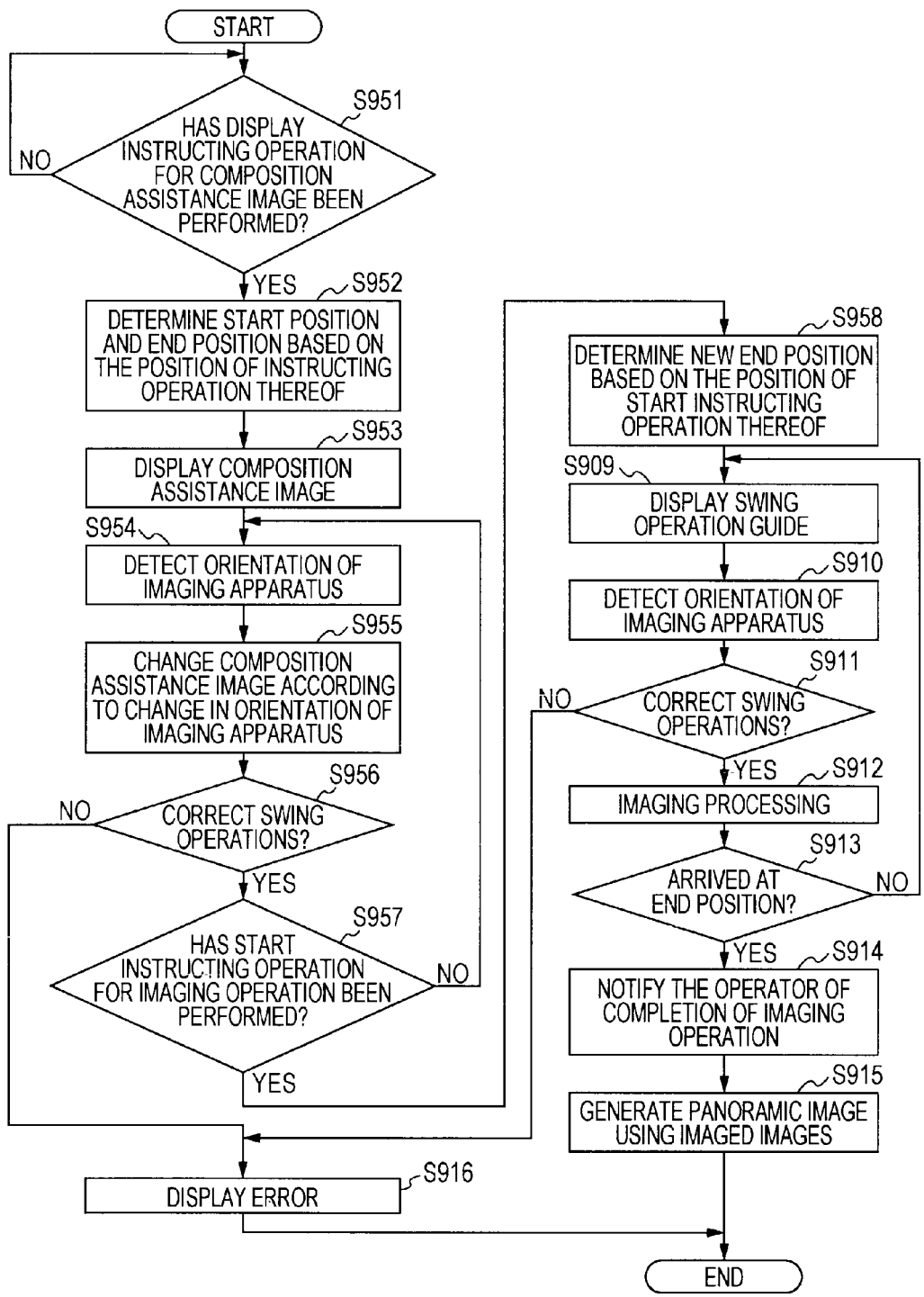
FIG. 35 is a flowchart illustrating an example of imaging control processing procedures according to the imaging apparatus according to the second embodiment of the present disclosure.

FIG. 35 is a flowchart illustrating an example of the processing procedure of the imaging control processing by the imaging apparatus 100 according to the second embodiment of the present disclosure. With this example, an example of the processing procedure in the event that the fourth imaging mode has been set is shown. Also, this processing procedure is a modification of FIG. 24, and accordingly, portions common to FIG. 24 are denoted with the same reference numerals, and description thereof will be omitted.

First, the control unit 190 determines whether or not a display instructing operation for a composition assistance image has been performed (step S951), and in the event that the display instructing operation thereof has not been performed, continuously performs monitoring. On the other hand, in the event that the display instructing operation thereof has been performed (step S951), the control unit 190 determines the start position and end position of the panoramic image imaging operation based on the position at the time of the display instructing operation (step S952). Note that the start position and end position are imaginary positions used for displaying a composition assistance image.

Next, the display control unit 191 controls the display unit 141 to display the composition assistance image (e.g., swing operation assistance screen 600 shown in FIG. 27B (composition assistance image display region 601)) under control of the control unit 190 (step S953), for example.

Next, the orientation detecting unit 121 detects change in the orientation of the imaging apparatus 100 (step S954). Next, the control unit 190 moves the reference subject marker in the composition assistance image (e.g., the person-type icon 602 shown in FIG. 27B) based on the detected orientation change (step S955). Next, the control unit 190 determines whether or not the correct swing operation has been performed based on the detected orientation change (step S956). In the event that the correct swing operation has not been performed (step S956), the processing proceeds to step S916.

Also, in the event that the correct swing operation has been performed (step S956), determination is made whether or not a start instructing operation for the imaging operation has been performed (step S957), and in the event that a start instructing operation for the imaging operation has not been performed, the processing returns to step S954. On the other hand, in the event that a start instructing operation for the imaging operation has been performed (step S957), the control unit 190 determines the end position of the panoramic image imaging operation based on the position at the time of the start instructing operation thereof (step S958).

Display Example when Vertical Direction is Taken as Swing Direction

With the first and second embodiments of the present disclosure, an example has been shown wherein a panoramic image is generated by performing the swing operation in the horizontal direction. However, as described above, a panoramic image may be generated by performing the swing operation in the vertical direction. Therefore, FIGS. 36A and 36B illustrate a display screen example to be displayed on the input/output panel 200 in the event of performing the swing operation in the vertical direction.

Figure 36A:
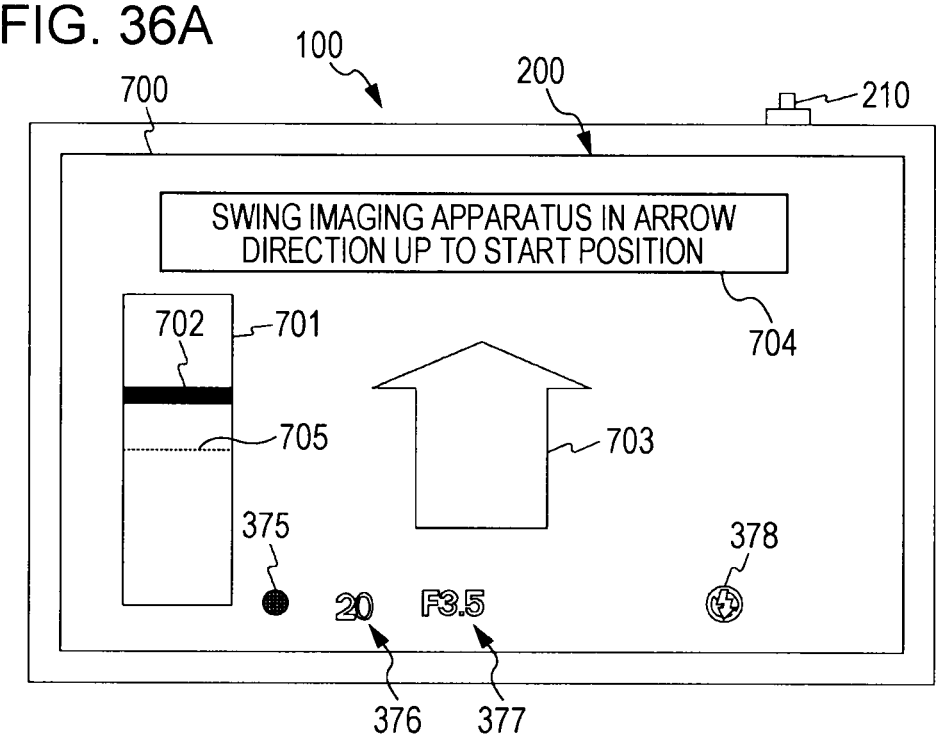
FIGS. 36A and 36B are diagrams illustrating a display screen example to be displayed on the input/output panel according to the second embodiment of the present disclosure.
Figure 36B:
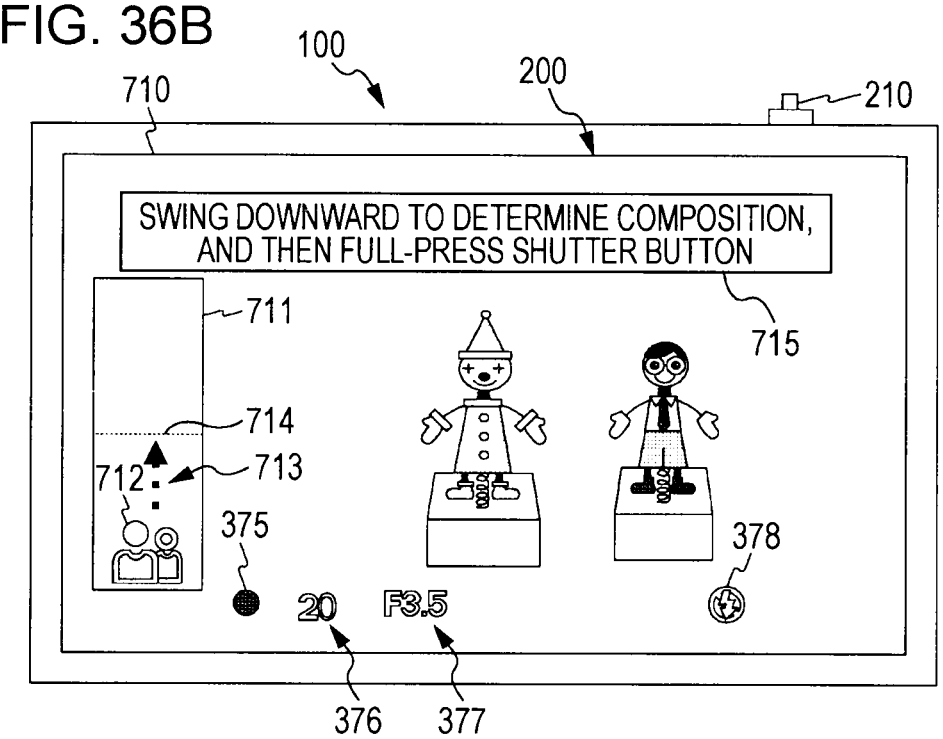

FIGS. 36A and 36B are diagrams illustrating a display screen example to be displayed on the input/output panel 200 according to the first and second embodiments of the present disclosure.

FIG. 36A illustrates a swing operation assistance screen 700 to be displayed on the input/output panel 200 in the event that one of the first though third imaging modes has been set. With the swing operation assistance screen 700, a swing operation assistance image display region 701, an arrow 703, and a message display region 704 are provided. Note that the swing operation assistance screen 700 is the same as the swing operation assistance screen 370 shown in FIG. 10B except that the directions of the units, and so forth differ, and accordingly, description thereof will be omitted here.

FIG. 36B illustrates a swing operation assistance screen 710 to be displayed on the input/output panel 200 in the event the fourth imaging mode has been set. With the swing operation assistance screen 710, a swing operation assistance image display region 711, and a message display region 715 are provided. Note that the swing operation assistance screen 710 is the same as the swing operation assistance screen 600 shown in FIG. 27B except that the directions of the units, and so forth differ, and accordingly, description thereof will be omitted here.

3. Modifications

Modifications of Imaging Operation of Panoramic Image

With the first and second embodiments of the present disclosure, an example has been shown wherein the panoramic image imaging operation is performed by the user performing the swing operation of the imaging apparatus 100 with the position of the imaging apparatus 100 as a reference. However, for example, the panoramic image imaging operation may be assumed to be performed by moving the imaging apparatus 100 on a straight line generally in parallel with a subject. Therefore, description will be made below regarding an example wherein the panoramic image imaging operation is performed by moving the imaging apparatus 100 on a straight line generally in parallel with a subject.

Figure 37A:
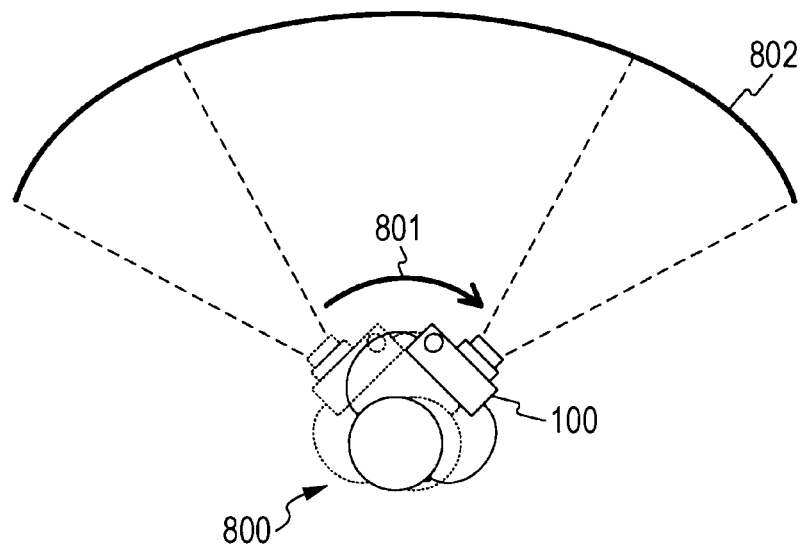
FIGS. 37A and 37B are diagrams schematically illustrating imaging operation at the time of generating a panoramic image using the imaging apparatuses according to the first embodiment and second embodiment of the present disclosure.
Figure 37B:
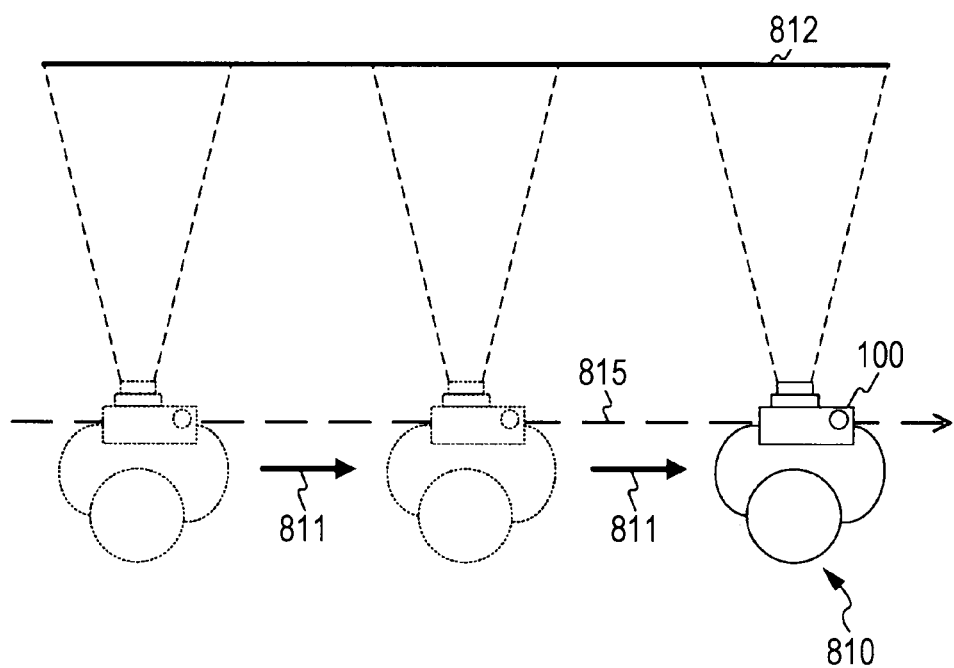

FIGS. 37A and 37B are diagrams schematically illustrating the imaging operation at the time of generating a panoramic image by the imaging apparatus 100 according to the first and second embodiments of the present disclosure. FIG. 37A schematically illustrates a state viewed from above regarding the imaging operation for generating a panoramic image by rotating the imaging apparatus 100 in the horizontal direction (swing direction 801) with the position of the imaging apparatus 100 (the position of a user 800) as the rotation center. Also, FIG. 37A schematically illustrates the imaging range of a panoramic image generated by the imaging operation thereof using a thick line as a panoramic image imaging range 802. Note that the example shown in FIG. 10A is the same as an example shown in the first and second embodiments of the present disclosure, and accordingly, description thereof will be omitted here.

FIG. 37B schematically illustrates a state viewed from above regarding the imaging operation for generating a panoramic image by moving the imaging apparatus 100 on a straight line 815 generally in parallel with a subject. The imaging operation shown in FIG. 37B is the panoramic image imaging operation to be performed with a direction orthogonal to an advancing direction 811 as the optical-axis direction of the imaging apparatus 100 using a mobile device such as a vehicle or the like which can move at constant speed, for example. For example, let us say that a vehicle in which a user 810 holding the imaging apparatus 100 in the hands rides moves at constant or variable speed in the advancing direction 811. Also, FIG. 37B schematically illustrates the imaging range of a panoramic image generated by the imaging operation thereof using a thick line as the panoramic image imaging range 812.

In this way, with the example shown in FIG. 37B, the position of the imaging apparatus 100 is sequentially changed on the straight line 815, and accordingly, movement distance on the straight line is employed instead of a rotation angle as change in the orientation of the imaging apparatus 100. Also, with regard to the start position and end position of the panoramic image imaging operation as well, positions on the straight line are employed.

Also, with the embodiments of the present disclosure, an example has been shown wherein a panoramic image is generated by synthesizing still images, but the embodiments of the present disclosure may be applied to a case where a panoramic image is generated using a moving image generated by a moving image imaging operation. Also, with regard to a case where a multi-view-point panoramic image is generated as well, the embodiments of the present disclosure may be applied.

Also, the embodiments of the present disclosure may be applied to imaging apparatuses such as cellular phones with an imaging function, portable terminal devices with an imaging function, and so forth.

Note that the embodiments of the present disclosure illustrate an example for realizing the present disclosure, and elements according to embodiments of the present disclosure correspond to elements specific to the present disclosure in the Claims correspond. Similarly, elements specific to the present disclosure in the Claims correspond to elements according embodiments of the present disclosure denoted with the same names. However, the present disclosure is not restricted to these embodiments, and may be realized by subjecting the embodiments to various modifications without departing from the essence of the present disclosure.

Also, the processing procedures described in the embodiments of the present disclosure may be recognized as a method having a series of procedures, or may be recognized as a program causing a computer to execute such series of procedures through a recording medium for storing the program thereof. Examples of this recording medium include CD (Compact Disc), MD (MiniDisc), DVD (Digital Versatile Disk), memory cards, and Blu-ray Disc (registered trademark), and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   an interface configured to receive an input identifying a subject prior to a determination of a start position for capturing image data; and
   a processor configured to:
   determine the start position for capturing the image data based on a reference position of the subject prior to the capturing of the image data such that an orientation of the image processing apparatus at the start position is different from an orientation of the image processing apparatus at which the subject is identified;
   control the capturing of the image data to generate a panoramic image based on the captured image data so that the subject is positioned in the panoramic image; and
   determine whether the image processing apparatus has reached the start position, and control a display to display a notification that the image processing apparatus has reached the start position in response to the start position being reached by the image processing apparatus.

2. The image processing apparatus of claim 1, further comprising:
   an imager configured to capture a plurality of the image data processed by the processor to generate the panoramic image.

3. The image processing apparatus of claim 1, wherein the processor is configured to control the display to display a notification indicating the start position determined by the processor.

4. The image processing apparatus of claim 3, wherein the processor is configured to control the display to display a swing direction of the image processing apparatus to arrive at the start position.

5. The image processing apparatus of claim 3, wherein the processor is configured to control the display to display a status bar indicating progress of movement to the start position.

6. The image processing apparatus of claim 2, wherein the processor is configured to control the display to display a notification indicating a swing direction of the image processing apparatus to arrive at an end position in response to the imager capturing the plurality of image data.

7. The image processing apparatus of claim 6, wherein the processor is configured to control the display to display a status bar indicating progress of movement to the end position.

8. The image processing apparatus of claim 6, wherein the processor is configured to determine whether the image processing apparatus has reached the end position, and control the display to display a notification that the image processing apparatus has reached the end position in response to the end position being reached by the image processing apparatus.

9. The image processing apparatus of claim 2, wherein the interface receives an input instructing the imager to capture the plurality of image data after the start position is determined.

10. The image processing apparatus of claim 9, wherein the processor is configured to control the display to display a notification indicating a swing direction of the image processing apparatus to arrive at an end position in response to the imager starting to capture the plurality of image data.

11. The image processing apparatus of claim 10, wherein the processor is configured to control the display to display a status bar indicating progress of movement to the end position.

12. The image processing apparatus of claim 10, wherein the processor is configured to determine whether the image processing apparatus has reached the end position, and control the display to display a notification that the image processing apparatus has reached the end position in response to the end position being reached by the image processing apparatus.

13. The image processing apparatus of claim 2, wherein the interface is configured to receive an input instructing the imager to capture the plurality of image data.

14. The image processing apparatus of claim 13, wherein the interface is configured to receive an input selecting a reference position in the panoramic image after the imager has begun capturing the plurality of image data.

15. The image capturing apparatus of claim 14, wherein the processor is configured to determine a new end position for capturing the plurality of image data based on the input selecting the reference position.

16. The image processing apparatus of claim 15, wherein the processor is configured to determine whether the image processing apparatus has reached the new end position, and control the display to display a notification that the image processing apparatus has reached the new end position in response to the new end position being reached by the image processing apparatus.

17. The image processing apparatus of claim 13, wherein the processor is configured to control the display to display a composition assistance image in which a candidate subject is displayed on a virtual representation of the panoramic image.

18. The image processing apparatus of claim 17, wherein the processor is configured to detect a change of orientation of the image processing apparatus, and change the composition assistance image based on the detected change of orientation.

19. An image processing method performed by an image processing apparatus, the method comprising:
receiving, at an interface of the image processing apparatus, an input identifying a subject prior to a determination of a start position for capturing image data;
determining the start position for capturing the image data based on a reference position of the subject prior to the capturing of the image data such that an orientation of the image processing apparatus at the start position is different from an orientation of the image processing apparatus at which the subject is identified;
controlling, at a processor of the image processing apparatus, the capturing of the image data to generate a panoramic image based on the captured image data so that the subject is positioned in the panoramic image; and
determining whether the image processing apparatus has reached the start position, and controlling a display to display a notification that the image processing apparatus has reached the start position in response to the start position being reached by the image processing apparatus.

20. The image processing apparatus according to claim 1, wherein the captured image data is recorded in a memory.

21. The image processing apparatus according to claim 1, wherein the processor is configured to determine an end position for capturing the image data based on the reference position prior to the capturing of the image data.

22. A computer program recorded on a non-transitory computer readable storage medium containing computer readable instructions for causing a computer to execute a method for controlling an image capturing apparatus, the method comprising:
receiving an input identifying a subject prior to a determination of a start position for capturing image data;
determining the start position for capturing the image data based on a reference position of the subject prior to the capturing of the image data such that an orientation of the image capturing apparatus at the start position is different from an orientation of the image capturing apparatus at which the subject is identified;
controlling the capturing of the image data to generate a panoramic image based on the captured image data so that the subject is positioned in the panoramic image; and
determining whether the image processing apparatus has reached the start position, and controlling a display to display a notification that the image processing apparatus has reached the start position in response to the start position being reached by the image processing apparatus.

23. An image processing apparatus, comprising:
an interface configured to receive an input identifying a subject prior to a determination of a start position for capturing image data; and
a processor configured to:
determine the start position for capturing the image data based on a reference position of the subject prior to the capturing of the image data such that an orientation of the image processing apparatus at the start position is different from an orientation of the image processing apparatus at which the subject is identified;

control the capturing of the image data to generate a synthesized image based on the captured image data so that the subject is positioned in the synthesized image; and determine whether the image processing apparatus has reached the start position, and control a display to display a notification that the image processing apparatus has reached the start position in response to the start position being reached by the image processing apparatus.

24. An image processing method performed by an image processing apparatus, the method comprising:

receiving, at an interface of the image processing apparatus, an input identifying a subject prior to a determination of a start position for capturing image data;

determining the start position for capturing the image data based on a reference position of the subject prior to the capturing of the image data such that an orientation of the image processing apparatus at the start position is different from an orientation of the image processing apparatus at which the subject is identified;

controlling, at a processor of the image processing apparatus, the capturing of the image data to generate a synthesized image based on the captured image data so that the subject is positioned in the synthesized image; and determining whether the image processing apparatus has reached the start position, and controlling a display to display a notification that the image processing apparatus has reached the start position in response to the start position being reached by the image processing apparatus.

25. A computer program recorded on a non-transitory computer readable storage medium containing computer readable instructions for causing a computer to execute a method for controlling an image capturing apparatus, the method comprising:

receiving an input identifying a subject prior to a determination of a start position for capturing image data;

determining the start position for capturing the image data based on a reference position of the subject prior to the capturing of the image data such that an orientation of the image capturing apparatus at the start position is different from an orientation of the image capturing apparatus at which the subject is identified;

controlling the capturing of the image data to generate a synthesized image based on the captured image data so that the subject is positioned in the synthesized image; and determining whether the image processing apparatus has reached the start position, and controlling a display to display a notification that the image processing apparatus has reached the start position in response to the start position being reached by the image processing apparatus.

26. The image processing apparatus of claim 1, wherein the processor is configured to control the display to display a status bar indicating the orientation of the image processing apparatus.

* * * * *